(12) United States Patent
Farb et al.

(10) Patent No.: US 12,126,176 B2
(45) Date of Patent: Oct. 22, 2024

(54) STEP GRADATIONS FOR A CHARGE CONTROLLER OF A FLUID TURBINE

(71) Applicant: Flower Turbines, Inc., Lawrence, NY (US)

(72) Inventors: Mark Daniel Farb, Lawrence, NY (US); Jonathan Forbes, Lauderhill, FL (US)

(73) Assignee: Flower Turbines, Inc., Lawrence, NY (US)

( * ) Notice: Subject to any disclaimer, the term of this patent is extended or adjusted under 35 U.S.C. 154(b) by 0 days.

(21) Appl. No.: 18/530,932

(22) Filed: Dec. 6, 2023

(65) Prior Publication Data
US 2024/0106242 A1    Mar. 28, 2024

Related U.S. Application Data

(63) Continuation of application No. PCT/US2023/073016, filed on Aug. 28, 2023.
(Continued)

(51) Int. Cl.
*H02J 3/38* (2006.01)
*F03D 7/02* (2006.01)
(Continued)

(52) U.S. Cl.
CPC .............. *H02J 3/38* (2013.01); *F03D 7/0272* (2013.01); *F03D 7/0276* (2013.01); *F03D 9/255* (2017.02);
(Continued)

(58) Field of Classification Search
CPC ......... H02J 3/38; H02J 2300/28; F03D 9/255; H02P 9/02
See application file for complete search history.

(56) References Cited

U.S. PATENT DOCUMENTS

| 1,352,952 A | 9/1920 | Gracey |
| 1,581,537 A | 4/1926 | Hennigh |

(Continued)

FOREIGN PATENT DOCUMENTS

| CN | 2409347 Y | 12/2000 |
| CN | 109630360 A | 4/2019 |

(Continued)

OTHER PUBLICATIONS

Haces-Fernandez, et al., "Improving wind farm power output through deactivating selected wind turbines, Energy Conversion and Management", vol. 187, 2019, pp. 407-422, ISSN 0196-8904.
(Continued)

*Primary Examiner* — Sean Gugger
(74) *Attorney, Agent, or Firm* — Finnegan, Henderson, Farabow, Garrett & Dunner LLP

(57) ABSTRACT

Systems, methods, and computer program products are disclosed for controlling a voltage output of a turbine. Controlling a voltage output of a turbine includes a rectifier for converting an AC output of a turbine to a DC voltage; a sensor for measuring the DC voltage; a charge controller for receiving the DC voltage from the rectifier and produce a DC output, including: a first circuit meeting a first performance criterion for a first DC range, a second circuit meeting a second performance criterion for a second DC operating range, a switch channeling the DC voltage between the first and second circuits; and a processor for receiving the DC voltage measurement from the sensor, and use the switch to channel the DC voltage between the first and second circuits, thereby meeting the first and second performance criteria when the DC voltage is in the first and second DC ranges, respectively.

21 Claims, 24 Drawing Sheets

Related U.S. Application Data

(60) Provisional application No. 63/408,484, filed on Sep. 21, 2022, provisional application No. 63/401,671, filed on Aug. 28, 2022.

(51) Int. Cl.
  *F03D 9/25* (2016.01)
  *H02P 9/02* (2006.01)

(52) U.S. Cl.
  CPC .......... *H02P 9/02* (2013.01); *F05B 2220/706* (2013.01); *H02J 2300/28* (2020.01)

(56) References Cited

U.S. PATENT DOCUMENTS

| | | |
|---|---|---|
| 4,036,360 A | 7/1977 | Deffeyes |
| 4,714,225 A | 12/1987 | Skinner |
| 4,973,219 A | 11/1990 | Brickner et al. |
| 5,044,878 A | 9/1991 | Wilhelm |
| 5,143,170 A | 9/1992 | Hunt et al. |
| 5,624,006 A | 4/1997 | Richardson, Jr. |
| 5,798,631 A | 8/1998 | Spee |
| 6,784,566 B2 | 8/2004 | Thomas |
| 6,824,073 B1 | 11/2004 | Haney |
| 7,592,537 B1 | 9/2009 | West |
| 7,679,207 B2 | 3/2010 | Cory |
| 7,891,573 B2 | 2/2011 | Finkam |
| 7,902,688 B2 | 3/2011 | Krivcov |
| 7,944,067 B2 | 5/2011 | Kammer |
| 7,988,413 B2 | 6/2011 | Haar |
| 8,207,623 B2 | 6/2012 | Rivas |
| 8,333,564 B2 | 12/2012 | Krivcov |
| 8,364,323 B2 | 1/2013 | Arinaga |
| 8,491,262 B2 | 7/2013 | McGrath |
| 8,648,483 B2 | 2/2014 | Haar |
| 8,696,313 B2 | 4/2014 | Deeley |
| 9,051,918 B1 | 6/2015 | Hench |
| 9,127,646 B2 | 9/2015 | Cory |
| 9,157,664 B2 | 10/2015 | Place |
| 9,328,717 B1 | 5/2016 | Walker |
| 9,689,372 B2 | 6/2017 | Gonzalez |
| 9,835,138 B2 | 12/2017 | Westergaard |
| 10,330,086 B2 | 6/2019 | Farb |
| 10,400,746 B1 | 9/2019 | Shoffler |
| 10,400,747 B2 | 9/2019 | D'Aix-Marseille et al. |
| 10,605,229 B2 | 3/2020 | Zhang |
| 10,767,630 B1 | 9/2020 | Venkitanarayanan |
| 11,060,502 B2 | 7/2021 | Wang |
| 11,143,164 B1 | 10/2021 | Landis |
| 11,208,982 B2 | 12/2021 | Palamara |
| 11,831,164 B2 | 11/2023 | Farb |
| 11,891,980 B2 | 2/2024 | Farb |
| 11,905,929 B2 | 2/2024 | Farb |
| 2002/0105190 A1 | 8/2002 | Thomas |
| 2002/0125880 A1 | 9/2002 | Murai |
| 2004/0164561 A1 | 8/2004 | Nagawa |
| 2005/0034937 A1 | 2/2005 | Agardy |
| 2005/0143221 A1 | 6/2005 | Kuwahara |
| 2006/0131889 A1 | 6/2006 | Corten |
| 2006/0153682 A1 | 7/2006 | Vanderhye |
| 2008/0083689 A1 | 4/2008 | Schroeder |
| 2008/0223982 A1 | 9/2008 | Pri-Paz |
| 2008/0284170 A1 | 11/2008 | Cory |
| 2008/0284171 A1 | 11/2008 | Cory |
| 2009/0040750 A1 | 2/2009 | Myer |
| 2009/0097981 A1 | 4/2009 | Gabrys |
| 2009/0186745 A1 | 7/2009 | Lewiston |
| 2009/0224556 A1 | 9/2009 | Berenda et al. |
| 2009/0243295 A1 | 10/2009 | Kammer |
| 2009/0267351 A1 | 10/2009 | Buns |
| 2009/0269209 A1 | 10/2009 | Urban |
| 2009/0278352 A1 | 11/2009 | Rivas |
| 2010/0140939 A1 | 6/2010 | Scholte-Wassink |
| 2011/0089701 A1 | 4/2011 | Blake |
| 2011/0111700 A1 | 5/2011 | Hacket |
| 2011/0215640 A1 | 9/2011 | Donnelly |
| 2011/0311364 A1 | 12/2011 | Conner |
| 2012/0056424 A1 | 3/2012 | Holstein |
| 2012/0169052 A1 | 7/2012 | Leipold-Buettner |
| 2012/0187695 A1 | 7/2012 | Desplats |
| 2012/0189448 A1 | 7/2012 | Jaquier |
| 2012/0217824 A1 | 8/2012 | Gupta et al. |
| 2012/0265356 A1 | 10/2012 | Yasugi |
| 2013/0008242 A1 | 1/2013 | Sakaguchi |
| 2013/0114312 A1 | 5/2013 | Reichard |
| 2013/0197704 A1 | 8/2013 | Pan |
| 2013/0207624 A1 | 8/2013 | Aaltonen |
| 2013/0313827 A1 | 11/2013 | Lovmand et al. |
| 2013/0333689 A1 | 12/2013 | Umemoto |
| 2014/0010656 A1 | 1/2014 | Nies |
| 2014/0150774 A1 | 6/2014 | Chang |
| 2014/0150845 A1 | 6/2014 | Chang |
| 2014/0234103 A1 | 8/2014 | Obrecht |
| 2015/0076828 A1 | 3/2015 | Palethorpe |
| 2015/0123401 A1 | 5/2015 | Vigars |
| 2015/0137519 A1 | 5/2015 | Tarnowski |
| 2015/0377213 A1 | 12/2015 | Deshpande |
| 2016/0222946 A1 | 8/2016 | Krings |
| 2016/0312768 A1 | 10/2016 | Takakura |
| 2016/0378085 A1 | 12/2016 | Guo |
| 2017/0054301 A1 | 2/2017 | Fintzos |
| 2017/0058899 A1 | 3/2017 | Ichihara |
| 2017/0114778 A1 | 4/2017 | Madson |
| 2017/0214249 A1 | 7/2017 | Seeley |
| 2017/0298902 A1 | 10/2017 | Gdovic |
| 2017/0324367 A1 | 11/2017 | Collins |
| 2018/0010576 A1 | 1/2018 | Brake et al. |
| 2018/0097360 A1 | 4/2018 | Batten |
| 2018/0110328 A1 | 4/2018 | Mayer |
| 2018/0142669 A1 | 5/2018 | Cho et al. |
| 2018/0171972 A1 | 6/2018 | Merz et al. |
| 2018/0175661 A1 | 6/2018 | Tuerk |
| 2018/0238305 A1 | 8/2018 | McMahon |
| 2018/0301906 A1 | 10/2018 | Qureshi |
| 2018/0306169 A1 | 10/2018 | Dharmadhikari et al. |
| 2018/0340515 A1 | 11/2018 | Huyn et al. |
| 2019/0052206 A1 | 2/2019 | Noderer |
| 2019/0093628 A1 | 3/2019 | Lin |
| 2019/0186145 A1 | 6/2019 | Farb |
| 2019/0360469 A1 | 11/2019 | De Boer |
| 2020/0106295 A1 | 4/2020 | Trzemzalski |
| 2020/0232446 A1 | 7/2020 | Hawkins |
| 2021/0033062 A1 | 2/2021 | Mishra |
| 2021/0075252 A1 | 3/2021 | Caamano |
| 2021/0098994 A1 | 4/2021 | White |
| 2021/0126541 A1 | 4/2021 | Zhang |
| 2021/0148330 A1 | 5/2021 | Kukkonen |
| 2021/0164442 A1 | 6/2021 | Bonfiglio |
| 2021/0262441 A1 | 8/2021 | Jacobsen |
| 2021/0262443 A1 | 8/2021 | Goldblatt |
| 2021/0301784 A1 | 9/2021 | Cory |
| 2022/0060016 A1 | 2/2022 | Mitsunaga |
| 2022/0077686 A1 | 3/2022 | Ma et al. |
| 2022/0263457 A1 | 8/2022 | Akhavan-Tafti |
| 2022/0299959 A1 | 9/2022 | Schirmer |
| 2022/0321052 A1 | 10/2022 | Sassi |
| 2022/0407349 A1 | 12/2022 | Owens |
| 2023/0092176 A1* | 3/2023 | Ricketts .............. H02J 7/00712 320/109 |
| 2023/0141320 A1 | 5/2023 | Sepulveda Gonzalez et al. |
| 2023/0184218 A1 | 6/2023 | Lund |
| 2023/0250793 A1 | 8/2023 | Farb |
| 2023/0250801 A1 | 8/2023 | Farb |
| 2023/0250804 A1 | 8/2023 | Farb |
| 2023/0283079 A1 | 9/2023 | Weaver |
| 2023/0323858 A1 | 10/2023 | Farb |
| 2023/0324866 A1 | 10/2023 | Farb |
| 2023/0327455 A1 | 10/2023 | Farb |
| 2023/0327456 A1 | 10/2023 | Farb |
| 2023/0340936 A1 | 10/2023 | Gaber |

(56) References Cited

U.S. PATENT DOCUMENTS

| | | |
|---|---|---|
| 2023/0402739 A1 | 12/2023 | Hoganson |
| 2024/0060468 A1 | 2/2024 | Abdallah |

FOREIGN PATENT DOCUMENTS

| | | | |
|---|---|---|---|
| CN | 107131099 B | | 11/2019 |
| CN | 113272545 A | | 8/2021 |
| EP | 3096004 A1 | | 11/2016 |
| EP | 3023636 B1 | | 4/2021 |
| EP | 3885574 B1 | | 2/2024 |
| KR | 20100039917 A | | 4/2010 |
| KR | 20110008951 U | | 9/2011 |
| KR | 101476673 B1 | | 12/2014 |
| KR | 102060281 B1 | | 12/2019 |
| WO | 2013073930 A1 | | 5/2013 |
| WO | 2013174090 A1 | | 11/2013 |
| WO | 2018029401 A1 | | 2/2019 |
| WO | 2020254161 A1 | | 6/2020 |
| WO | 20200150108 A1 | | 7/2020 |
| WO | 2021231485 A1 | | 11/2021 |

OTHER PUBLICATIONS

Howland, M.F., Quesada, J.B., Martinez, J.J.P. et al. "Collective wind farm operation based on a predictive model increases utility-scale energy production." Nat Energy 7, 818-827 (2022).

Howland et al., "Wind farm power optimization through wake steering." Proc Natl Acad Sci U S A., May 20, 2019, vol. 116, No. 29, pp. 14495-500.

Pape et al., "Turbine Startup and Shutdown in Wind Farms Featuring Partial Power Processing Converters," IEEE Open Access Journal of Power and Energy, vol. 7, pp. 254-264, 2020, doi: 10.1109/OAJPE.2020.3006352.

"Each Wind Harvester Project in 2023 and 2024 will advance our commercialization objectives" Wind Harvest International, 2023, Inc. https://windharvest.com/about/projects/ (Last accessed on Dec. 30, 2023).

Chandler D.L., "A new method boosts wind farms' energy output, without new equipment," MIT News, Aug. 22, 2022.

PCT International Search Report and Written Opinion mailed Jul. 28, 2023, issued in corresponding International Application No. PCT/US23/62170 (6 pages.).

PCT International Search Report and Written Opinion mailed Nov. 23, 2023, issued in corresponding International Application No. PCT/US2023/065609 (17 pgs.).

Syahputra et al. "Performance Improvement for Small-Scale Wind Turbine System Based on Maximum Power Point Tracking Control." in: Energies 2019, 12(20), Oct. 17, 2019, [online] [retrieved on Dec. 27, 2023 (Dec. 27, 2023)] Retrieved from the Internet < URL: https://www.mdpi.com/1996-1073/12/20/3938 >, entire document, 18 pages.

International Search Report and Written Opinion for PCT/US2023/073016 dated Feb. 8, 2024, 9 pages.

International Search Report and Written Opinion, dated Mar. 28, 2024, issued in International Patent Application No. PCT/US2023/074425 (8 pages).

Singh et al., "Recovery of Energy From Exhaust Air of Textile Industry With the Help of VAWT," International Research Journal of Engineering and Technology, 7(3), 4820-4828, (2020).

Shahid, Rehan, "Generating Electricity From Exhaust Air Using Wind Turbine", Aug. 5, 2015, Retrieved from: https://www.linkedin.com/pulse/generating-electricity-using-exhaust-air-rehan-shahid. (Year: 2015).

Berhanu et al., "Numerical and experimental investigation of an exhaust air energy recovery Savonius wind turbine for power production," Science Direct, (2021), https://doi.org/10.1016/j.matpr.2021.02.675.

Ismail et al., "Study On the Potentiality of Power Generations from Exhaust Air Energy Recovery Wind Turbine: A Review," Journal of Advanced Research in Fluid Mechanics and Thermal Sciences, 87(3), 148-171, (2021), https://doi.org/10.37934/arfmts.87.3.148171.

Chong et al., "Design of an exhaust air energy recovery wind turbine generator for energy conservation in commercial buildings," Science Direct, vol. 67, pp. 252-256, (2014). https://doi.org/10.1016/j.renene.2013.11.028.

International Search Report and Written Opinion, dated Jun. 21, 2024, issued in International Patent Application No. PCT/US2024/11337.

International Search Report and Written Opinion, dated Aug. 14, 2024, issued in International Patent Application No. PCT/US24/23527.

\* cited by examiner

PREDETERMINED LOADS IN COMPLIANCE WITH MPPT PROTOCOL

| FLUID SPEED CONDITION | MPPT-COMPLIANT LOAD |
|---|---|
| Vw1 | MPPT_LOAD(Vw1) |
| Vw2 | MPPT_LOAD(Vw2) |
| Vw3 | MPPT_LOAD(Vw3) |
| Vw4 | MPPT_LOAD(Vw4) |
| Vw5 | MPPT_LOAD(Vw5) |

PREDETERMINED LOADS IN COMPLIANCE WITH MPPT PROTOCOL

| FLUID SPEED CONDITION | MPPT-COMPLIANT LOAD |
|---|---|
| Vw1 | MPPT_LOAD(Vw1) |
| Vw2 | MPPT_LOAD(Vw2) |
| Vw3 | MPPT_LOAD(Vw3) |
| Vw4 | MPPT_LOAD(Vw4) |
| Vw5 | MPPT_LOAD(Vw5) |
| Vw6 | MPPT_LOAD(Vw6) |

STEP GRADATIONS FOR A CHARGE CONTROLLER OF A FLUID TURBINE

CROSS REFERENCES TO RELATED APPLICATIONS

This application is a continuation of PCT International Application No. PCT/US2023/073016, filed Aug. 28, 2023, which claims the benefit of priority of U.S. Provisional Patent Application No. 63/401,671, filed Aug. 28, 2022, U.S. Provisional Patent Application No. 63/408,484, filed on Sep. 21, 2022, the entire contents of all of which are incorporated herein by reference.

TECHNICAL FIELD

The present disclosure generally relates to the field of fluid turbines. More specifically, the present disclosure relates to systems, methods, and devices for operating a cluster of fluid turbines.

BACKGROUND

As challenges posed by climate change continue to increase, more attention is being devoted to green energy alternatives to fossil fuels. Some attractive alternatives to fossil fuels include turbines that harness power from a fluid flow, such as wind, ocean currents, a steam flow, or a gas flow. In some cases, due to physical constraints limiting how much energy may be generated by any single turbine, clusters of turbines may be constructed, allowing for aggregation of energy generated by multiple individual turbines. For example, aggregating energy produced by a cluster of turbines may allow scaling up green energy production sufficiently to provide a reliable supply of green energy to an electrical grid, as a replacement for fossil fuels. However, clusters of fluid turbines may require coordinated maintenance, repairs, and safety checks. In addition, in some cases, coordinating the operations of clustered turbines may improve performance, allowing them to increase green energy production with improved efficiency. Systems and methods for coordinating operations of clustered turbines may therefore be beneficial.

SUMMARY

Embodiments consistent with the present disclosure provide systems and methods generally relating to operating one or more fluid turbines. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer readable storage media may store program instructions, which are executable by at least one processing device and perform any of the steps and/or methods described herein.

Consistent with disclosed embodiments, systems, methods, and computer readable media for determining a power curve for a fluid turbine. The embodiments may include at least one processor configured to: receive an indication of a fluid speed condition; when a predetermined load in compliance with an MPPT protocol for the fluid turbine operating under the fluid speed condition is available, obtain the predetermined load; and apply the predetermined load to the fluid turbine, thereby adjusting a rotational velocity of the fluid turbine in accordance with the MPPT protocol and the fluid speed condition; when a predetermined load in compliance with the MPPT protocol for the fluid turbine operating under the fluid speed condition is unavailable, apply a plurality of candidate loads to the fluid turbine in an iterative manner in accordance with the MPPT protocol and the fluid speed condition; determine an MPPT-compliant load that, when applied to the fluid turbine operating under the fluid speed condition, generates greater power than would be generated in an absence of application of the MPPT protocol; applying the MPPT-compliant load to the fluid turbine, thereby adjusting a rotational velocity of the fluid turbine in accordance with the MPPT protocol and the fluid speed condition; and storing the MPPT-compliant load in association with the fluid speed condition for subsequent application.

Consistent with disclosed embodiments, systems, methods, and computer readable media for a fluid turbine control system. The embodiments may include at least one processor configured to: receive at least one indication associated with at least one DC voltage outputted by the at least one fluid turbine; based on the at least one indication, operate a controllable switch to alternately channel the at least one DC voltage output between at least a first circuit configured to meet a first performance criterion during operation in a first DC operating range and a second circuit configured to meet a second performance criterion during operation in a second DC operating range, thereby causing the first performance criterion to be met when the at least one DC voltage output is within the first DC operating range, and causing the second performance criterion to be met when the at least one DC voltage is within the second DC operating range.

BRIEF DESCRIPTION OF THE DRAWINGS

FIG. 15 in an exemplary data structure associating a plurality of fluid speed conditions with a plurality of MPPT compliant loads, consistent with some embodiments of the present disclosure.

FIG. 18 is another exemplary data structure associating a plurality of fluid speed conditions with a plurality of MPPT compliant loads, consistent with some embodiments of the present disclosure.

DETAILED DESCRIPTION

Figure 1:
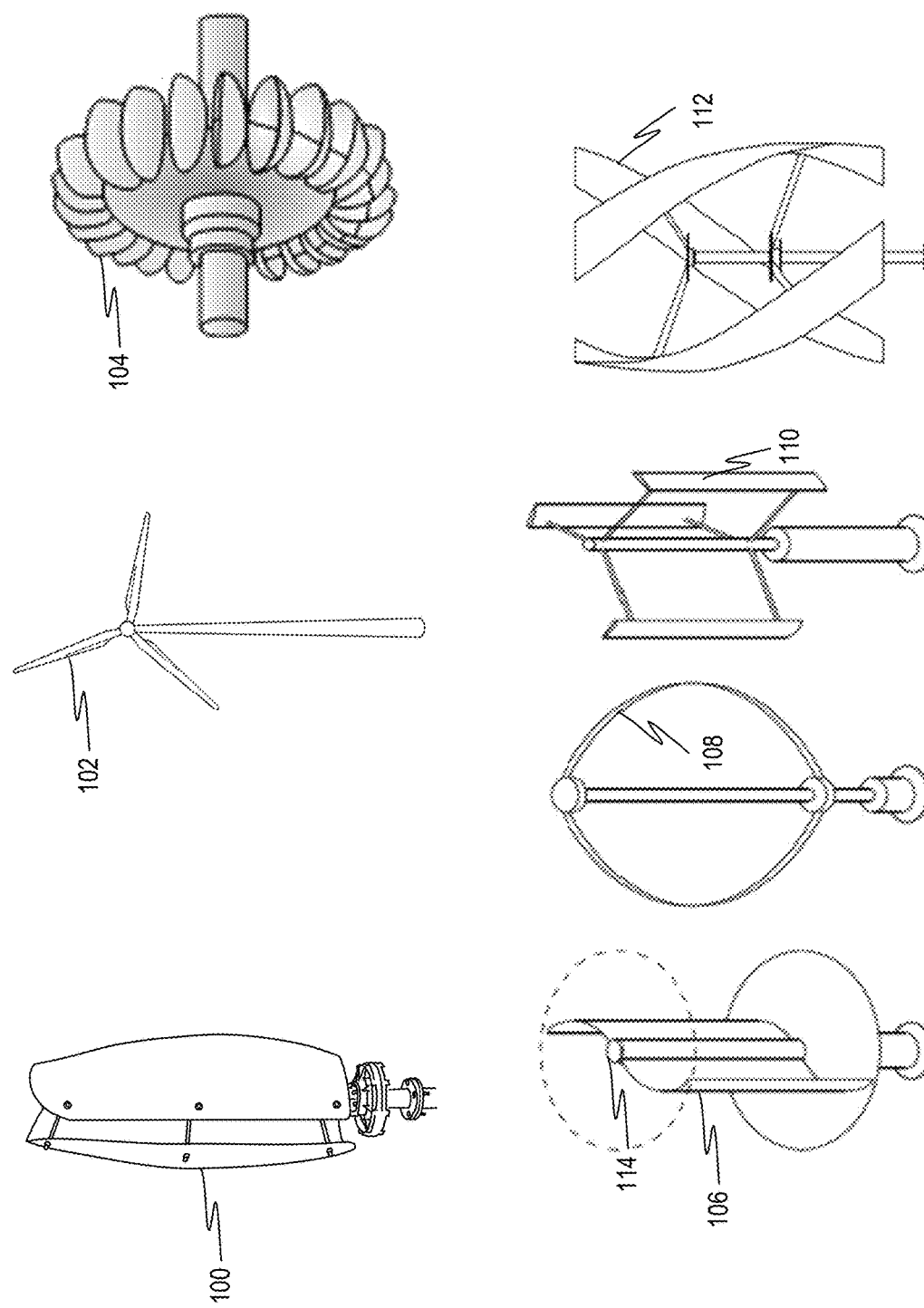
FIG. 1 illustrates an exemplary variety of fluid turbines, each of which is consistent with some embodiments of the present disclosure.

Disclosed herein are systems, methods, and non-transitory computer readable media for controlling and/or coordinating operations of one or more fluid turbines (e.g., a cluster of geographically-associated fluid turbines). The fluid turbines referred to herein may be configured to harness energy from wind, water, steam, and/or gas flow. Although some non-limiting examples are given relating to wind turbines (specifically vertical wind turbines), these examples are intended for illustrative purposes only, and do not limit this disclosure. Furthermore, in some cases the term "fluid turbine" may be understood to include an electric energy generator in an integral fluid energy conversion system.

Various terms used in this detailed description and in the claims may be defined or summarized differently when discussed in connection with differing disclosed embodiments. It is to be understood that the definitions, summaries, and explanations of terminology in each instance apply to all instances, even when not repeated, unless the transitive definition, explanation or summary would result in inoperability of an embodiment.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily lack that feature or characteristic.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the specific embodiments and examples, but is inclusive of general principles described herein and illustrated in the figures in addition to the general principles encompassed by the appended claims.

Aspects of the present disclosure is directed to systems, devices, methods, and non-transitory computer readable media for operating one or more fluid turbines (e.g., a cluster of fluid turbines) under variable fluid conditions. In some cases, each fluid turbine in a cluster may be exposed to substantially the same environmental factors (e.g., the same or similar wind conditions, water current, and temperature). Under low fluid conditions, energy produced by one or more fluid turbines may fail to meet one or more threshold requirements associated with supplying generated electrical energy to an electrical grid. For instance, AC voltage generated under low fluid conditions may fail to meet a threshold for an inverter and/or an electrical grid requirement. Low fluid conditions may refer to a fluid having a fluid velocity below a minimal fluid flow threshold. For example, a fluid velocity above the minimal power threshold may be necessary for a fluid turbine to generate power. Disclosed embodiments may allow harnessing energy generated under low fluid conditions to increase operational efficiency of one or more fluid turbines and facilitate compliance with one or more standards and/or regulations for supplying AC power to an electrical grid.

A flow (e.g., a fluid flow) may refer to movement or continual deformation of a fluid under an applied force. Flow may correspond to kinetic energy of particles or molecules of a fluid. For example, a temperature gradient in a fluid may cause warmer fluid to rise and cooler fluid to sink in a cyclical flow motion. Uneven heating of the Earth by the sun (e.g., combined with the Earth's rotation) may cause wind (e.g., airflow). Similarly, wind, water density differentials, gravity, and the Earth's rotation may cause ocean currents (e.g., water flow). Examples of turbines for obtaining energy from a flow may include a windmill, a waterwheel, a steam turbine, or a gas turbine.

A wind flow may refer to a fluid flow consisting of air. A water flow may refer to a fluid flow consisting of water, e.g., as an ocean or river current.

A fluid turbine may include a mechanical device configured to capture energy from a fluid flow (e.g., a flow of water, steam, gas, or wind) and convert the captured energy to a form of work (e.g., a rotary motion). A fluid turbine may include at least one moving part coupled to a plurality of blades connected to a shaft. A fluid turbine may rotate, for example, in response to an air flow incident on a plurality of blades or in response to water flow on an impeller (e.g., paddle wheel, a water wheel), or in response to steam or gas flow. The plurality of blades and shaft may be connected to a rotor of an electric energy generator for converting the mechanical rotational motion of the plurality of blades and shaft to electrical energy, as described in greater detail below. A fluid turbine may have a horizontal axis of rotation (e.g., the axis around which the fluid turbine rotates is substantially parallel to the ground or flow), or a vertical axis of rotation (e.g., the axis around which the fluid turbine rotates is at a right angle to the ground or flow). In some embodiments the axis of rotation may be neither horizontal or vertical, and in other embodiments, the axis of rotation may be variable. A fluid turbine may begin generating power when a fluid flow exceeds a lower threshold (e.g., a cut-in value). In some embodiments, a fluid turbine may be associated with at least one processor configured to control the operation of the fluid turbine, as described in greater detail herein below.

A shaft of a fluid turbine may include a pole, a rod, a post, a support, a pylon, or any other axle or axis. In some embodiments, a shaft may be used to support one or more objects. For example, blades of a vertical fluid turbine may be connected to a shaft allowing the blades to be supported vertically by the shaft which may rotate with the blades. Connecting the shaft with the blades to a rotor may allow transferring kinetic energy of a flowing fluid to a rotary motion by the rotor to produce electrical energy. As another example, blades of an impeller may be connected to a horizontally oriented shaft that may rotate with the blades.

A blade (e.g., as part of a plurality of blades) of a turbine may refer to an object having a cross-sectional shape having a curved surface (e.g., an airfoil shape or a cupped shape typical of drag-type turbines) configured to cause a motion (e.g., a rotational motion) consistent with the fluid motion incident on the blades. A fluid turbine may include a plurality of blades mounted onto a rim of a disc. Movement of a fluid across the blades may produce a tangential force that may cause rotation of a rotor connected thereto. Moving fluid may act on the blades of a fluid turbine causing the blades to rotate and impart rotational energy to a rotor. The blades may extend from the rotor in that they protrude from the rotor or from a mounting plate mechanically connected to the rotor. Connecting a plurality of blades to a rotor (e.g., directly or indirectly) may cause the plurality of blades to extend outwards and/or upwards from the rotor.

A cluster of fluid turbines may refer to a plurality of fluid turbines positioned in relative proximity to each other, to form a group or collection of fluid turbines. A cluster of fluid turbines may include at least two fluid turbines at a location including a plurality of fluid turbines. In some embodiments, a cluster of fluid turbines may include all of the fluid turbines at a location. In some embodiments, a cluster of fluid turbines may include fewer than all of the fluid turbines at a location. Clustered fluid turbines may be positioned in an arrangement such that each fluid turbine may be exposed to substantially similar environmental conditions and fluid flow (e.g., wind conditions, temperature, precipitation, water current). In some embodiments, at least some of clustered fluid turbines may be fluidly coupled such that blade motion of a fluidly-coupled upstream fluid turbine may cause a fluid flow or turbulence that may affect or influence the blade motion of a fluidly-coupled downstream fluid turbine in the cluster. In some embodiments, each clustered fluid turbine may be fluidly coupled with at least one other fluid turbine. In some embodiments, at least one clustered fluid turbine may be independent such that blade motion of the independent clustered turbine may be indifferent to blade motion of any other clustered fluid turbine, and may not affect blade motion of any other clustered fluid turbine. In some embodiments, each fluid turbine in a cluster may be independent.

Electrical energy may refer to energy associated with electrically charged particles. Electrical energy may be supplied as current (e.g., an electron flow) through an electric potential (e.g., voltage). A fluid turbine coupled to an energy generator may convert mechanical energy (e.g., in a fluid flow) to electrical energy for supplying to an electrical energy sink, such as a capacitor, a battery, an electrical load, and/or an electrical grid.

A voltage may refer to an electrical potential difference between two points. A voltage may be associated with a tension between two points to reduce or eliminate an electrical potential difference therebetween. For example the tension may be reduced by a current flowing from one point to the other point, e.g., crossing the electrical potential difference.

Power (e.g., electric power) may refer to a rate at which electrical energy may be transferred by an electric circuit. Electric power may be measured in watts (e.g., Kilowatts, or Megawatts) and may refer to a rate of electrical energy transferred by an electric circuit. Power may be calculated from a known voltage and/or current level (e.g., watts=volts×amps). Electric power may be generated by an electric energy generator (e.g., connected to a fluid turbine). As used herein, the phrase "power generated by a fluid turbine" or "power output from a fluid turbine" may refer to power generated by an energy generator associated with the fluid turbine.

An energy generator (e.g., an alternator) may include a device configured to convert motive or mechanical power to electric power. An energy generator may include a rotor and a stator in which windings (e.g., copper wires) may be electromagnetically coupled to an alternating magnetic field for conversion of non-electrical energy (e.g. rotational or kinetic energy) to electrical energy. An energy generator may be associated with a fluid turbine (e.g., steam, water, air, and/or gas turbine). Mechanical energy as rotational motion of a fluid turbine may be transferred to a rotor of an electric generator. The rotational motion of the rotor may cause an alternating magnetic field to surround the windings, which may induce an alternating current, thereby converting mechanical energy to electrical energy. In some embodiments, the rotor may include a magnet or magnets, and the stator may include windings. In some embodiments, the rotor may include windings and the stator may include a magnet or magnets. In some embodiments, a rotor may be configured to rotate within a stator (e.g., a stator may be formed as a ring or donut surrounding a rotor.) In some embodiments, a rotor may be configured to rotate about a stator (e.g., a rotor may be formed as a ring or donut surrounding a stator). In some embodiments, a rotor of an energy generator may be connected to rotatable blades and/or a rotatable shaft of a fluid turbine, allowing the rotor to rotate in response to a fluid flow.

A rotor may refer to a rotating component of an electromagnetic system (e.g., an electric motor, electric energy generator, or an alternator). A rotor may rotate, turn, or spin to induce a torque around an axis of the rotor. A stator may refer to a stationary (e.g., non-moving) component of a rotary electromagnetic system. A rotor electromagnetically coupled to a stator may allow for interactions between an electromagnetic coil of an electric conducting wire (e.g., windings) and an alternating magnetic field. The interactions may allow conversion of electrical energy to mechanical energy as rotational motion (e.g., as in a motor) and to convert mechanical energy as rotational motion to electrical energy (e.g., as in an electric energy generator). For example, energy may flow from a rotating component to a stator, as in an energy generator where a stator may convert a rotating magnetic field to an alternating electric current.

Electronic circuitry may include any combination of electronic components (e.g., one or more of memory units, switches, transistors, diodes, gates, capacitors, inductors, resistors, transformers, converters, inverters, rectifiers, DC-DC converters, more power supplies, voltage sensors, current sensors, a voltage booster, a voltage buck, a dump load, a regulator and/or other electronic componentry) connected via one or more connecting wires and/or contacts for performing one or more operations (e.g., logical operations) in response to receiving an electric signal as an input (e.g., from at least one processor operating as a controller). Circuitry may include one or more integrated circuits (ICs), including one or more processors. Circuitry may further include one or more communication channels and/or links. The communication links may couple the one or more ICs to the memory, thereby enabling the one or more ICs to receive a computing instruction and/or data stored thereon required to perform a corresponding logical operation. The communication channels coupling the one or more ICs to the memory may include wired channels, such as one or more cables, fibers, wires, buses, and any other mechanically coupled communication channel. The communication channels may include wireless channels such as short, medium, and long-wave radio communication channels (e.g., Wifi, BlueTooth, Zigbee, cellular, satellite), optical, and acoustic communication channels. The communications channels or links may include wires, cables, and/or fibers configured to transmit power (e.g., AC and/or DC power) generated by one or more fluid turbines. The communications channels or links may include communication links for transmitting electronic signals readable by at least one processor.

At least one processor may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

A processor may be configured to perform calculations and computations, such as arithmetic and/or logical operations to execute software instructions, control and run processes, and store, manipulate, and delete data from memory. An example of a processor may include a microprocessor manufactured by Intel™. A processor may include a single core or multiple core processors executing parallel processes simultaneously. It is appreciated that other types of processor arrangements could be implemented to provide the capabilities disclosed herein.

At least one processor may include a single processor or multiple processors communicatively linked to each other and capable of performing computations in a cooperative manner, such as to collectively perform a single task by dividing the task into subtasks and distributing the subtasks among the multiple processors, e.g., using a load balancer. In some embodiments, at least one processor may include multiple processors communicatively linked over a communications network (e.g., a local and/or remote communications network including wired and/or wireless communications links). The multiple linked processors may be configured to collectively perform computations in a distributed manner (e.g., as known in the art of distributed computing).

In some embodiments, at least one processor may include a plurality of processors configured to control a plurality of geographically-associated fluid turbines (e.g., a cluster of fluid turbines). In some embodiments, one or more fluid turbines in a cluster of fluid turbines may be associated with one or more specific processors, e.g., dedicated to a specific fluid turbine or a subset of specific fluid turbines in a cluster. In some embodiments, one or more processors may be configured in a central control unit to collectively control the operations of each fluid turbine in a cluster of fluid turbines. In some embodiments, at least one processor may include one or more processors dedicated to a specific fluid turbine in a cluster of fluid turbines, and one or more processors in a central control unit configured to control operations of the entire cluster of fluid turbines. In some embodiments, at least one processor may control operations of a plurality of geographically-associated fluid turbines to allow the plurality of geographically-associated fluid turbines to operate collectively as a single fluid energy conversion system.

A non-transitory computer-readable storage medium (e.g., a memory) refers to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located locally (e.g., in physical proximity to at least one processor and connected via a local communications link) or at a remote location (e.g., accessible to at least one processor via a communications network). Additionally, one or more computer-readable storage mediums can be utilized in implementing a computer-implemented method. Accordingly, the term computer-readable storage medium should be understood to include tangible items and exclude carrier waves and transient signals.

In some embodiments, a memory may include a plurality of memory storage devices configured to store information for controlling a plurality of geographically-associated fluid turbines (e.g., a cluster of fluid turbines). In some embodiments, one or more fluid turbines in a cluster of fluid turbines may be associated with one or more specific memory devices, e.g., dedicated to a specific fluid turbine or a subset of specific fluid turbines in a cluster. In some embodiments, one or more memory devices may be configured with a central control unit to collectively store information for controlling each fluid turbine in a cluster of fluid turbines. In some embodiments, a memory may include one or more memory devices dedicated to a specific fluid turbine in a cluster of fluid turbines, and one or more memory devices in a central control unit configured to store information for controlling the entire cluster of fluid turbines. In some embodiments, a memory may store information for controlling operations of a plurality of geographically-associated fluid turbines to allow the plurality of geographically-associated fluid turbines to operate collectively as a single fluid energy conversion system.

Consistent with the present disclosure, disclosed embodiments may involve a network. A network may include any type of physical or wireless computer networking arrangement used to exchange data. For example, a network may be the Internet, a private data network, a virtual private network using a public network, a Wi-Fi network, a LAN or WAN network, a combination of one or more of the forgoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Direct current (DC) (e.g., a DC power signal) may refer to a one-directional flow of electric charge. DC power may be used to operate a processor or controller. An example of DC power may include power produced by an electrochemical cell (e.g., a battery) or power stored in a capacitor. Electronic devices such as processors, controller, and memory devices may be operated using DC power.

Alternating current (AC) (e.g., an AC power signal) may refer to a bi-directional flow of electrical charge exhibiting a periodic change in direction. An AC current flow may change between positive and negative due to the positive or negative flow of electrons, producing a sinusoidal AC wave. An alternator may create AC power by positioning a conductive coil (e.g., copper windings) inside a fluctuating magnetic field. The fluctuating magnetic polarities may cause electric current in the conductive coil to change direction, producing an electrical waveform signal. AC power may travel farther than DC power without losing power, which may be advantageous for delivering power from power generating systems to consumers of electricity. An electric energy generator may generate AC power, and an electric power grid may supply AC power to consumers.

A three-phase voltage signal may refer to a voltage signal distributed as three voltage signals, each voltage signal at a phase shift of 120 degrees from the other voltage signals such that peaks and valleys of the three voltage signals do not align. The three voltage signals may be offset from each other by one-third of each cycle such that the waveform produced by each phase may be offset from one-third of a cycle produced by the other two phases. A three-phase voltage signal may allow for efficient stepping up and stepping down of high voltages for power transmission.

A load (e.g., an electrical load) may refer to an impedance or resistance. Such a load may be imposed on an electric energy generator (e.g., and a fluid turbine connected thereto) causing rotation of the electric energy generator and/or a fluid turbine connected thereto to slow. Generating a load may involve drawing away at least some electrical energy produced by an energy generator to an energy sink. Drawing away more electrical energy (e.g., increasing a load) may increase an impedance causing a rotational velocity of the fluid turbine to slow down. Drawing away less electrical energy (e.g., decreasing the load) may reduce an impedance cause a rotational velocity of the fluid turbine to increase.

A rectifier may refer to a device or circuitry that converts an alternating current (AC) to a direct current (DC) signal (e.g., an AC-to-DC converter). A rectifier may convert AC power (e.g., generated by an electric energy generator) to DC power (e.g., to power at least one processor). In some embodiments, each of the geographically-associated fluid turbines may be associated with a dedicated rectifier. The dedicated rectifiers for each fluid turbine may be housed in a separate housing (e.g., per fluid turbine), or in a common housing for multiple fluid turbines.

An inverter (e.g., a power inverter) may refer to a device or circuitry that converts a direct current (DC) signal to an AC signal (e.g., a DC-to-AC converter). An inverter may convert a DC signal to produce a square wave, a sine wave, a modified sine wave, a pulsed sine wave, a pulse width modulated wave (PWM) depending on the circuit design of the inverter. An inverter may convert DC power to AC power for transmitting to an electric power grid. In some embodiments, the plurality of geographically-associated fluid turbines may be associated with a single inverter for outputting collectively generated AC power to a power grid.

For instance, each AC power signal outputted by each geographically-associated fluid turbine may be converted to a DC power signal via each of the dedicated rectifiers. Circuitry (e.g., including at least one processor) may process the DC power signals to enable combining each of the DC power signals to form an aggregate DC power signal, such that converting the aggregate DC power signal via an inverter may produce an AC power signal that may be compatible for transmitting to an electric power grid.

A capacitor may refer to an electronic component configured to store electrostatic energy in an electric field by storing electric charge on two opposing surfaces (e.g., conducting plates) separated by an insulator (e.g., a dielectric medium). Applying an electric potential difference (e.g., a voltage) across the plates of a capacitor, may cause an electric field to develop across the dielectric medium, causing a net positive charge to accumulate on one plate and net negative charge to accumulate on the opposing plate, allowing for storage of electrical energy as a potential difference between the two plates. The plates of a capacitor may be connected to other circuit components (e.g., via contacts of the capacitor) allowing for integration of one or more capacitors into an electronic circuit. In some embodiments, a capacitor may function as a source of electrical energy (e.g., similar to a battery). However, a capacitor may be differentiated from a battery because a capacitor may lack a chemical reaction to receive, store and generate electrical energy. A capacitor may be manufacturable on a microelectronic scale for integration with other microelectronic components, e.g., in a photolithographic process.

A battery may refer to an electrical device configured to convert chemical energy into electrical energy or vice versa. A battery may include one or more cells, each cell containing electrodes and an electrolyte. When the electrodes are connected to an external circuit, a chemical reaction may occur in the electrolyte, creating a flow of electrons, which generates an electric current. The amount of electrical energy that can be stored in a battery may be determined by the capacity (e.g., measured in amp-hours, Ah, or milliampere-hours, mAh). Batteries may be rechargeable, or non-rechargeable.

A battery bank may include a plurality of batteries connected together in a series or parallel configuration to provide a larger capacity and/or higher voltage. A battery bank may be used to store electrical energy generated by a renewable energy source, such as a plurality of fluid turbines, e.g., for subsequent use by a consumer. In some embodiments, a battery bank may include multiple batteries connected in series to increase the voltage while maintaining a steady capacity. In some embodiments, a battery bank may include multiple batteries connected in parallel to increase capacity while maintaining a steady voltage. In some embodiments, a battery bank may include multiple batteries connected in series and in parallel to allow increasing voltage and capacity. A charge controller may be used to ensure that the batteries in a battery bank have a similar state of charge and similar electrical characteristics, e.g., to prevent overcharging, over-discharging, and/or uneven aging of one or more batteries included therein.

A DC-DC converter may include an electric power converter, for example, an electronic circuit and/or a device configured to convert a DC voltage signal from a first DC voltage level to a second voltage level. A DC-DC converter may reduce (e.g., buck) a DC voltage signal or increase (e.g., boost) a DC voltage signal. For instance, a DC-DC converter may store electrical energy temporarily and release the electrical energy at a different voltage. In some embodiments, a DC-DC converter may be designed to (e.g., substantially) maximize energy harvested from fluid turbines and/or photovoltaic cells (e.g., as a power optimizer). DC-DC converters may include electronic voltage converters (e.g., using one or more capacitors, inductors, and/or transformers), magnetic voltage converters (e.g., using an inductor and/or transformer to periodically release energy from a magnetic field stored therein), bi-directional DC-DC converters, and/or capacitive voltage converters.

A charge controller may refer to an electronic device configured to help ensure compliance of a fluid turbine with one or more regulations and/or specifications. For instance, a charge controller may prevent overcharging of a battery bank by a fluid turbine while limiting a rotational speed of the fluid turbine (e.g., when the battery bank is full and/or under high fluid speed conditions), and may allow aggregation of power from multiple fluid turbines without incurring loss due to interference. A charge controller may include an AC-to-DC converter (e.g., a rectifier), one or more of a voltage sensor switch, a voltage regulator (e.g., for regulating a DC voltage for supplying DC power to a battery bank), and/or a dump load (e.g., for diverting excess power to prevent overcharging). In some embodiments, a charge controller may include at least one processor configured to control one or more operational aspects of a fluid turbine and an associated generator. In some embodiments, a charge controller may include a user interface and/or features to protect against excessive voltage, current, and/or temperature. For example, the user interface may be associated one or more light emitting diodes or LEDs (e.g., to emit warning lights), speakers (e.g., to emit warning sounds), an electronic screen, and/or any other interface that may allow a user to interact with the charge controller.

A charge controller may be connected to an AC output of an electric energy generator connected to a fluid turbine. The AC-to-DC converter of the charge controller may convert the AC output to a DC signal (e.g., for aggregating with other DC signals produced by other charge controllers associated with other fluid turbines without incurring lossy interference). At least one voltage sensor switch of the charge controller (e.g., controlled by at least one processor) may transmit the DC signal to charge the battery bank when the DC voltage level is below an upper limit for the battery bank, and may divert the DC signal (e.g., excess DC power) to the dump load when the DC voltage level exceeds the upper limit. The voltage regulator may regulate the DC voltage transmitted to the battery bank to comply with one or more specifications, regulations, and/or recommendations associated with the battery bank.

An aggregate power signal may refer to a power signal produced by combining multiple electrical power signals originating from different power sources (e.g., energy generators) into a single, merged power signal. Aggregating power signals may require synchronizing the energy generators (e.g., synchronizing the frequency, the phase angle, and/or adjusting the voltage levels to reach a matched voltage level), and/or storing electrical energy of one or more power signals temporarily (e.g., in one or more capacitors and/or batteries). Once the power signals from each energy generator are synchronized and matched, the power signals may be combined using electrical devices such as power combiners or power distribution panels. The combined (e.g., aggregate) signal may be transmitted to an electrical grid or used to power a load.

An electrical grid (e.g., a power grid) may include an interconnected network delivering electric power (e.g., AC power) from a single or plurality of energy generators to a single or plurality of consumers. An electrical grid may be designed to supply electricity at a substantially steady voltage level under varying electrical power demand (e.g., by electrical energy sinks) and supply by (e.g., by energy generators). An electrical grid may use one or more tap changers or transformers to adjust a voltage and cause the voltage to remain within electrical grid specification. Attributes of power supplied to an electrical grid (e.g., frequency, phase, power level) by one or more energy generators may be required to comply with regulations or standards.

A signal may refer to information encoded for transmission via a physical medium. Examples of signals may include signals in the electromagnetic radiation spectrum (e.g., AM or FM radio, Wi-Fi, Bluetooth, radar, visible light, lidar, IR, Zigbee, Z-wave, and/or GPS signals), sound or ultrasonic signals, electrical signals (e.g., voltage, current, or electrical charge signals), electronic signals (e.g., as digital data), tactile signals (e.g., touch), and/or any other type of information encoded for transmission between two entities via a physical medium.

A detector may refer to a device that outputs an electronic signal in response to detecting, sensing, or measuring a physical phenomenon. A detector may convert a measurement of a physical phenomenon to a medium (e.g., an electronic medium) for receiving by at least one processor. A detector may include one or more of a mechanical sensor, an optical sensor, a resistive sensor, a capacitive sensor, a temperature sensor, a piezoelectric sensor, a Hall sensor, a thermocouple sensor, photoelectric sensor, a digital position sensor, a current sensor, a voltage sensor, a photoelectric encoder, a pressure sensor, a fluid (e.g., liquid) level sensors, a flow sensor, and/or any other type of sensor that may be used to detect position, linear displacement, pressure, temperature, flow, vibrations, rotational velocity, current, voltage, power, and/or any other parameter associated with, e.g., generation of electrical energy.

Tracking may include monitoring, observing, and/or recording, e.g., to observe a measured state of something over a time period. Tracking, in some instances, may additionally include adjusting, adapting, and/or updating one or more first parameters to maintain a correspondence between the one or more first parameters and a second parameter that may vary over time, e.g., in a feedback loop.

A controller (e.g., a charge controller) may enable maximum energy extraction by adjusting a shaft speed (e.g., corresponding to a rotational speed) of a fluid turbine in response to varying fluid speeds. The controller may adjust the shaft speed by sending an electrical signal to the copper windings of a generator rotor coupled thereto. The electrical signal may introduce an impedance (e.g., by shunting or shorting the copper windings) causing a rotational speed of the rotor to slow down, and causing a corresponding slowing of the fluid turbine coupled thereto for producing maximum power under varying fluid conditions. A charge controller may adjust a shaft speed by increasing or decreasing a load on an energy generator connected thereto. In some embodiments, the controller may include at least one processor.

Maximum Power Point Tracking (MPPT) refers to one or more techniques and/or protocols for using the maximum power available in a fluid flow to extract maximum power from a fluid energy conversion system (e.g., a fluid turbine mechanically coupled to an energy generator). Examples of MPPT protocols include Perturb and Observe (hill climbing method), Incremental Conductance, Fractional Short Circuit Current, Fractional Open Circuit Voltage, Fuzzy Control, Neural Network, Extremum Seeking Control, and Model Predictive Control, among others. Under a given fluid flow velocity, a fluid turbine may output differing levels of power, depending on a rotational velocity of the blades and/or rotor. One such rotational velocity may correspond to a maximum power output for a fluid turbine operating under a specific fluid flow velocity. Maintaining a rotational velocity of a fluid turbine to correspond to a peak power output when operating under a particular fluid flow velocity may improve efficiency of a fluid turbine system. However, under a varying fluid flow, a rotational velocity for a fluid turbine may vary accordingly. Thus, under varying fluid flow conditions, efficiency in energy production may be improved by a controller (e.g., a charge controller) dynamically adjusting a rotational velocity of a fluid turbine to achieve a rotational velocity corresponding to the maximum power output for a given fluid flow velocity at any given point in time. Such a technique may require a controller tracking a peak power output for a fluid turbine under varying fluid flow conditions, and continuously adjusting a rotational velocity to correspond to the peak power output at any particular point in time (e.g., using an MPPT protocol).

Inaccuracy in tracking a peak power output for a fluid turbine may cause a controller to adjust a fluid turbine to rotate at a sub-optimal rotational velocity.

An MPPT protocol (e.g., for a single fluid turbine) may involve transmitting signals to adjust a rotational speed of a single fluid turbine by adjusting a load, adjusting a brake (e.g., a mechanical and/or electronic brake), and/or using any other method to adjust a rotational speed of a single fluid turbine. In some embodiments, an MPPT protocol for a single fluid turbine may involve increasing a load on an energy generator connected thereto and/or sending a signal to the energy generator to output a maximum (e.g., or near-maximum) energy at a point in time.

An MPPT protocol (e.g., for a cluster of fluid turbines) may involve at least one processor adjusting a rotational speed of at least some fluid turbines in a cluster of geographically-associated fluid turbines to cause the cluster to output a maximum (e.g., or near-maximum) aggregate power output at a point in time and/or under certain fluid conditions. In some embodiments, implementing an MPPT protocol for a cluster of fluid turbines may include at least one processor transmitting at least some signals associated with applying an MPPT protocol (e.g., for a single fluid turbine) to at least some individual fluid turbines in the cluster, and at least some signals unassociated with applying an MPPT protocol (e.g., for a single fluid turbine) to any individual fluid turbine in the cluster. In some instances, implementation of an MPPT protocol for a cluster of fluid turbines may override one or more signals associated with an MPPT protocol for a single fluid turbine in the cluster. In some embodiments, a charge controller may include at least one processor to implement an MPPT protocol on a fluid turbine connected thereto.

Some MPPT protocols may require one or more inputs, such as the fluid speed, a rotational speed of the fluid turbine (e.g., rotor speed), a maximum power curve for a fluid turbine, or a mechanical power equation for a fluid turbine (e.g., obtained experimentally or via a simulation).

MPPT protocols for fluid turbines may be based on direct and/or indirect power measurement, fluid speed measurement, and/or hybrid and/or smart algorithms (e.g., based on artificial intelligence techniques such as neural networks and fuzzy logic controllers) for tracking a maximum power point of a specific fluid turbine. Some MPPT protocols for fluid turbines may employ one or more fluid speed sensors (e.g., anemometers, ultrasonic fluid sensors), such as a Tip Speed Ratio (TSR) protocol, or a power signal feedback (PSF) protocol, described in greater detail below. Some MPPT protocols for fluid turbines may avoid using fluid speed sensors, such as a perturb and observe (P&O) protocol, an optimal relation based (ORB) protocol, or an incremental conductance (INC) protocol. Some MPPT techniques may combine one or more MPPT protocols (e.g., hybrid techniques) and/or additional techniques (e.g., statistical techniques and/or equations).

For example, a Tip Speed Ratio (TSR) Based MPPT protocol may use the ratio between a fluid speed and the rotational speed of the blade tips of a fluid turbine to regulate the rotational speed of an energy generator coupled thereto to maintain the TSR of the fluid turbine at an optimum value for extracting maximum power. In addition to the fluid speed and turbine rotational speed, a TSR protocol may require the optimum TSR of the fluid turbine as an input and/or a fluid parameter measurement.

As another example, a power signal feedback (PSF) protocol may be used to control a fluid turbine to extract maximum power from a fluid flow. A reference power level may be generated using a recorded maximum power curve or a mechanical power equation for the fluid turbine. The curve may be tracked for varying fluid speeds to control the fluid turbine to output maximum power.

As an additional example, a Perturb and Observe (e.g., hill-climb search, or HCS) control protocol may continuously track a power output of a fluid turbine to search for a peak power output. Applying a Perturb and Observe protocol may involve reading a power outputted by a fluid turbine under certain conditions, increasing a load causing a rotational velocity of a fluid turbine to slow, and reading power outputted by the fluid turbine while rotating at the slower rotational velocity at the same wind speed, to thereby determine if power outputted at the slower rotational velocity is greater or less than power outputted prior to increasing the load. An HCS tracking protocol may compute a desired optimum signal for operating a fluid turbine to generate a peak power output based on the location of the operating point and the relation between changes in power and speed.

A brake may refer to a device configured to adjust (e.g., slow) a rotational speed of a fluid turbine and/or an energy generator connected thereto. A brake may include a mechanical brake and/or an electronic brake. A mechanical brake may include one or more brake pads, disks, and/or drums, e.g., activated via a switch. In some embodiments, a mechanical brake may include a lock, such as a pin configured to engage and hold a brake. An electronic brake may include a switch configured to introduce and/or remove a load (e.g., a dump load) imposed on a fluid turbine.

Receiving may include retrieving, acquiring, or otherwise obtaining, e.g., data. Receiving may include reading data from memory and/or receiving data from a computing device via a (e.g., wired and/or wireless) communications channel. At least one processor may receive data via a synchronous and/or asynchronous communications protocol, for example by polling a memory buffer for data and/or by receiving data as an interrupt event.

A threshold may include a baseline, a limit (e.g., a maximum or minimum), a starting point, and/or an end point for a measurable quantity. In some embodiments, a threshold may additionally include a tolerance above and/or below a value for a threshold.

Determining may include making a measurement, comparison, estimation, and/or calculation to arrive at a conclusive outcome.

To store may include to accumulate and/or collect in reserve, e.g., for future use.

Machine learning may refer to a branch of artificial intelligence utilizing algorithms to navigate through large collections of data in an iterative manner to converge to a solution. Machine learning may include supervised learning, unsupervised learning, and reinforcement learning. Supervised learning may use annotated (e.g., tagged) data sets, whereas unsupervised learning may use unclassified (e.g., non-annotated) data sets. Reinforcement learning may occur in an absence of data, and may use trial-and-error, and environmental feedback to reach a conclusion.

In some embodiments, machine learning algorithms (also referred to as machine learning models) may be trained using training examples. Some non-limiting examples of such machine learning algorithms may include classification algorithms, data regressions algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may include shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long/short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

To smooth may include to level and/or even out (to some degree), e.g., by offsetting peaks and troughs. To smooth power delivered to an electrical grid may include augmenting lower than average power level supplied to an electrical grid with stored power and/or diverting power exceeding electrical grid requirements to cause a reduction in variability of power delivered to an electrical grid over time.

Intermittent may include periodically, occasionally, and/or in a recurring manner with periods of discontinuity.

Regulating may include monitoring, controlling, adjusting, supervising, and/or maintaining. Regulating may include receiving measurements associated with one or more operating parameters, determining, based on one or more measurements, a signal configured to adjust one or more operating parameters, and/or transmitting a signal for adjusting one or more operating parameters (e.g., as feedback in an iterative process to cause a one or more operational parameters to converge to a baseline or threshold).

Reference is made to FIG. 1 illustrating a variety of exemplary fluid turbines 100 to 112. Fluid turbine 100 may be an exemplary vertical wind turbine, fluid turbine 102 may be an exemplary horizontal wind turbine, fluid turbine 104 may be an exemplary water, gas, or steam turbine, fluid turbine 106 may be an exemplary Savonius (e.g., vertical) wind turbine, fluid turbine 108 may be an exemplary Darrieus-rotor (e.g., vertical) wind turbine, fluid turbine 110 may be an exemplary H-type lift vertical wind turbine, and fluid turbine 112 may be an exemplary Helix (e.g., vertical) wind turbine. It is to be noted that exemplary fluid turbines 100 to 112 are shown for illustrative purposes and are not intended to limit the disclosure to any particular type or implementation of a fluid turbine because inventive principles described herein may be applied to any turbine or turbine cluster, regardless of structure or arrangement. Moreover, while some non-limiting examples may refer to any one of fluid turbines 100-112, these examples are provided for conceptual purposes only and do not limit the disclosure to any particular implementation or type of fluid turbine.

Figure 2A:
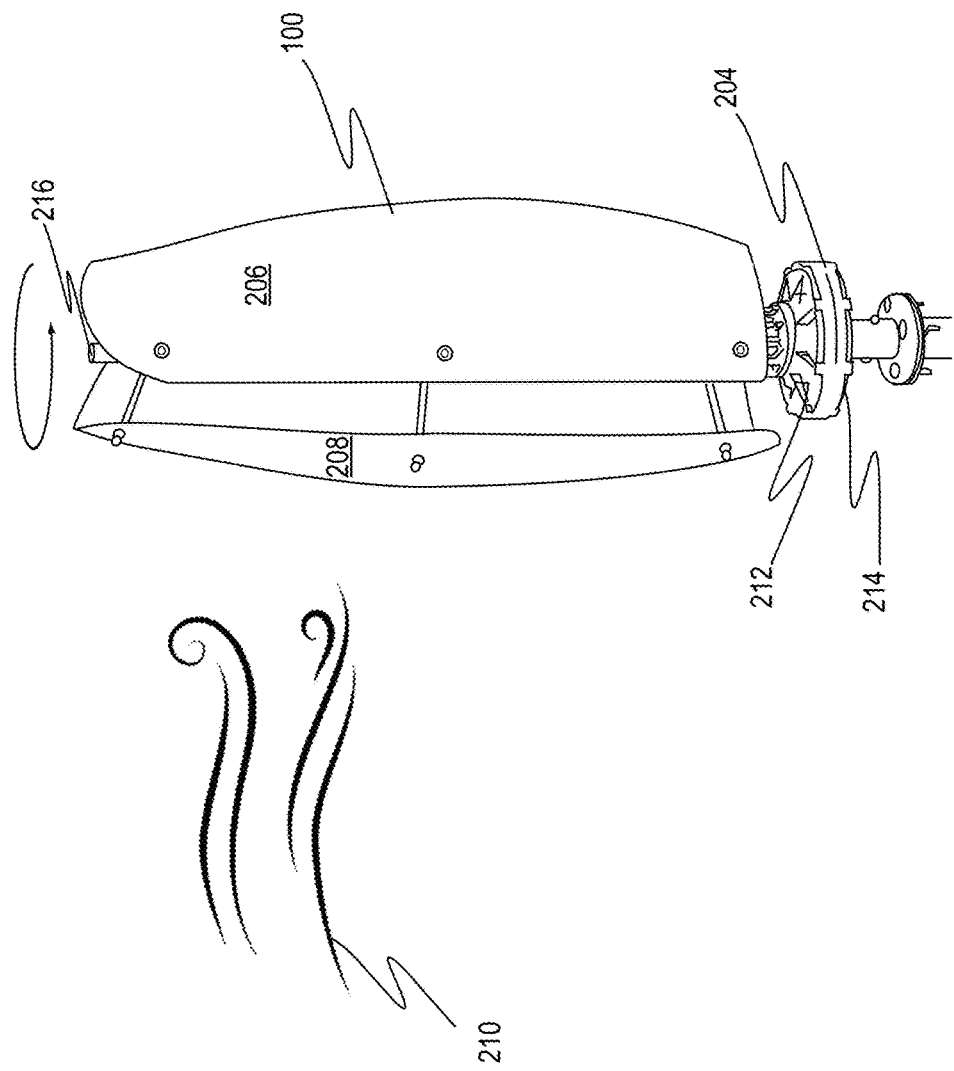
FIG. 2A is a view of a fluid energy conversion system including a fluid turbine coupled to an energy generator, consistent with some embodiments of the present disclosure.

FIG. 2A is a view of an exemplary fluid energy conversion system including a fluid turbine 100 coupled to an energy generator 204, consistent with some embodiments of the present disclosure. Fluid turbine 100 may include a plurality of blades 206 and 208 configured to spin about a shaft 216 in response to a fluid flow 210. Energy generator 204 may include a rotor 212 and a stator 214, together housing one or more permanent magnets and copper windings (e.g., the rotor may include the magnets and the stator may include the copper windings, or the reverse). Energy generator 204 may be configured to induce an alternating current (AC) when rotor 212 rotates relative to stator 214 (e.g., by generating a fluctuating magnetic field to surround the copper windings from the rotational motion). Kinetic energy contained in fluid flow 210 may exert a force on fluid turbine 100 causing blades 206 and 208 to rotate. The rotational motion of blades 206 and 208 may cause rotor 212 of energy generator 204 to spin relative to stator 214, generating an alternating current, thereby converting the kinetic energy of fluid flow 210 to electrical energy. Although fluid turbine 100 is illustrated as a vertical-axis wind turbine and fluid flow 210 is shown as air flow, this example is not intended to be limiting, and fluid turbine 100 may be a horizontal-axis wind turbine, a water turbine, a gas turbine, or a steam turbine. Similarly, fluid flow 210 may be water, gas, or steam, respectively.

Figure 2C:
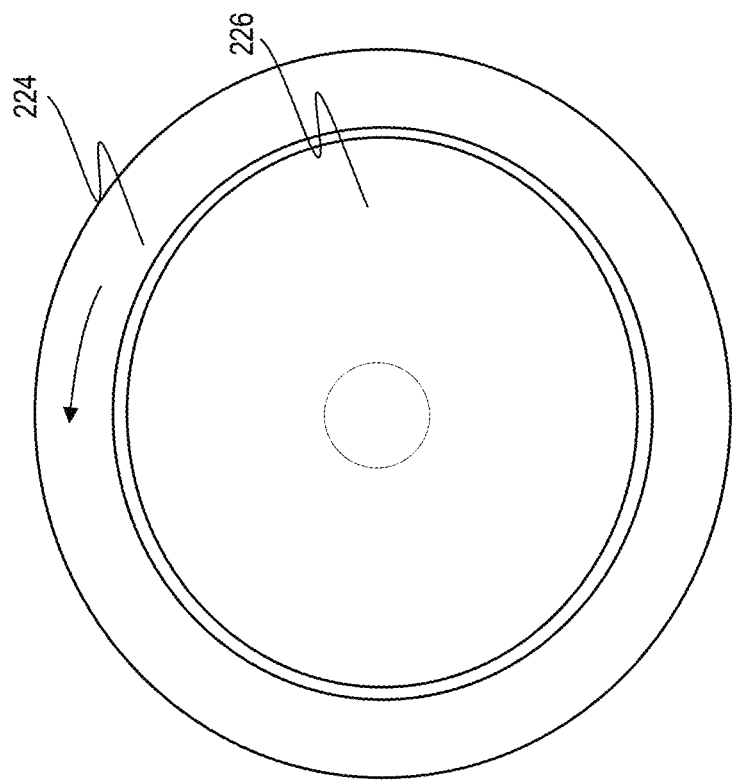
FIG. 2C exemplary top view of a fluid energy conversion system including an outer rotor and an inner stator, consistent with some embodiments of the present disclosure.
Figure 2B:
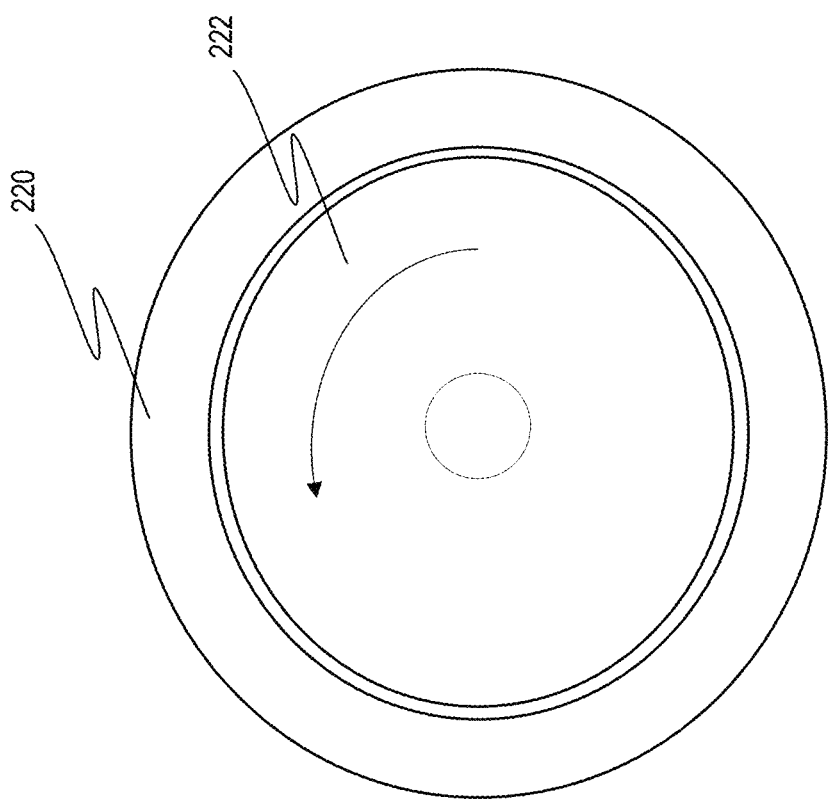
FIG. 2B is an exemplary top view of a fluid energy conversion system including an outer stator and an inner rotor, consistent with some embodiments of the present disclosure.

FIG. 2B illustrates an exemplary top view of a fluid energy conversion system including an outer stator 220 and an inner rotor 222, consistent with some embodiments of the present disclosure. Inner rotor 222 may be mechanically coupled to rotatable shaft 216 of fluid turbine 100. Inner rotor 222 may include one or more permanent magnets and outer stator 220 may include copper windings, such that when inner rotor 222 rotates due to a rotation of shaft 216 of fluid turbine 100 connected thereto, copper windings of outer stator 220 may be exposed to a fluctuating magnetic field, thereby inducing an AC signal.

FIG. 2C illustrates an exemplary top view of a fluid energy conversion system including an outer rotor 224 and an inner stator 226, consistent with some embodiments of the present disclosure. Outer rotor 224 may be mechanically coupled to rotatable shaft 216 of fluid turbine 100. Outer rotor 224 may include one or more permanent magnets and inner stator 226 may include copper windings, such that when outer rotor 224 rotates due to a rotation of shaft 216 of fluid turbine 100 connected thereto, copper windings of inner stator 226 may be exposed to a fluctuating magnetic field, thereby inducing an AC signal.

Figure 3:
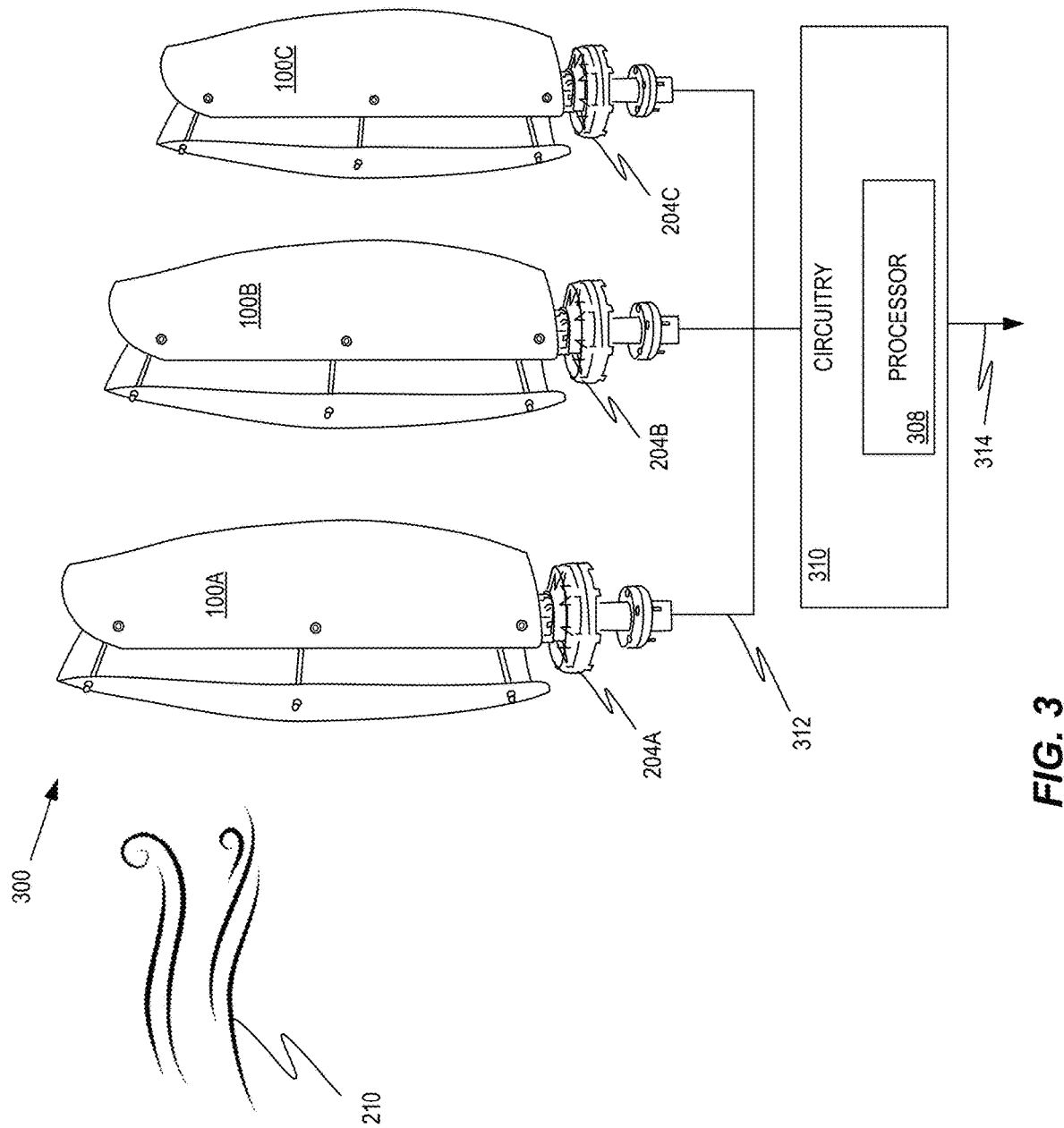
FIG. 3 is a view of an exemplary cluster of geographically associated fluid turbines, consistent with some embodiments of the present disclosure.

FIG. 3 illustrates a view of an exemplary cluster 300 of geographically associated fluid turbines 100A, 100B, and 100C, consistent with some embodiments of the present disclosure. Geographically associated fluid turbines 100A, 100B, and 100C may be connected to at least one processor 308 via circuitry 310 and one or more communication links 312. Communication links 312 may include differing types of wired communication links (e.g., wires, cables, fibers) and/or wireless communication links (e.g., WiFi, BlueTooth, Zigbee, AM, FM, PM radio transceivers, satellite or GPS transceivers, IR transceivers, ultrasound transceivers, and/or any other type of wireless communications links). Communications links may include high power communication links, e.g., for receiving electric power generated by fluid turbines 100A, 100B, and 100C, and/or for sending a load-bearing signal to fluid turbines 100A, 100B, and 100C, as well as lower power communication links, e.g., for sending and receiving data between a plurality of processors and/or sensors.

At least one processor 308 may be configured to control each of fluid turbines 100A, 100B, and 100C separately or coordinate operation of each of fluid turbines 100A, 100B, and 100. For example, at least one processor 308 may coordinate operations such as braking, slowing, stopping, locking, unlocking, and/or starting one or more of fluid turbines 100A, 100B, and 100C. As another example, at least one processor 308 may control a rotational direction and/or speed for any of fluid turbines 100A, 100B, and 100C, implement an MPPT algorithm for one or more of fluid turbines 100A, 100B, and 100C, control a relative rotational phase between any of fluid turbines 100A, 100B, and 100C, and/or perform any other procedure to coordinate operations for one or more of fluid turbines 100A, 100B, and 100C. At least one processor 308 may include one or more individual processors, each dedicated to control one of fluid turbines 100A, 100B, 100C, and/or one or more processors dedicated to control fluid turbines 100A, 100B, 100C collectively as cluster 300, operating as a single integral energy conversion system. In some embodiments, at least one processor 308 may be associated with a charge controller, as described and exemplified herein below. While cluster 300 is shown having three fluid turbines, this is for illustrative purposes only, and cluster 300 may include as few as two fluid turbines, or more than three fluid turbines. Moreover, FIG. 3 shows fluid turbines 100A, 1006, and 100C as vertical wind turbines (e.g., corresponding to fluid turbine 100 of FIG. 1). However, this is for illustrative purposes only and is not intended to limit this disclosure to any specific implementation. Cluster 300 may include different types of fluid turbines, e.g., other than fluid turbine 100, such as one or more horizontal wind turbines, as well as one or more water, steam, and/or gas turbines. It bears repeating that although the discussion of FIG. 3 occurs in connection with the example turbine structures illustrated, the principles described in FIG. 3 apply to all turbines, regardless of turbine structure.

Figure 4:
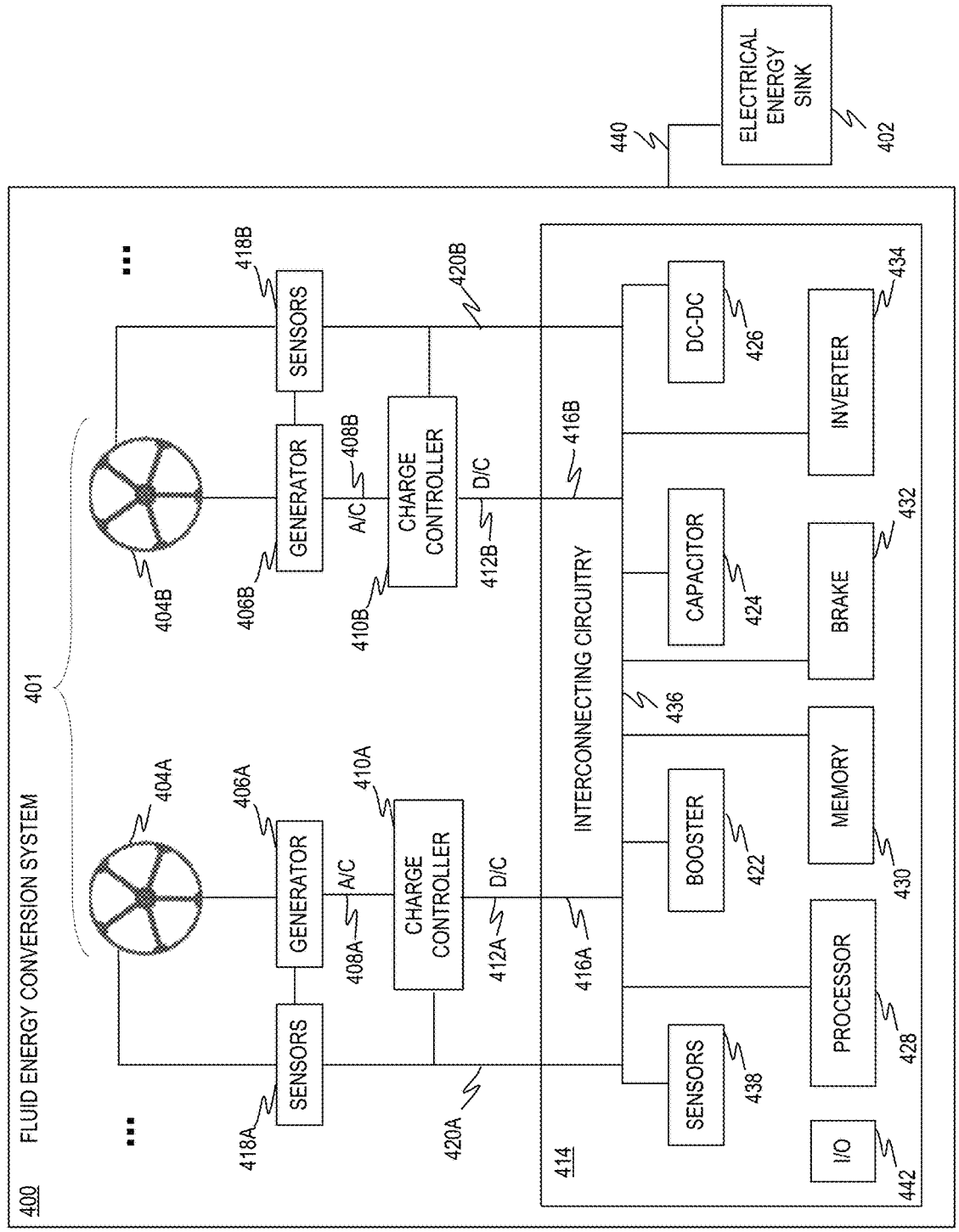
FIG. 4 is a schematic diagram of an exemplary fluid energy conversion system configured to generate electric power from a fluid flow and output the generated electric power to an energy sink, consistent with some embodiments of the present disclosure.

FIG. 4 illustrates a schematic diagram of an exemplary fluid energy conversion system 400 configured to generate electric power from a fluid flow and output the generated power to an energy sink 402, consistent with some embodiments of the present disclosure. Fluid energy conversion system 400 may include a plurality (e.g., a cluster) 401 of geographically-associated fluid turbines 404 (e.g., fluid turbines 404A and 404B). Each of fluid turbines 404A and 404B may be connected to energy generators 406 (e.g., electric energy generators 406A and 406B), respectively, for converting energy in a fluid flow (e.g., fluid flow 210 shown in FIG. 2) to electric power (e.g., a total electric power output 440) for at least one energy sink 402 (e.g., a load). Total electrical power output 440 may include a DC power output, e.g., for powering a battery bank, or an AC power output, e.g., for delivery to an electric grid. In some embodiments, a portion of total electrical power output 440 may be delivered as a DC signal to charge one or more batteries, and a portion of total electrical power output 440 may be delivered as an AC signal to an electrical grid. In some embodiments, a portion of total electrical power output 440 may be delivered as DC electrical energy to power circuitry for controlling one or more elements of fluid energy conversion system 400, such as control circuitry associated with fluid turbines 404 and/or energy generators 406. Fluid turbines 404A and 404B may be any fluid turbine, including but not limited to the various exemplary turbines illustrated in FIG. 1. Examples of an energy sink may include an electric power grid, one or more batteries, and/or any other sink for electric power. Energy generators 406A and 406B may convert mechanical rotational energy received from fluid turbines 404A and 404B to a plurality of AC power outputs 408 (e.g., AC power outputs 408A and 408B). Each of fluid turbines 404A and 404B and electric energy generators 406A and 406B may be associated with a charge controller 410 (e.g., charge controllers 410A and 410B), respectively. AC power outputs 408A and 408B may be converted to DC signals 412 (e.g., DC signals 412A and 412B) via charge controllers 410 (e.g., charge controllers 410A and 410B), respectively. Charge controller 410 may include electronic circuitry such as one or more of a rectifier (e.g., an AC-to-DC converter), a voltage sensor switch, a dump load, a braking circuit, a capacitor, and/or a voltage booster. DC signals 412A and 412B may be conveyed to interconnecting circuitry 414 via a plurality of links 416 (e.g., links 416A and 416B). Links 416A and 416B may include one or more of coaxial cables, fiber, and/or wires configured to transmit power signals.

Charge controllers 410A and 410B may transmit one or more electronic signals to interconnecting circuitry 414 via communications links 420 (e.g., communications links 420A and 420B). Communications links 420A and 420B may include one or more wired and/or wireless communication channels configured to transmit and receive electronic signals between at least one processor 428 and charge controllers 410A and 4106.

Each of fluid turbines 404A and 404B and electric energy generators 406A and 406B may be associated with at least one sensor 418 (e.g., at least one sensor 418A and 418B), described in greater detail below. Sensor 418 may connect to fluid turbine 404 and/or energy generator 406, e.g., to sense one or more operational parameters associated with fluid turbine 404 and/or energy generator 406 connected thereto. Sensor 418 may connect to charge controller 410. For example, at least one sensor 418A may connect to fluid turbine 404A and/or energy generator 406A and charge controller 410A, and at least one sensor 4186 may connect to fluid turbine 404B and/or energy generator 406B and charge controller 4106.

Interconnecting circuitry 414 may include at least one sensor 438, at least one booster (e.g. voltage boosters) 422, at least one capacitor 424, at least one DC-DC converter 426, at least one processor 428, at least one memory 430, at least one brake circuit 432, and/or at least one inverter 434, interconnected via a communications link 436. In some embodiments, inverter 434 may be a single inverter configure to convert aggregated DC power produced by plurality of geographically-associated fluid turbine 404 to a grid-compatible AC signal (e.g., 110V, 120V, 220V, 240V, or any other voltage level compatible with a regional electric power grid). One non-limiting example of an inverter that may be employed is an IQ7 Plus manufactured by Enphase Energy, Inc. of Fremont California.

Figure 5:
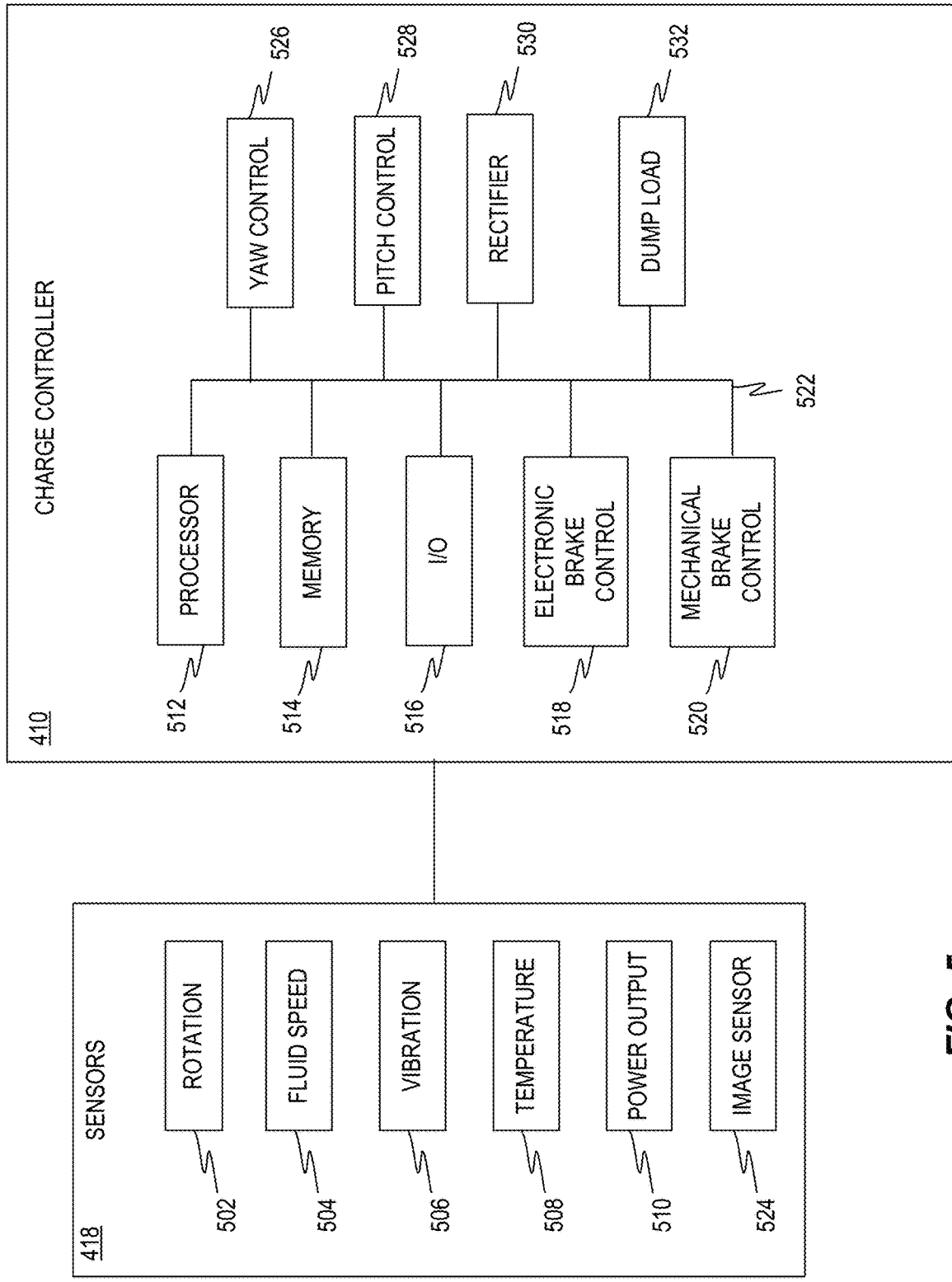
FIG. 5 is an exemplary schematic diagram of a charge controller connected to at least one sensor, consistent with some embodiments of the present disclosure.

FIG. 5 illustrates an exemplary schematic diagram of a charge controller 410 connected to at least one sensor 418, consistent with some embodiments of the present disclosure. At least one sensor 418 may include one or more rotation sensors 502, fluid speed sensors 504, vibration sensors 506, temperature sensors 508, power output sensors 510, and/or image sensors 524. The one or more rotation sensors 502 may be associated with a rotating component of fluid turbine 404 and/or energy generator 406, such as with one or more blades and/or a shaft of fluid turbine 404, and/or a rotor of energy generator 406. Fluid speed sensor 504 may be configured to sense a speed of a fluid flow affecting fluid turbine 404. Examples of fluid speed sensor 504 may include one or more of an anemometer, a water current sensor, a gas flow meter, and/or a steam flow meter for sensing. Vibration sensor 506 may include as examples one or more accelerometers, piezoelectric, piezoresistive, and/or capacitive MEMS for sensing vibrations of one or more components of fluid turbine 404 and/or energy generator 406. Temperature sensor 508 may include, for example, a thermometer, a thermostat, a thermocouple, a thermopile, an infrared thermometer, a bimetallic strip thermometer, or any other type of temperature measurement device. Power output sensor 510 may include, for example, a volt meter (e.g., a voltage sensor) and/or a current meter (e.g., a current sensor) for measuring power generated by energy generator 406. One or more image sensors 524 may include one or more cameras (e.g., a charged coupled device or CCD camera, and/or a CMOS camera for detecting visible light and/or an IR camera).

Charge controller 410 may include one or more of at least one processor 512, a memory 514, a device for input/output (I/O) 516 (e.g., for communicating with at least one processor 428 via communications link 420), an electronic brake control 518, a mechanical brake control 520, a yaw control 526, a pitch control 528, a rectifier 530, and/or a dump load 532. At least one processor 512, memory 514, I/O 516, electronic brake control 518, mechanical brake control 520, yaw control 526, pitch control 528, rectifier 530, and dump load 532 may be interconnected via bus system 522. In some embodiments, dump load 532 may correspond to a battery bank.

In some embodiments, dump load 532 may include a plurality of dump loads of different resistances. At least one processor 512 may switch between each of the plurality of dump loads to cause a corresponding adjustment to a rotational velocity of an associated fluid turbine and generator (e.g., to cause a fluid turbine to comply with an MPPT protocol). Additionally or alternatively, dump load 532 may include a variable electronic load (e.g., an electromechanical potentiometer and/or using one or more solid state transistors as an electronic load) allowing at least one processor 512 to adjust a load applied to a fluid generator, e.g., to comply with an MPPT protocol. In some embodiments, dump load 532 may include a plurality of dump loads of different resistances and a variable electronic load, providing at least one processor 512 with flexibility to tune a load applied to a fluid turbine, e.g., to comply with an MPPT protocol.

In some embodiments, a clock (e.g., of at least one processor) may be used as a sensor, e.g., to schedule a maintenance or safety procedure, and/or to synchronize operation of fluid turbine 404. In some embodiments, a clock may be used in conjunction with scheduling software to issue alerts (e.g., signals) to invoke braking, slowing, stopping, locking, and/or unlocking of a fluid turbine by at least one processor. In some embodiments, at least one processor 512 associated with charge controller 410 may correspond to at least one processor 308 (see FIG. 3).

Electronic brake control 518 may include an inverter and a booster, e.g., to implement an electronic braking mechanism. For example, electronic braking of fluid turbine 404 may be implemented by imposing a load (e.g., impedance) on energy generator 406. In some embodiments, electronic braking may be implemented with an AC signal. At least one processor (e.g., at least one processor 428 and/or processor 512) may determine an AC signal configured to impose a specific load to achieve a desired level of braking, e.g., by causing interference with another AC signal. In some embodiments, electronic braking may be implemented with a DC signal, e.g., to cause a switch to divert a power output of a generator to a dump load. The at least one processor may transmit a DC signal to electronic brake control 518 of charge controller 410. Electronic brake control 518 may use the DC signal to produce an AC signal, and the booster of electronic brake control 518 may amplify the AC signal to a level corresponding to the AC signal suitable for imposing a specific load on energy generator 406. The amplified AC signal may be transmitted to a rotor of energy generator 406 to impose the load and thereby control (e.g., by slowing and/or stopping) fluid turbine 404. For example, the AC signal may be used to implement an MPPT protocol, engage an electronic brake, adjust a phase of fluid turbine 404 (e.g., by slowing one fluid turbine relative to another fluid turbine), adjust a rotational speed, adjust a rotational direction, and/or to perform any other controlling operation on fluid turbine 404.

Mechanical brake control 520 may include one or more electronic switches allowing at least one processor (e.g., at least one processor 428 and/or processor 512) to control one or more mechanical brakes (e.g. brake pads, disks, and/or drums) configured with one or more rotating components of fluid turbine 404 and/or energy generator 406.

In some embodiments, electronic braking of fluid turbines 404 may be implemented by charge controllers 410, e.g., by diverting power produced by energy generators 406 to a dump load.

In some embodiments, charge controller 410 may be associated with an isolated fluid turbine (e.g., fluid turbine 100). In some embodiments, a different one of charge controllers 410 may be associated with each fluid turbine (e.g., turbines 100A, 1006, and 100C) in a cluster of fluid turbines 300.

Figure 6:
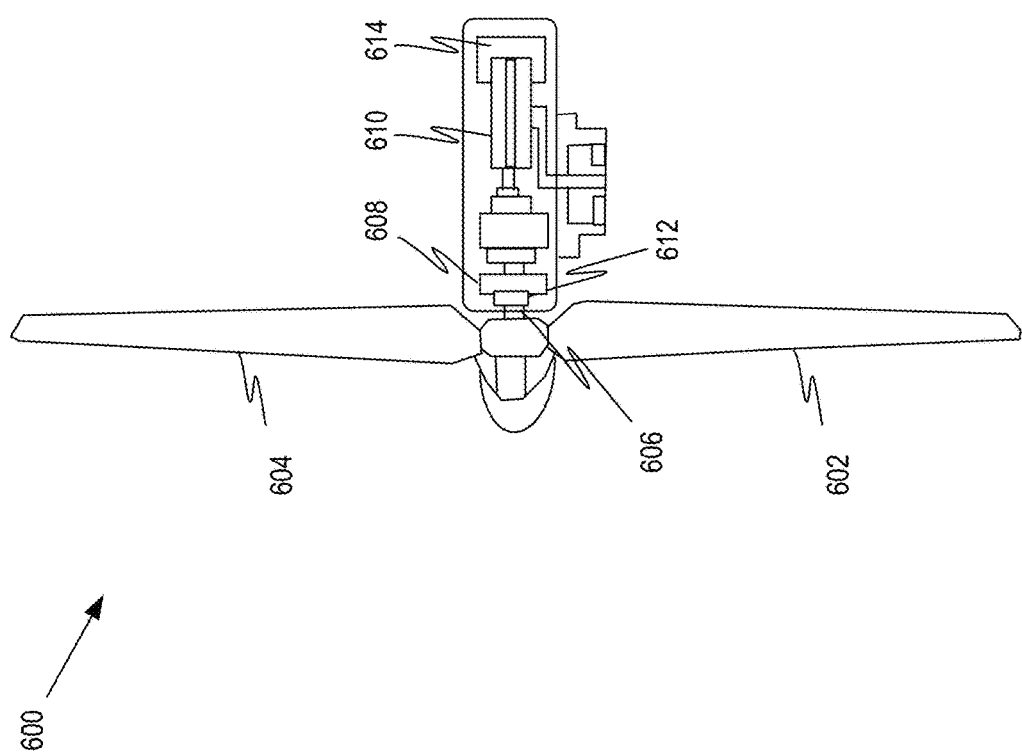
FIG. 6 is a top view of an exemplary fluid turbine configured with at least one mechanical brake, consistent with some embodiments of the present disclosure.

FIG. 6 illustrates a top view of an exemplary fluid turbine 600 configured with at least one mechanical brake, consistent with some embodiments of the present disclosure. Fluid turbine 600 may include blades 602 and 604 connected to a rotatable shaft 606, at least one mechanical brake 608, an energy generator 610, at least one lock 612, and a charge controller 614 (e.g., corresponding to charge controller 410). Energy generator 610 may be connected to rotatable shaft 606 for converting rotational mechanical energy by blades 602 and 604 to electric power. Charge controller 614 may be connected to one or more of energy generator 610, rotatable shaft 606, blades 602 and 604, at least one mechanical brake 608, and at least one lock 612. At least one mechanical brake 608 and/or at least one lock 612 may operate on any rotatable component associated with fluid turbine 600, such as rotatable shaft 606, a rotor of energy generator 610, and/or blades 602 and 604 (e.g., although at least one mechanical brake 608 and lock 612 are shown in FIG. 6 to operate on shaft 606, this is for illustrative purposes only and does not limit the disclosure to any specific implementation). At least one processor (e.g., at least one processor 512 and/or processor 428) may control a level of engagement and/or disengagement of at least one mechanical brake 608 and at least one lock 612 by sending signals to mechanical brake control 520 for controlling one or more switches configured to control a level of engagement and/or disengagement of at least one mechanical brake 608 and or at least one lock 612.

Charge controller 614 may receive signals from one or more sensors (e.g., at least one sensor 418) associated with fluid turbine 600 (e.g., including rotatable shaft 606, blades 602 and 604, at least one mechanical brake 608, and/or at least one lock 612) and/or energy generator 610. The one or more signals may be received by the at least one processor to determine operating parameters associated with fluid turbine 600. For instance, the at least one processor may use the signals to communicate with charge controller 614 to engage or disengage electronic braking and/or to communicate with at least one mechanical brake 608 to engage or disengage mechanical braking. While a braking system is described above with reference to fluid turbine 600, this is for illustrative purposes only. The braking system principles described herein are intended to apply to all fluid turbines, including but not limited to the turbines illustrated in FIG. 1.

Figure 7:
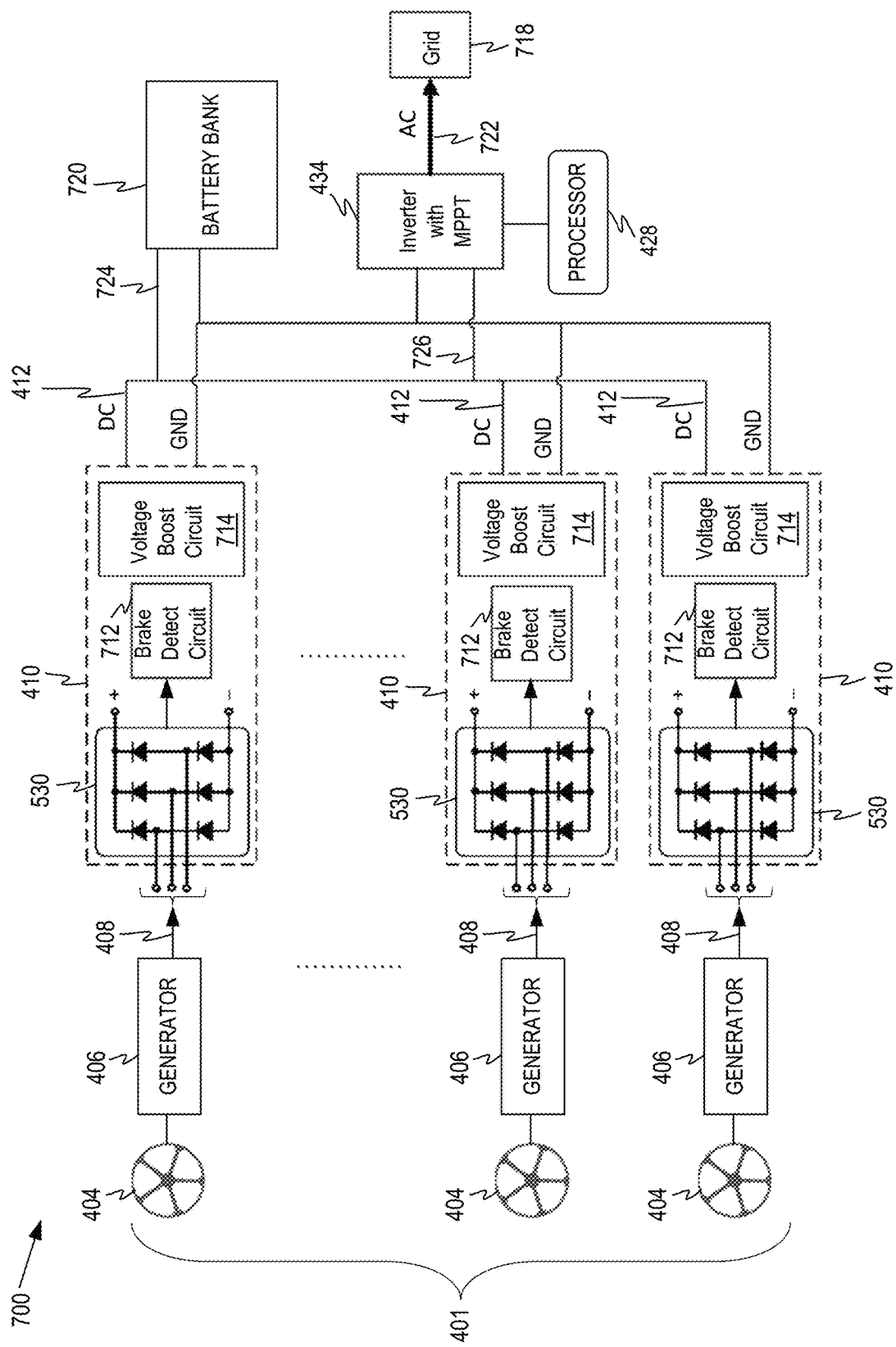
FIG. 7 is a schematic diagram of an exemplary circuit for controlling a plurality of geographically-associated fluid turbines, consistent with some embodiments of the present disclosure.

By way of a non-limiting example, FIG. 7 illustrates a schematic diagram of an exemplary circuit 700 for controlling a plurality 401 of geographically-associated fluid turbines 404, consistent with some embodiments of the present disclosure. Exemplary circuit 700 may be understood in conjunction with FIGS. 4 and 5. Fluid turbines 404 (throughout this disclosure including as described in connection with FIGS. 7-11) may be any fluid turbine, including but not limited to the various exemplary fluid turbines illustrated in FIG. 1. Fluid turbines 404 may be geographically-associated as cluster 401. Each of fluid turbines 404 may be connected to an energy generator 406 for converting energy in a fluid flow to an AC power output. Each of AC power outputs 408 may be connected to a charge controller 410. Each charge controller 410 may include at least a rectifier 530, a brake circuit 712 (e.g., including a brake detection circuit), and a voltage booster 714. Rectifier 530 may convert AC power outputs 408 to DC signals, and may transmit the DC signals to brake circuit 712 and voltage booster 714. Brake circuit 712 may be configured to perform electronic braking on fluid turbine 404 (e.g., based on information received from one or more of at least one sensor 418). In some embodiments, each charge controller 410 may be configured to implement an MPPT protocol on energy generator 406 connected thereto. Each of charge controllers 410 may be connected (e.g., in parallel) to an inverter 434, which may be connected to an electrical grid 718 (e.g., corresponding to energy sink 402). Charge controllers 410 may deliver AC power signals to inverter 434, and inverter 434 may convert an aggregate of the AC power signals to an aggregate AC power signal 722. Inverter 434 may be associated with at least one processor (e.g., at least one processor 428 of FIG. 4). In some embodiments, inverter 434 (e.g., via at least one processor configured therewith) may be configured to implement an MPPT protocol on fluid turbines 404, e.g., by manipulating a load associated with electrical grid 718. For example, increasing the load may cause rotational speeds of fluid turbines 404 to slow down, and decreasing the load may cause the rotational speeds of fluid turbines 404 to increase. Thus, in some embodiments, a single inverter 434 may be configured to implement an MPPT protocol on multiple fluid turbines 404 via multiple charge controllers 410. In some embodiments, inverter 434 and electrical grid 718 may be replaced by a battery bank 720.

Figure 8:
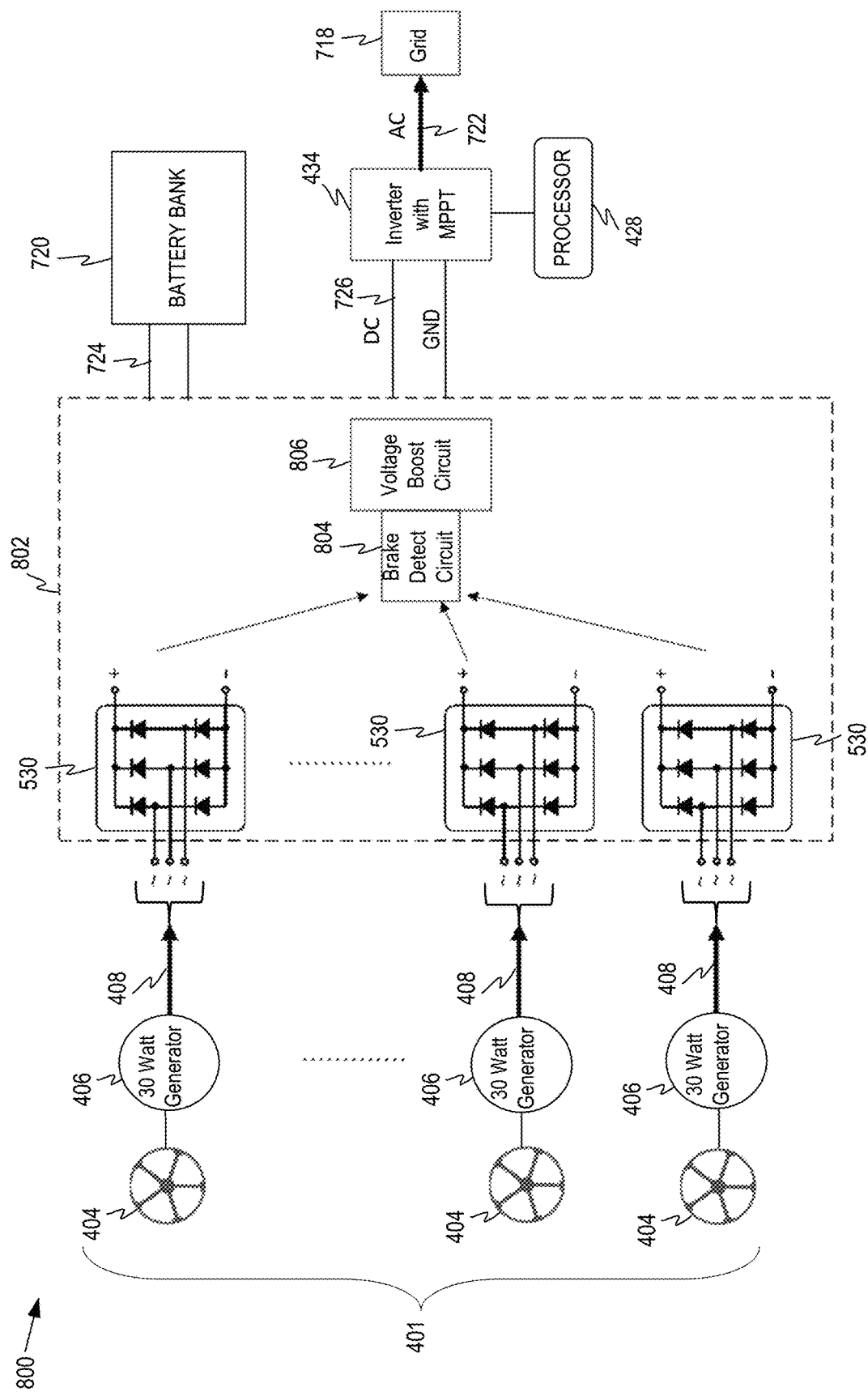
FIG. 8 is another schematic diagram of an exemplary circuit for controlling a plurality of geographically-associated fluid turbines, consistent with some embodiments of the present disclosure.

By way of another non-limiting example, FIG. 8 illustrates a schematic diagram of an exemplary circuit 800 for controlling a plurality of geographically-associated fluid turbines 404, consistent with some embodiments of the present disclosure. Circuit 800 may be substantially similar to circuit 700 (e.g., in conjunction with FIGS. 4 and 5) with the noted difference of a common (e.g., shared) charge controller 802 associated with multiple rectifiers 530 for each of energy generators 406. Each of energy generators 406 may be connected to common charge controller 802 via multiple wires (e.g. three wires for each of three phases of the output AC power signal). Each of rectifiers 530 may be connected (e.g., via two wires) to a common brake circuit 804 (e.g., including at least a braking sensor). Common brake circuit 804 may be connected to a common voltage booster 806 (e.g., a single voltage booster for all of fluid turbines 404). Charge controller 802 (e.g., common to all of fluid turbines 404) may be connected to inverter 434 for outputting AC power to electrical grid 718. Thus, a common or shared charge controller 802 may connect multiple fluid turbines 404 to a single inverter 434 via multiple rectifiers 530 (e.g., one rectifier per fluid turbine 404). In some embodiments, inverter 434 may be configured to implement an MPPT protocol on each of fluid turbines 404 via rectifiers 530. In some embodiments, a cable may connect each energy generator 406 to single charge controller 410, due to relatively low power loss of a three-phase AC output. This may be advantageous when fluid turbines 404 are spread out over a large region (e.g., when the distance between any two of fluid turbines 404 is at least greater than a blade diameter for each fluid turbine, and/or when the cluster of turbines includes many fluid turbines). Circuit 800 may lack an MPPT control, may include an individual MPPT control for each fluid turbine 404, or may include a centralized MPPT control for the plurality of geographically associated fluid turbines 404, e.g., operating as a single fluid energy conversion system.

Figure 9:
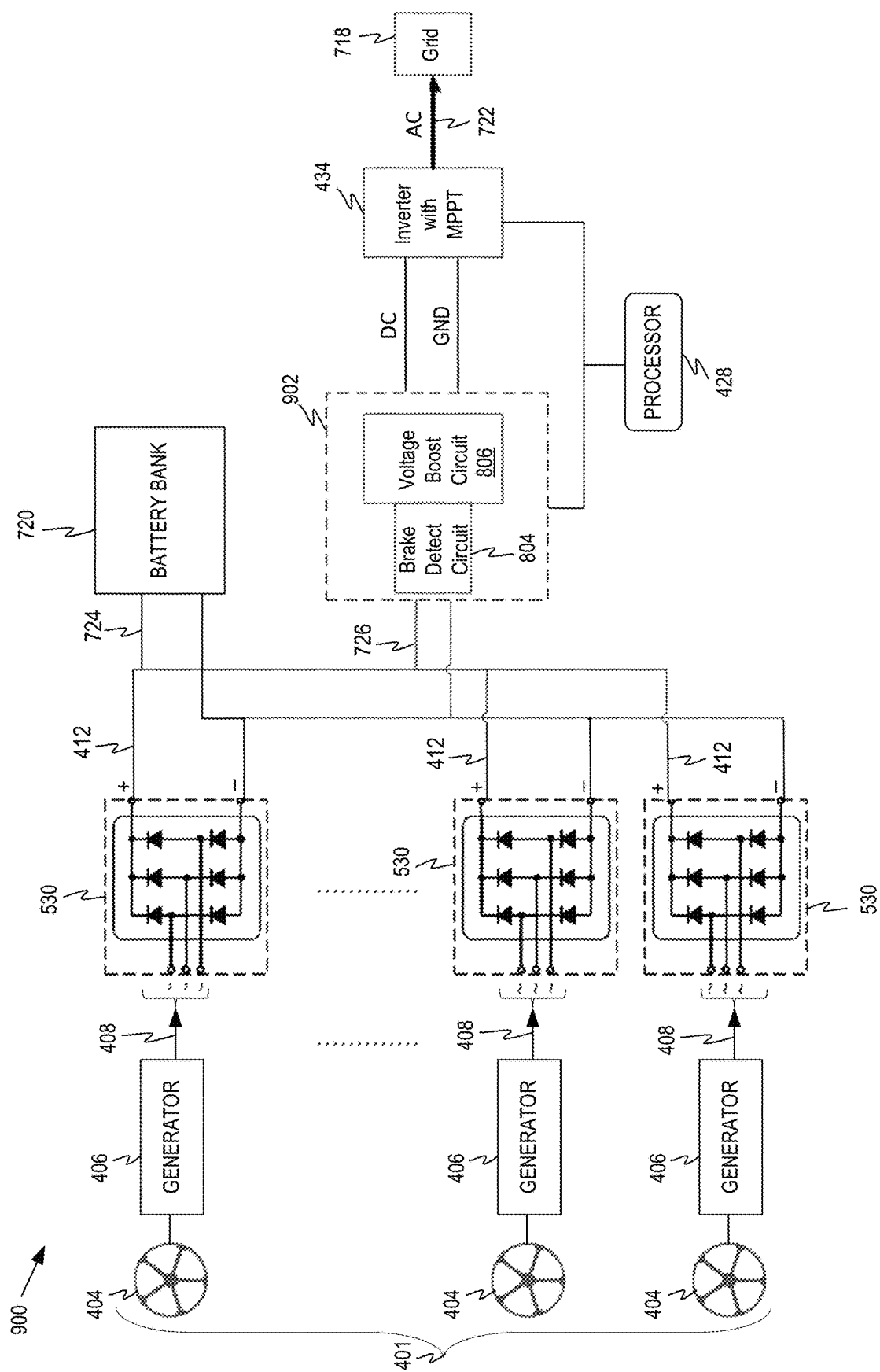
FIG. 9 is another schematic diagram of an exemplary circuit for controlling a plurality of geographically-associated fluid turbines, consistent with some embodiments of the present disclosure.

By way of another non-limiting example, FIG. 9 illustrates a schematic diagram of an exemplary circuit 900 for controlling a plurality of geographically-associated fluid turbines 404, consistent with some embodiments of the present disclosure. Circuit 900 may be substantially similar to circuits 700 and 800 (e.g., in conjunction with FIGS. 4 and 5) with the notable difference that each of energy generators 406 may be connected to a different rectifier 530 (e.g., via three inputs for a three-phase AC signal). Each of rectifiers 530 may output a DC signal (e.g., via two wires for positive and negative) to a single (e.g., common) charge controller 902, including a common brake circuit 804 and a common voltage booster 806 for the plurality of fluid turbines 404. Rectifiers 530 may be connected to charge controller 902 in parallel.

Figure 10:
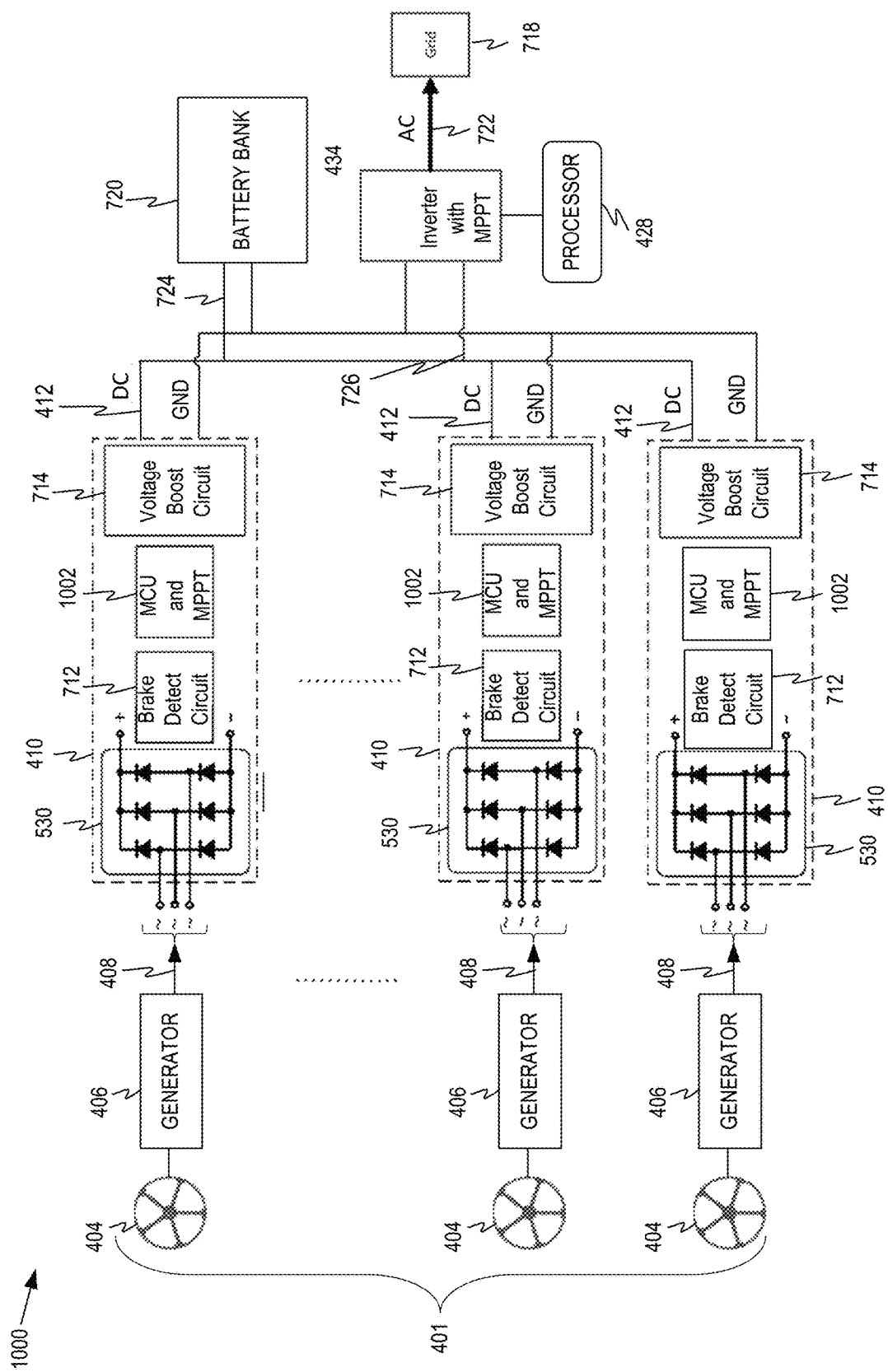
FIG. 10 is another schematic diagram of an exemplary circuit for controlling a plurality of geographically-associated fluid turbines, consistent with some embodiments of the present disclosure.

By way of another non-limiting example, FIG. 10 illustrates a schematic diagram of an exemplary circuit 1000 for controlling a plurality of geographically-associated fluid turbines 404, consistent with some embodiments of the present disclosure. Circuit 1000 may be substantially similar to circuits 700, 800, and 900 (e.g., in conjunction with FIGS. 4 and 5) with the noted difference that each energy generator 406 may be connected to a separate charge controller 410, with each charge controller 410 including at least a rectifier 530, a brake circuit 712, an MPPT control 1002, and a voltage booster 714. Each of charge controllers 410 may transmit (e.g., in parallel) DC power signals to inverter 434 for connecting to electrical grid 718, or alternatively to battery bank 720.

Figure 11:
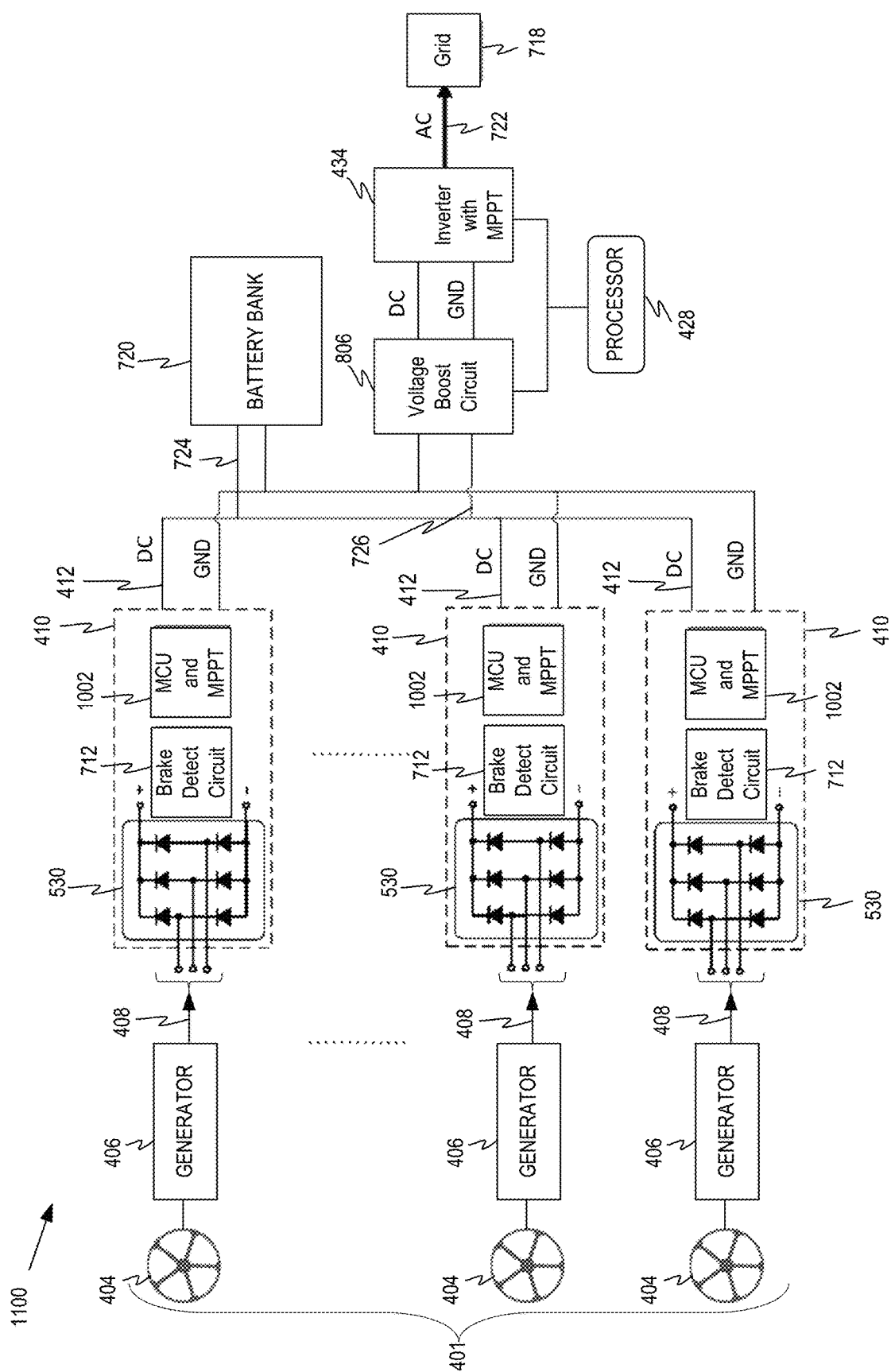
FIG. 11 is another schematic diagram of an exemplary circuit for controlling a plurality of geographically-associated fluid turbines, consistent with some embodiments of the present disclosure.

By way of another non-limiting example, FIG. 11 illustrates a schematic diagram of an exemplary circuit 1100 for controlling a plurality of geographically-associated fluid turbines 404, consistent with some embodiments of the present disclosure. Circuit 1100 may be substantially similar to circuits 700, 800, 900, and 1000 with the noted difference that each charge controller 410 may include a rectifier 530, a brake circuit 712 and an MPPT control 1002. Each charge controller 410 may output a DC signal to common voltage booster 806, which may transmit aggregated DC power to inverter and grid, or alternatively to battery bank 720.

Reference is made to exemplary Table 1 (below) comparing circuits 700 through 1100 for harnessing power from a plurality of geographically-associated fluid turbines.

TABLE 1

Comparison of differing configurations for harnessing power from a plurality of geographically-associated fluid turbines.

| Option | #rectifiers | # brakes | #controllers | # dump loads | # voltage boosters | Serial or parallel to controller? | High level MPPT |
|---|---|---|---|---|---|---|---|
| 1 | 10 | 10 | 10 | 10 | 10 | parallel | No |
| 2 | 10 | 1 | 1 | 1 | 1 | Parallel rectifiers in controller to single controller | No |
| 3 | 10 | 1 | 1 | 1 | 1 | Parallel rectifiers at generator to single controller | No |
| 4 | 10 | 10 | 10 | 10 | 10 | parallel | Yes |
| 5 | 10 | 10 | 10 | 10 | 1 | Parallel to voltage booster | yes |

Figure 12:
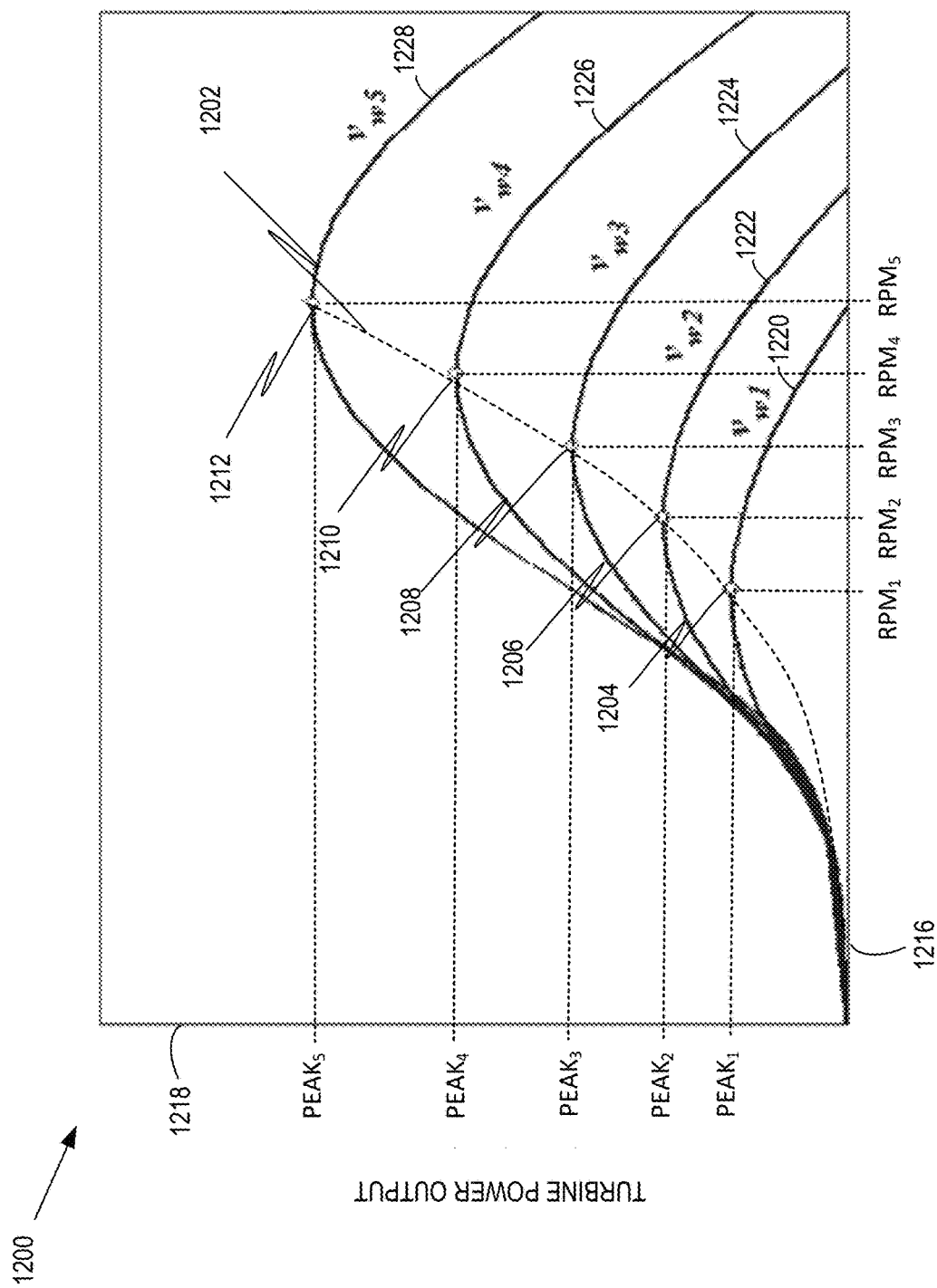
FIG. 12 is an exemplary chart showing a variation of power output versus rotational speed for a fluid turbine operating at various fluid speeds, consistent with some embodiments of the present disclosure.

FIG. 12 illustrates an exemplary chart 1200 showing a variation of power output versus rotational speed for a fluid turbine operating at various fluid speeds, consistent with some embodiments of the present disclosure. Horizontal axis 1216 (e.g., x-axis) of chart 1200 corresponds to the rotational speed of a fluid turbine (e.g., measured as revolutions per minute RPM). Vertical axis 1218 (e.g., y-axis) of chart 1200 corresponds to the power outputted by a fluid turbine for each rotational speed. Chart 1200 may include multiple curves (e.g., curves 1220, 1222, 1224, 1226, and 1228), each curve corresponding to a differing fluid speed (e.g., $v_{w1}$ to $v_{w5}$). Each of curves 1220, 1222, 1224, 1226, and 1228 for each fluid speed $v_{w1}$ to $v_{w5}$ may include a different peak (e.g., peaks 1204, 1206, 1208, 1210, and 1212), corresponding to power output levels $PEAK_1$ to $PEAK_5$ and rotational velocities $RPM_1$ to $RPM_5$, respectively. Causing a fluid turbine to rotate at $RPM_1$ to $RPM_5$ under fluid speeds $v_{w1}$ to $v_{w5}$ (e.g., by adjusting a load connected thereto) may produce the maximum (e.g., or near-maximum) levels of power $PEAK_1$ to $PEAK_5$ for each fluid speed. For instance, while operating under fluid speed $v_{w1}$, causing a fluid turbine to rotate at a rotational speed of $RPM_1$ (e.g., by controlling a load connected thereto) may cause the fluid turbine to produce maximally achievable power $PEAK_1$ for fluid speed $v_{w1}$ (e.g., corresponding to peak 1204 of curve 1220). Similarly, while operating under fluid speed $v_{w2}$, causing a fluid turbine to rotate at a rotational speed of $RPM_2$ (e.g., by controlling a load connected thereto) may cause the fluid turbine to produce the maximally achievable power $PEAK_2$ for fluid speed $v_{w2}$ (e.g., corresponding to peak 1206 of curve 1222), and so on.

Line 1202 (e.g., tracing the peak power outputs 1204 to 1212 for each of fluid speeds $v_{w1}$ to $v_{w5}$) may be used to determine a target rotational speed for a fluid turbine to produce a maximum (e.g., or near-maximum) power output under each fluid speed. In some embodiments, chart 1200 may be used to implement an MPPT protocol for a specific fluid turbine. In some embodiments, at least one processor (e.g., at least one processor 428 and/or 512) may use chart 1200 to control a load on a fluid turbine via a charge controller (e.g., charge controllers 410, 802, and/or 902) to cause a fluid turbine to spin at a rotational speed corresponding to line 1202 for a particular fluid speed. In some embodiments, each fluid turbine in a plurality of geographically-associated fluid turbines may be associated with a different version of chart 1200 (e.g., depending on the design and operating parameters for each fluid turbine). In some embodiments, each fluid turbine in a plurality of geographically-associated fluid turbines may be associated with a substantially similar version of chart 1200.

Figure 13:
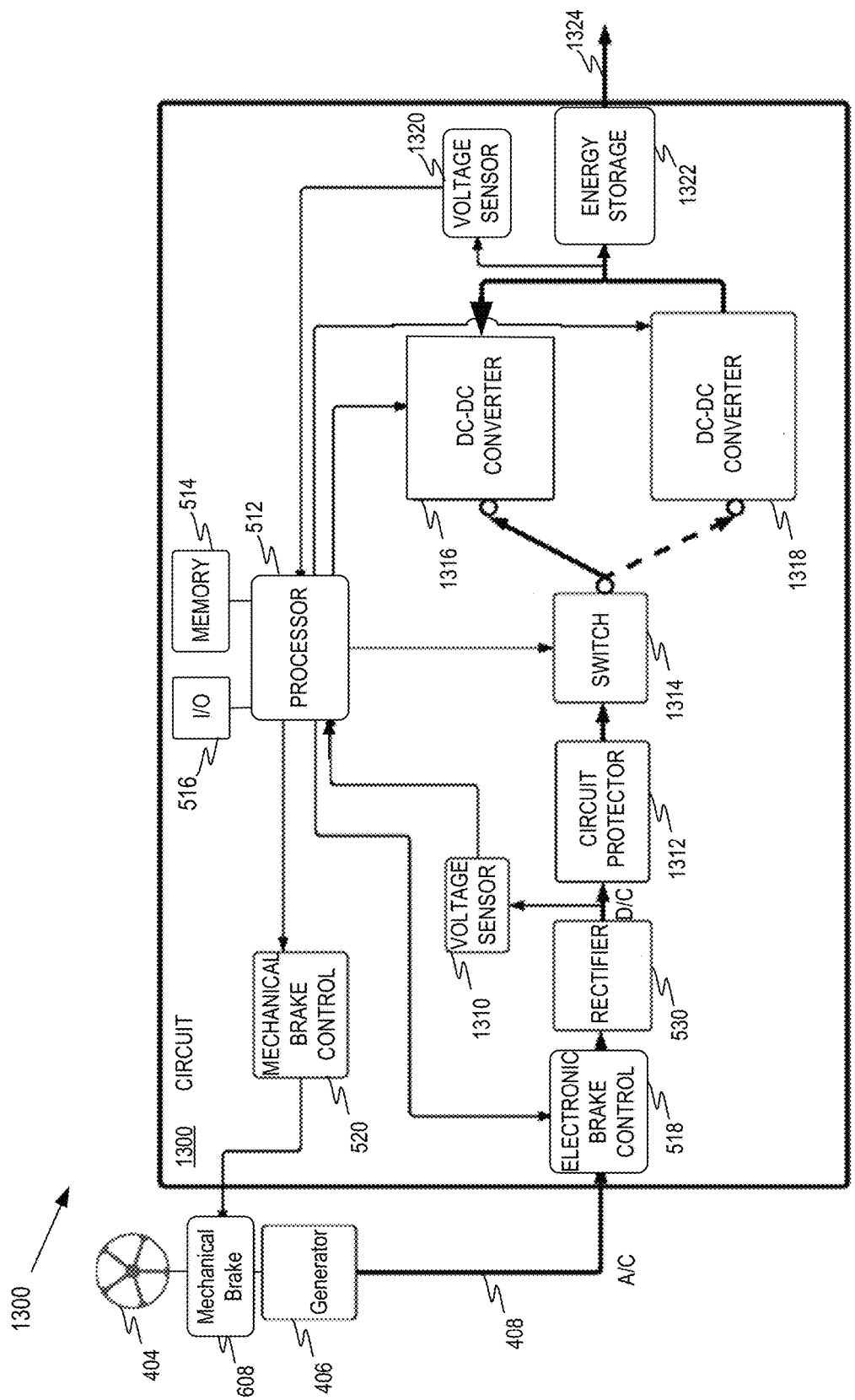
FIG. 13 is a schematic diagram of an exemplary braking circuit, consistent with some embodiments of the present disclosure.

FIG. 13 illustrates a schematic diagram of an exemplary circuit 1300, consistent with some embodiments of the present disclosure. In some embodiments, at least part of circuit 1300 may be associated with any of charge controllers 410, 802, and/or 902. In some embodiments, at least a portion of circuit 1300 may be associated with interconnecting circuitry 414. In some embodiments, a portion of circuit 1300 may be associated with any of charge controller 410, 802, and/or 902, and another portion of circuit 1300 may be associated with interconnecting circuitry 414.

Circuit 1300 may include at least one processor (e.g., at least one processor 512), memory (e.g., memory 514), mechanical brake control (e.g., mechanical brake control 520), electronic brake control (e.g., electronic brake control 518), a rectifier (e.g., rectifier 530), a first voltage sensor 1310, a circuit protector 1312 (e.g., including at least one of an electrostatic discharge, over-voltage, and/or over-current protection circuits), a switch 1314 (e.g., a single pole, double throw switch), a first DC/DC converter 1316 (e.g., configured to operate above a voltage threshold), a second DC/DC converter 1318 (e.g., configured to operate below the voltage threshold), a second voltage sensor 1320, an energy storage component 1322, and a DC power output 1324. Rectifier 530 may be a three-phase rectifier configured to produce a variable DC voltage output. In some embodiments, DC power output 1324 may be channeled to an inverter (e.g. inverter 434) for converting to an AC power output signal. In some embodiments, DC output 1324 may channel DC power output 1324 to a battery bank.

At least one processor 512 may control braking for fluid turbine 404 connected to energy generator 406 based on one or more signals, such as AC power output 408 (e.g., a three-phase AC power output signal) delivered to circuit 1300, and/or a signal received from one or more sensors (e.g., at least one sensor 418). Rectifier 530 may convert AC power output 408 to a DC power signal. At least one processor 512 may receive an indication of AC power output 408 as a DC power output measurement via first voltage sensor 1310. Fluid turbine 404 and energy generator 406 may be associated with mechanical brake 608. To control mechanical braking of fluid turbine 404 and/or energy generator 406, at least one processor 512 may send a control signal to mechanical brake control 520 for engaging mechanical brake 608. To control electronic braking of fluid turbine 404, at least one processor 512 may subject energy generator 406 to a load via electronic brake control 518. In some embodiments, power output sensor 510 may be associated with first voltage sensor 1310 and/or second voltage sensor 1320.

By way of a non-limiting example, first DC-DC converter 1316 may be configured to operate at 500 Watts, receive an input ranging between 18-60V and output a voltage ranging between 3.3-24V, switch on at 16.5V, and operate at an efficiency below 98.5%. Second DC-DC converter 1318 may be configured to operate at 300 Watts, receive an input ranging between 9-36V and output a voltage ranging between 8-24V, switch on at 9V, and operate at an efficiency below 97%. Switch 1314 may channel DC signals above or equal to 22V to first DC-DC converter 1316 and channel DC signals below 22V to second DC-DC converter 1318. In some embodiments, at least one processor 512 may subject fluid turbine 404 to an MPPT protocol by matching an electric load imposed on energy generator 406 to a rotational speed of fluid turbine 404 for a given fluid speed (e.g., based on a version of chart 1200 stored in memory 514) to produce a peak (or near-peak) AC power output.

In some embodiments, at least one processor 512 may communicate with at least one processor 428, e.g., to transmit information associated with a load imposed on fluid turbine 404. For example, the information may be used by the at least one processor to implement one or more MPPT protocols (e.g., including an individual MPPT protocol or lower-level MPPT protocol for a single fluid turbines, and/or a cluster MPPT protocol or an upper-level MPPT protocol for a plurality of geographically-associated fluid turbines), to coordinate braking for a cluster of geographically-associated fluid turbines, and/or to coordinate blade orientation for a cluster of geographically-associated fluid turbines.

For example, FIG. 10 may be taken together with FIGS. 4, and 13 as a detailed schematic diagram of integral fluid energy conversion system 400. A version of circuit 1300 may be associated with each one of MPPT controls 1002 of charge controllers 410, allowing each of at least one processors 512 (e.g., each dedicated to one of individual fluid turbines 404) to coordinate operations for each fluid turbine 404 (e.g., in isolation). In addition, interconnecting circuitry 414 may connect to each of MPPT controls 1002, allowing at least one processor 428 to receive information from any of charge controllers 410 (e.g., each dedicated to one of individual fluid turbines 404) to coordinate operations for fluid turbines 404 operating in cluster 401 as integral fluid energy conversion system 400.

Figure 14:
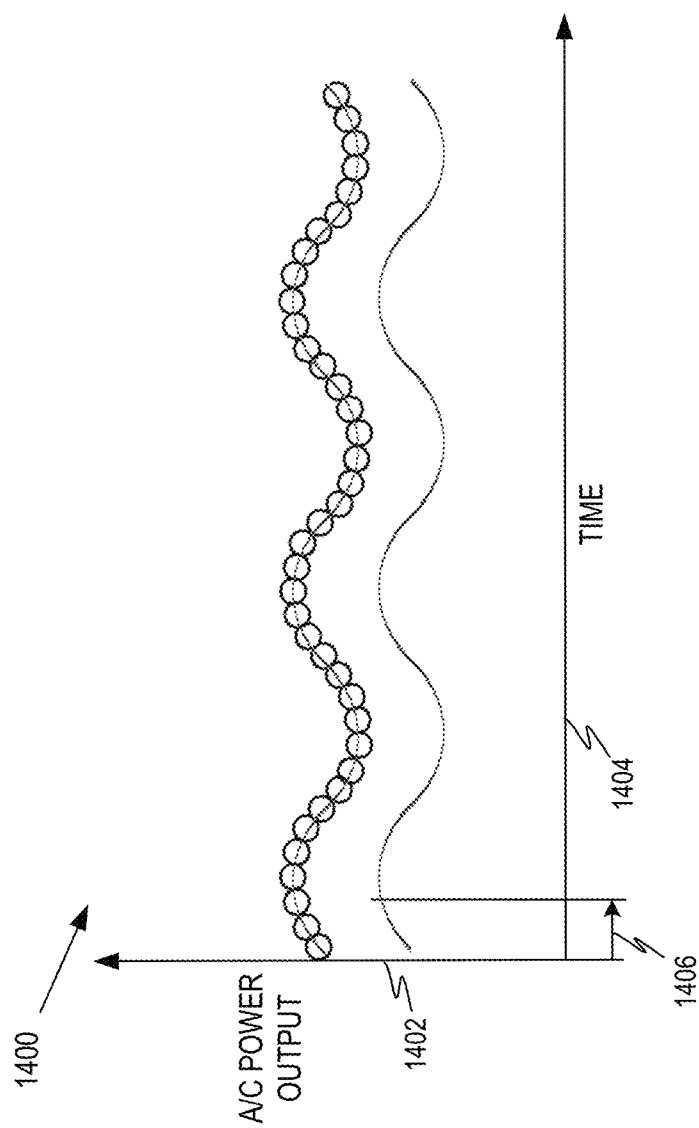
FIG. 14 is an exemplary graph of cyclical power signal generated by an electric energy generator connected to a fluid turbine, consistent with some embodiments of the present disclosure.

FIG. 14 illustrates an exemplary graph 1400 of cyclical power signal energy generator by an electric energy generator connected to a fluid turbine, consistent with some embodiments of the present disclosure. Graph 1400 may represent a power signal produced by energy generator 406 as fluid turbine 404 rotates in response to fluid flow 210. In some embodiments, graph 1400 may be substantially sinusoidal, corresponding to a rotating motion of fluid turbine 404, where different stages of rotation may correspond to the generation of differing levels of energy.

By way of a non-limiting example, in FIG. 12, the at least one processor may determine a correspondence between the first signals received via AC channel 1802 and a portion of the MPPT protocol. For example, prior to receiving the first signals, while a fluid speed is $v_{w1}$, the at least one processor may use a first portion of the MPPT protocol (e.g., curve 1220 associated with peak 1204 for fluid speed $v_{w2}$) to control a load on fluid turbine 404 such that AC power output 408 matches peak 1204 for fluid speed $v_{w1}$. However, based on the first signals and/or one or more signals received from sensors 418, the at least one processor may determine that a current fluid speed is now vw2. For example, the at least one processor may receive a fluid speed measurement from fluid speed sensor 504 (e.g., see FIG. 5) included in sensors 418. The at least one processor may determine a correspondence between the fluctuations in AC power output 408 indicated by the first signals and a second portion of the MPPT protocol (e.g., curve 1222 associated with peak 1206 for fluid speed vw2).

For example, in a first time period associated with a first fluid speed, a generator of a fluid turbine spinning at a first rotational velocity under a first load may produce a first AC power output substantially at a level of a first peak power output associated with the first fluid speed. For instance, the first rotational velocity may be associated with a first correspondence between the first AC power output and a first portion of an MPPT protocol associated with the first fluid speed. However, during a second time period associated with a second fluid speed, based on signals indicating fluctuations in generated AC power (e.g., a second AC power output), the at least one processor may determine a second correspondence to a second portion of an MPPT protocol associated with the second fluid speed. Based on the second correspondence, the at least one processor may determine a discrepancy between the second AC power output and a second peak power output associated with the second fluid speed. For example, the second AC power output may be less than the second peak power output due to a discrepancy between the second rotational velocity and a rotational velocity for achieving a second peak power output according to the second portion of an MPPT protocol associated with the second fluid speed. In response, the at least one processor may apply a second load (e.g., different than the first load) to the generator, causing the fluid turbine to spin at a third rotational velocity to produce a third AC power output substantially at the level of the second peak power output associated with the second fluid speed, thereby generating greater power than would be generated in absence of application of the second portion of the MPPT protocol.

An MPPT protocol may involve adjustment to a load to cause a corresponding adjustment to a rotational velocity of a fluid turbine and an associated generator for a specific fluid speed condition. Application of an MPPT protocol to one or more fluid turbines may improve efficiency in power generation. For instance, adjusting a rotational speed may cause a fluid turbine and an associated generator to output a peak (or near-peak) level of power for a given fluid speed condition, instead of a sub-peak power level. However, applying an MPPT protocol may incur latencies and/or response times which may reduce efficiency under fluctuating fluid flows. For instance, if the latencies and/or response times for applying an MPPT protocol to a fluid turbine are greater than the time gaps between fluctuations in fluid speed conditions, applying an MPPT protocol to a fluid turbine for a specific fluid speed condition may results in sub-optimal performance. By the time a rotational speed of a fluid turbine is adjusted to produce a peak power output for a first fluid speed condition, the fluid speed may have changed to a second fluid speed condition associated with a different rotational speed and peak power output. In such a case, the fluid turbine may be caused to spin at a rotational speed that is non-compliant with the MPPT protocol.

Disclosed embodiments are provided to determine one or more power curves for a fluid turbine. Each power curve may be associated with a different fluid speed condition, and may be used to apply an MPPT-compliant load to a fluid turbine, without having to incur latencies associated with implementation of an MPPT protocol. Use of an existing power curve and one or more predetermined MPPT-compliant loads may allow for adjustment of a rotational speed of a fluid turbine to produce a peak power output in time to react to dynamically changing fluid speed conditions. The disclosed embodiments may be applied in absence of any power curves for a fluid turbine, when only some power curves are available for a fluid turbine (e.g., for only some fluid speed conditions), and/or when a complete set of power curves are available for a fluid turbine (e.g., for all foreseeable fluid speed conditions).

Some disclosed embodiments involve performance of operations for determining a power curve for a fluid turbine. A power curve for a fluid turbine refers to a relationship between power output of the fluid turbine and associated rotational speed and/or fluid speed. In some embodiments, different fluid speed conditions may be associated with different power curves. For example, when operating under first fluid speed conditions, a fluid turbine may output power according to a first power curve. The first power curve may include a first peak power output for the fluid turbine rotating at a first rotational speed (e.g., achieved by imposing a first load on the fluid turbine). When operating under second fluid speed conditions, the fluid turbine may output power according to a second power curve. The second power curve may include a second peak power output for the fluid turbine rotating at a second rotational speed (e.g., achieved by imposing a second load on the fluid turbine).

By way of a non-limiting example, in FIG. 12, chart 1200 illustrates an exemplary power curve for a fluid turbine operating under a plurality of fluid speed conditions $v_{w1}$ to $v_{w5}$. At least one processor 512 (see FIG. 5) may access chart 1200 or a portion thereof from memory 514 to obtain a load for applying to a fluid turbine operating under a specific fluid speed condition (e.g., see FIG. 2A showing fluid turbine 100 operating under fluid flow 210). For example, under fluid speed condition $v_{w1}$, the at least one processor may adjust a load to cause fluid turbine 100 to spin at $RPM_1$ to produce peak power output $PEAK_1$, corresponding to peak 1204 of curve 1220.

Some disclosed embodiments involve receiving an indication of a fluid speed condition. A fluid speed condition includes at least one parameter, characteristic, or measure indicative of a rate or speed of an ambient fluid flow. In some embodiments, an indication of a fluid speed condition includes a direction of fluid flow. An indication of a fluid speed condition may include a fluid speed (e.g., an average fluid speed over a time period), a fluid acceleration, fluid turbulence, fluid temperature, fluid pressure, and/or a differential thereof, a forecast for a fluid flow, a humidity level (e.g., for ambient air flow), precipitation, dust and/or pollutant levels, and/or any other measure characterizing an ambient fluid flow. In some embodiments, an indication of a fluid speed condition may include one or more changes in direction of a fluid flow. Some disclosed embodiments involve receiving an indication of a fluid velocity condition, where a fluid velocity includes an indication of fluid speed and a direction of the fluid flow. Fluid turbulence is characterized by chaotic changes in fluid pressure and/or flow velocity (e.g., including speed and direction of flow), and may be measured using a Reynolds number (e.g., fluid velocity*distance/kinematic viscosity). Fluid turbulence may cause drag on turbine blades, which may hinder the energy-generating capacity of an associated generator. A large differential in fluid temperatures and/or fluid pressures may be indicative of a high fluid speed, whereas a small differential in fluid temperatures and/or fluid pressures may be indicative of a low fluid speeds. A low humidity level may be associated with lower evaporation levels and high wind speed. A high humidity level may be associated with higher evaporation levels and low wind speed. Precipitation may reduce wind speed due to resistance between falling rain drops and air flow. For example, strong (high speed) trade winds may be associated with a lack of precipitation and weak (low speed) trade winds may be associated with rainfall. Dusty and/or pollutant laden fluid may deposit sediment on the surface of turbine blades, increasing the weight and/or surface roughness of the blades, causing the rotation of the blades to slow. A forecast for a fluid flow includes one or more predicted and/or expected fluid flow characteristics (e.g., relating to fluid speed, pressure, humidity, precipitation, dust, and/or any other fluid flow characteristic).

In some embodiments, a fluid speed condition relates to air flow (e.g., wind). In some embodiments, a fluid speed condition relates to water or gas flow. Additionally, or alternatively, an indication of a fluid speed condition may include a voltage, power, and/or current output of a fluid turbine operating under a particular fluid speed condition. Additionally, or alternatively, an indication of a fluid speed condition may include a rotational velocity associated with a shaft, blades, and/or a rotor associated with a fluid turbine, vibrations associated therewith (e.g., indicating surpassing of a fluid speed threshold), and/or a temperature associated with a generator. For instance, a high speed fluid flow may cause a generator to produce an amount of power exceeding a threshold, causing the generator to overheat. Receiving an indication of a fluid speed condition involves obtaining and/or otherwise gaining access to an indication of the fluid speed condition. For example, at least one processor may receive a signal, data, or information representative of the fluid speed condition from one or more sensors associated with a fluid turbine via a wired and/or wireless communications link. Some exemplary sensors for detecting an indication of a fluid speed condition may include a mechanical sensor (e.g., including one or more internal measuring units, or IMUs), an optical sensor, a resistive sensor, a capacitive sensor, a piezoelectric sensor, a Hall sensor, a digital position sensor, a current sensor, a voltage sensor, and/or a flow sensor (e.g., an anemometer). Some additional sensors that may be used to detect an indication of fluid speed may include temperature sensors and/or pressure sensors. For example, at least one processor may receive a signal, data, and or information representative of a fluid speed condition from an anemometer located in proximity to a fluid turbine and/or located on a weather balloon in a region of the fluid turbine (e.g., via a wireless communications channel). As another example, the least one processor may receive a signal, data, and or information representative of a fluid speed condition from an IMU connected to one or more blades, a shaft, and/or rotor associated with a fluid turbine. As a further example, the least one processor may receive a signal, data, and or information representative of a fluid speed condition as a power output level, and may use the power output level to determine the associated fluid speed condition e.g., based on a load currently being applied to the fluid turbine).

In some disclosed embodiments, the indication of the fluid speed condition includes an RPM of the fluid turbine. An RPM (revolutions per minute) of a fluid turbine refers to a number of completed cycles per minute by a rotating component associated with a fluid turbine. A rotating component of a fluid turbine may include one or more blades, a shaft, a rotor of an associated generator, and/or any other rotating element associated with a fluid turbine. A specific fluid speed condition may cause a fluid turbine to rotate at a corresponding rotational speed. In some embodiments, the indication of the fluid speed conditions include a number of completed cycles per second (e.g., Hz) by a rotating component associated with a fluid turbine. In some embodiments, the indication of fluid speed conditions includes a measurement in meters per second by a rotating component associated with a fluid turbine (e.g., blade tip speed). The at least one processor may receive an indication of a rotational velocity of a fluid turbine from one or more associated sensors (e.g., via a wired and/or wireless communications link). Some examples of sensors for measuring a rotational speed (e.g., an RPM) of a fluid turbine may include a tachometer (e.g., configured to measure rotational speed of a fluid turbine shaft), a magneto-resistive sensor, an inductive sensor, a Hall effect sensor (e.g., configured to use a Hall Effect to detect a presence of a magnetic field for determining the rotations of a fluid turbine shaft), an oscillatory sensor (e.g., measuring vibrations when the RPM exceeds a threshold), an optical sensor (e.g., an encoder and/or an infrared sensor configured to measure a rotational speed of a turbine shaft by counting a number of rotations or by measuring a time duration between rotations), and/or an ultrasonic sensor (e.g., configured to emit ultrasonic waves for measuring a distance between the sensor and the blades of a fluid turbine, from which a rotational speed of the blades may be determined).

In some disclosed embodiments, the indication of the fluid speed condition includes a fluid speed measurement. A fluid speed measurement refers to a determination of the rate of flow of air, water, and/or gas. The rate of flow may be determined in terms of an amount of volume of the air, water, and/or gas flowing per unit time or a speed of the air, water, and/or gas. For example, the measurement may be in terms of liters/minute, gallons/minute, cubic feet/minute or any other unit for measurement of volume flow per unit time. Alternatively, for example, the measurement may be in terms of kilometers per hour (km/h), miles per hour (mph), meters/minute, centimeters per minute, inches per minute, or any other unit of measurement of speed. The at least one processor may receive a fluid speed measurement from one or more associated sensors (e.g., via a wired and/or wireless communications link). Some examples of sensors for measuring a fluid speed may include an anemometer, a water current sensor, a gas flow meter, and/or a steam flow meter. A measure of fluid speed may indicate an amount of energy carried by a fluid flow that may undergo a first conversion to mechanical rotational motion (e.g., measured as RPM, Hz, meters per second) by the turbine blades, and a second conversion to electrical energy by an associated generator (e.g., after accounting for some loss due to friction).

In some disclosed embodiments, the indication of the fluid speed condition includes an indication of power generated. An indication of power generated refers to a measurement or representation of an amount of electrical power being produced by a power generation source. It may include, for example, a current level, a voltage level, a frequency, and/or a phase. A measure of power generated may include a measure of an AC power output and/or a measure of a DC power signal converted from an AC power output (e.g., using a rectifier). For example, fluid speed may translate to a rotational speed of a fluid turbine and/or an associated rotor, which may translate to a phase, amplitude, and/or frequency of an AC power signal generator by the energy generator. Thus, an amount of power, current, voltage level, frequency, and/or phase may be correlated with the fluid speed of the fluid flow causing the rotation of the turbine or the associated rotor.

In some disclosed embodiments, the fluid is air, e.g., the fluid speed is wind speed. For instance, a wind turbine may convert wind (e.g., a flow of air) to rotational mechanical motion. A generator connected to the wind turbine may convert the rotational mechanical motion to electrical power. The wind speed may be determined from the electrical power in a manner similar to that described above.

In some disclosed embodiments, the fluid is water, e.g., the fluid speed is a speed of a water current or flow. For instance, a water turbine may convert an ocean or river current to rotational mechanical motion. A generator connected to the water turbine may convert the rotational mechanical motion to electrical power. The fluid speed may be determined from the electrical power in a manner similar to that described above. In some embodiments, the fluid is steam. In some embodiments, the fluid is gas.

By way of a non-limiting example, in FIG. 5, at least one processor 512 may receive an indication of a fluid speed condition from sensors 418. For example, at least one processor 512 may receive a rotational velocity measurement from one or more rotation sensors 502 (e.g., associated with any of shaft 216, blades 206 and 208, and/or rotor 212 of FIG. 2A). As another example, at least one processor 512 may receive a fluid speed measurement for fluid flow 210 (see FIG. 2A) from fluid speed sensor 504. As a further example, at least one processor 512 may receive an indication of power generated from power output sensors 510. In some embodiments, the fluid turbine is a wind turbine (e.g., any of wind turbines 100, 102, 106, 108, 110, and 112 of FIG. 1) and the fluid is air. In some embodiments, the fluid turbine is a water turbine (e.g., fluid turbine 104) and the fluid is water. For instance, in FIG. 12, at least one processor 512 may receive an indication of fluid speed condition $v_{w5}$ associated with curve 1228 and peak 1212, and corresponding to a rotational velocity of $RPM_5$ for producing peak power output $PEAK_5$.

In some embodiments, an indication of fluid speed measurement may include an indication of vibration by one or more components associated with a fluid turbine. For example, a vibrating component may be indicative of a fluid speed exceeding a threshold. The at least one processor may receive an indication of vibration from a vibration sensor (e.g., including one or more accelerometers, piezoelectric, piezoresistive, and/or capacitive MEMS). In some embodiments, the indication of fluid speed measurement may include a temperature (e.g., indicative of overheating due to the fluid speed exceeding a threshold). The at least one processor may receive a temperature measurement from a temperature sensor (e.g., via a wired and/or wireless communications link). Some examples of temperature sensors may include a thermometer, a thermostat, a thermocouple, a thermopile, an infrared thermometer, and/or a bimetallic strip thermometer.

Some disclosed embodiments involve availability of a predetermined load in compliance with an MPPT protocol for the fluid turbine operating under the fluid speed condition (e.g., when a predetermined load in compliance with an MPPT protocol for the fluid turbine operating under the fluid speed condition is available). A load refers to the mechanical resistance or force on a turbine. A predetermined load (as described and exemplified elsewhere herein) refers to a load calculated in advance. In some embodiments, a predetermined load may be stored in a memory accessible to at least one processor configured to control a fluid turbine. A predetermined load in compliance with an MPPT protocol for a fluid turbine operating under the fluid speed condition (as described and exemplified elsewhere herein) refers to a load calculated in advance, that when applied to the fluid turbine, causes the fluid turbine to produce a peak (or near-peak) power output (e.g., based on a power curve corresponding to the fluid speed condition). For example, at least one processor may store one or more predetermined loads, each associated with a peak power output for a fluid turbine and a different fluid speed condition in a data structure. Application of an associated load for a particular fluid speed condition may adjust a rotational speed of a fluid turbine, causing an associated generator to produce a peak or near-peak power output for the particular fluid speed condition. The at least one processor may determine availability of a predetermine load in compliance with an MPPT protocol by querying the data structure using a fluid speed condition as a query term. Thus, upon receiving an indication of a particular fluid condition and determining availability of an associated predetermine load, the at least one processor may retrieve the associated load from memory an apply the predetermined load to the fluid turbine, thereby causing the fluid turbine to comply with the MPPT protocol. Availability of a predetermined load in compliance with an MPPT protocol for a fluid turbine operating under the fluid speed condition refers to a situation where at least one processor associated with controlling the fluid turbine load has access to the predetermined load. For example, the predetermined load may be stored in a data structure accessible to the at least one processor. Such a data structure may include a table, an array, a matrix, a graph, a linked list, an index, and/or any other format for organizing data. In some embodiments, a predetermined load may be available for all expected fluid speed conditions (e.g., a complete set of power curves). In some embodiments, a predetermined load may be available for a first subset of expected fluid speed conditions and unavailable for a second set of expected fluid speed conditions (e.g., a partial set of power curves). In some embodiments, a predetermined load for any expected fluid speed condition may be unavailable (e.g., no power curves).

By way of a non-limiting example, in FIG. 12, Chart 1200 includes curves 1220, 1222, 1224, 1226, and 1228, each representing a relationship between power outputted by a fluid turbine (e.g., fluid turbine 100 of FIG. 2A) operating under fluid speeds $v_{w1}$ to $v_{w5}$, respectively. Each of curves 1220, 1222, 1224, 1226, and 1228 is associated with a different peak power output 1204, 1206, 1208, 1210, and 1212 in compliance with an MPPT protocol for fluid speeds $v_{w1}$ to $v_{w5}$, respectively. For instance, under fluid speed $v_{w1}$, compliance with the MPPT protocol may involve adjusting the rotational speed of fluid turbine 100 to be $RPM_1$. While rotating at $RPM_1$ under fluid speed $v_{w1}$, fluid turbine 100 may produce peak power output $PEAK_1$ corresponding to peak 1204 of curve 1220, in compliance with the MPPT protocol. Similarly, under fluid speeds $v_{w2}$ and $v_{w3}$, compliance with the MPPT protocol may involve adjusting the rotational speed of fluid turbine 100 to be $RPM_2$ and $RPM_3$, respectively. While rotating at $RPM_2$ and $RPM_3$ under fluid speeds $v_{w2}$ and $v_{w3}$, fluid turbine 100 may produce peak power outputs $PEAK_2$ and $PEAK_5$, corresponding to peaks 1206 and 1208 of curves 1222 and 1224, respectively. At least one processor 512 of charge controller 410 may apply a load to fluid turbine 100 and/or associated generator 204 to adjust the rotational speed of fluid turbine 100 to comply with the MPPT protocol, based on received indications of fluid speed conditions.

By way of another non-limiting example, reference is made to FIG. 15 illustrating an exemplary data structure 1500 associating a plurality of fluid speed conditions $v_{w1}$ to $v_{w5}$ with a plurality of MPPT compliant loads, consistent with some embodiments of the present disclosure. Data structure 1500 may be stored in memory 514 of charge controller 410 and/or remotely and accessible via communications network. Data structure 1500 may include predetermined MPPT-compliant loads MPPT_LOAD($vw_{w1}$) to MPPT_LOAD($vw_{w5}$) corresponding to fluid speeds $v_{w1}$ to $v_{w5}$, respectively, thereby providing availability of one or more predetermined MPPT-compliant loads to at least one processor 512. Applying MPPT_LOAD(vw1) to MPPT_LOAD(vw5) to fluid turbine 100 while operating under fluid speeds $v_{w1}$ to $v_{w5}$ may cause fluid turbine 100 to rotate at rotational speeds $RPM_1$ to $RPM_5$, and produce peak power outputs $PEAK_1$ to $PEAK_5$, corresponding to peaks 1204 to 1212 of curves 1220 to 1228, respectively.

Some disclosed embodiments involve obtaining the predetermined load. Obtaining a predetermined load involves receiving and/or otherwise acquiring the predetermined load. For example, at least one processor may read a predetermined load from memory, e.g., by querying a data structure for the predetermined load using fluid speed as an index.

By way of a non-limiting example, in FIG. 15, upon receiving the indication for fluid flow 210 (see FIG. 2A) indicating fluid speed condition $v_{w5}$, the at least one processor (e.g., processor 512 of FIG. 5) may query data structure 1500 using $v_{w5}$ as an index and obtain MPPT_LOAD(vw5) in response.

Some disclosed embodiments involve applying the predetermined load to the fluid turbine, thereby adjusting a rotational velocity of the fluid turbine in accordance with the MPPT protocol and the fluid speed condition. A rotational velocity of a fluid turbine refers to a speed and/or direction of a rotating component associated with a fluid turbine. A rotational velocity may be measured as revolutions per minute (RPM), cycles per second (Hz), meters per second (mps or m/s), feet per second (ft/s), and/or any other units for measuring a rotational speed and/or direction. A fluid turbine and an associated generator may be designed to spin at a specific (e.g., optimal) rotational velocity to produce a peak (e.g., maximum) level of power for a specific fluid speed condition. Thus, when the fluid turbine spins at a rotational velocity different than the optimal rotational velocity for a specific fluid speed condition (e.g., a faster or slower rotational velocity), the associated generator may produce less power than the peak power output possible for the specific fluid speed condition. Adjusting a load applied to the fluid turbine and associated generator may enable adjusting the rotational velocity to match (or nearly match) the optimal rotational velocity for producing the peak power output for a specific fluid speed condition. Applying a predetermined load to a fluid turbine involves introducing or adding a predetermined load to circuitry associated with the fluid turbine and/or an associated generator. Introducing a load thus may introduce or add an associated impedance, causing a corresponding adjustment to the rotational velocity of the fluid turbine and associated generator. At least one processor may adjust the load to cause the fluid turbine and associated generator to rotate at a specific rotational velocity associated with a specific power output. For instance, at least one processor may control a switch controlling a level of electric power being diverted to a dump load, thereby adjusting the applied load. In some cases, applying the predetermined load involves reducing a load applied to the fluid turbine and associated generator, causing the rotational velocity to increase. In some cases, applying the predetermined load involves increasing a load applied to the fluid turbine and associated generator, causing the rotational velocity to decrease. In some cases, applying the predetermined load involves maintaining a load applied to the fluid turbine and associated generator, causing the rotational velocity to remain unchanged. Adjusting a rotational velocity of the fluid turbine in accordance with the MPPT protocol and the fluid speed condition refers to changing and/or modifying a rotational velocity of the fluid turbine and/or an associated generator in a manner to comply with the MPPT protocol for the fluid speed condition. Adjusting a load imposed on a fluid turbine and/or an associated generator may cause a corresponding adjustment to a rotational velocity of the fluid turbine. The at least one processor may adjust the load to cause the fluid turbine to spin at the rotational velocity complying with the MPPT protocol for the fluid speed condition, thereby causing the associated generator to produce a peak level of power output for the fluid speed condition. For instance, during a first time period associated with a specific fluid speed condition, a fluid turbine may produce power at a level less than a peak power output for the fluid turbine at the specific fluid speed condition (e.g., based on an associated power curve). The at least one processor may apply a load to adjust a rotational velocity of the fluid turbine such that during a second time period, associated with the same specific fluid speed condition, the fluid turbine may produce power at a level corresponding to the peak power output, in accordance with the MPPT protocol and the specific fluid speed condition.

In some disclosed embodiments, applying the predetermined load or the MPPT-compliant load to the fluid turbine includes applying the load via a charge controller associated with the fluid turbine. A charge controller associated with a fluid turbine may be understood as described and exemplified elsewhere herein. Applying the predetermined load or the MPPT-compliant load via the charge controller involves using the charge controller to introduce the MPPT-compliant load to an electrical circuit associated with the fluid turbine and/or to an associated generator. For instance, the charge controller may include one or more dump loads, at least one processor, and a controllable switch for controlling how much power to divert to the dump load. The at least one processor may transmit a signal to control the switch such that the level of (e.g., DC) electrical power diverted to the one or more dump loads corresponds to the predetermined load or the MPPT-compliant load. Applying such a load via the charge controller may adjust a level of power drawn away from the fluid turbine, e.g., by shunting current from copper windings of an associated generator, thereby adjusting a level of impedance imposed thereon. The adjusted level of impedance may cause a corresponding adjustment to a rotational velocity of the fluid turbine and associated generator, causing the fluid turbine to rotate at a rotational speed corresponding to a peak power output for the fluid speed conditions. In some embodiments, the one or more dump loads may include one or more batteries and/or capacitors.

By way of a non-limiting example, in FIG. 5, at least one processor 512 of charge controller 410 may apply MPPT_LOAD(vw5) (see FIG. 15) to fluid turbine 100 and/or associated generator 204. For instance, at least one processor 512 may divert an amount of electrical energy equivalent to MPPT_LOAD(vw5) to dump load 532. In some embodiments, dump load 532 may include one or more batteries (e.g., battery bank 720 and/or energy storage 1322) and/or capacitors. By way of another non-limiting example, in FIG. 13, at least one processor 512 may control switch 1314 to divert an amount of electrical energy equivalent to MPPT_LOAD(vw5) to energy storage 1322, to thereby apply MPPT_LOAD(vw5). Applying MPPT_LOAD(vw5) thus may adjust the rotational velocity of fluid turbine 404A to spin at $RPM_5$, in accordance with the MPPT protocol and fluid speed condition $v_{w5}$ (e.g., see FIG. 12). While spinning at $RPM_5$ under fluid speed condition $v_{w5}$, fluid turbine 404A and associated generator 406A may produce peak power output $PEAK_5$, corresponding to peak 1212 of curve 1228, which may be the maximum power output for fluid speed condition $v_{w5}$.

In some disclosed embodiments, applying the predetermined load or the MPPT-compliant load to the fluid turbine includes applying the load to an inverter associated with the fluid turbine. An inverter associated with a fluid turbine may be understood as described and exemplified elsewhere in herein. Applying the predetermined load or the MPPT-compliant load to an associated inverter involves introducing the predetermined load or the MPPT-compliant load to circuitry associated with an inverter connected to the fluid turbine and associated generator. For instance, such circuitry may include one or more (e.g., adjustable) dump loads controllable using a switch. The at least one processor may transmit a signal to control the switch such that the level of electrical power diverted towards the one or more dump loads and away from the inverter (and an associated electrical grid) corresponds to the predetermined load or the MPPT-compliant load. Applying such a load via the inverter may introduce an impedance causing rotation of the fluid turbine and associated generator to rotate at a rotational velocity corresponding to a peak power output for the fluid speed conditions.

By way of another non-limiting example, in FIGS. 4-5 and 15, at least one processor (e.g., processor 428 and/or processor 512) may apply MPPT_LOAD(vw5) (e.g., an MPPT-compliant load for fluid speed condition $v_{w5}$), to inverter 434 associated with fluid turbine 404A (e.g., corresponding to fluid turbine 100). Applying MPPT_LOAD (vw5) thus may adjust the rotational velocity of fluid turbine 404A to $RPM_5$, in accordance with the MPPT protocol and fluid speed condition $v_{w2}$ (e.g., see FIG. 12). While spinning at $RPM_5$ under fluid speed condition $v_{w5}$, fluid turbine 404A and associated generator 406A may produce peak power output $PEAK_5$, corresponding to peak 1204 of curve 1228, which may be the maximum power output for fluid speed condition $v_{w5}$. In some embodiments, applying MPPT_LOAD(vw5) to inverter 434 may involve diverting power equivalent MPPT_LOAD(vw5) to battery bank 720 (see FIG. 7).

Some disclosed embodiments involve unavailability of a predetermined load in compliance with an MPPT protocol for a fluid turbine operating under a fluid speed condition (e.g., when a predetermined load in compliance with an MPPT protocol for a fluid turbine operating under a fluid speed condition is unavailable). Unavailability of a predetermined load in compliance with an MPPT protocol for a fluid turbine operating under a fluid speed condition refers to a situation where at least one processor associated with controlling the fluid turbine load lacks access to a load complying with the MPPT protocol for the fluid speed condition. For example, the fluid speed condition may have been previously unobserved (e.g., the fluid speed condition may be surprising, rare, and/or new), and/or otherwise unassociated with a load complying with the MPPT protocol. This may occur when insufficient data is available to determine characteristics of the fluid speed condition. In some cases, a predetermined load in compliance with an MPPT protocol may be available for a first fluid speed condition, and may be unavailable for a second, related fluid speed condition. For example, a first predetermined load may be available for a substantially steady fluid speed condition associated with a mean value, but a second predetermined load may be unavailable for a fluctuating, increasing, and/or decreasing fluid speed condition associated with the same mean value.

By way of a non-limiting example, in FIGS. 5, 12, and 15, at least one processor 512 may receive from fluid speed sensor 504 an indication of a fluid speed condition $vw_6$. At least one processor 512 may query data structure 1500 using fluid speed condition $vw_6$ and determine that a predetermined load complying with the MPPT protocol for fluid turbine 100 operating under fluid speed condition $vw_6$ is unavailable. For instance, a history of fluid speed conditions may lack data for $vw_6$. Similarly, in FIG. 12, chart 1200 may lack a curved line corresponding to fluid speed condition $vw_6$.

Some disclosed embodiments involve applying a plurality of candidate loads to the fluid turbine in an iterative manner in accordance with the MPPT protocol and the fluid speed condition. A candidate load refers to a proposed or suggested load. For example, a candidate load may be used as a test and/or trial for assessing and/or investigating a performance of a fluid turbine. An iterative manner refers to a repeated, sequential, and/or ordered fashion. For example, a series of test values may be applied to a system in a sequential, and/or systematic fashion to determine which of the applied test values is optimal. Applying a plurality of candidate loads to the fluid turbine in an iterative manner in accordance with the MPPT protocol and the fluid speed condition involves imposing a series of (e.g., test) loads to the fluid turbine in a manner consistent with the MPPT protocol and the fluid speed condition. For example, at least one processor may adjust one or more loads connected to a generator associated with a fluid turbine until the load matches a particular candidate load (e.g., by operating one or more switches to apply one or more loads with different resistances, and/or by adjusting a variable electronic load). Applying the particular candidate load to the generator may cause a corresponding adjustment to a rotational velocity of the fluid turbine operating under the fluid speed condition, thereby causing a corresponding adjustment to power outputted by the generator. The at least one processor may measure and record the power output and the rotational velocity under the particular candidate load, and create a correspondence therebetween for the fluid speed condition. The at least one processor may repeat these steps (e.g., adjusting the load imposed on the generator, and measuring the corresponding rotational velocity and power output for the fluid turbine operating under the fluid speed condition) for each of the plurality of candidate loads. The at least one processor may map each measured power output to each corresponding rotational velocity for each of the plurality of candidate loads, to thereby determine a power curve for the fluid turbine operating under the fluid speed condition. The power curve may be consistent with the MPPT protocol (as described and exemplified elsewhere herein) and the fluid speed condition.

By way of a non-limiting example, in FIGS. 5 and 13, at least one processor 512 may apply a plurality of candidate loads to fluid turbine 100 in an iterative manner in accordance with the MPPT protocol and fluid speed condition $vw_6$. For instance, at least one processor 512 may iteratively adjust switch 1314 (see FIG. 13) to adjust an amount of power diverted to dump load 532, thereby adjusting an impedance imposed on generator 204 associated with fluid turbine 100. In response, at least one processor 512 may receive indications of rotational velocity and power output for fluid turbine 100 and associated generator 204 from rotation sensor 502 and power output sensor 510, respectively. For each applied load, at least one processor 512 may record the rotational velocity and power output for each of the candidate loads in memory 514 in association with fluid speed condition $vw_6$. The at least one processor 512 may apply a plurality of candidate loads to fluid turbine according to an increasing sequence, a decreasing sequence, and/or any other sequence.

Figure 16:
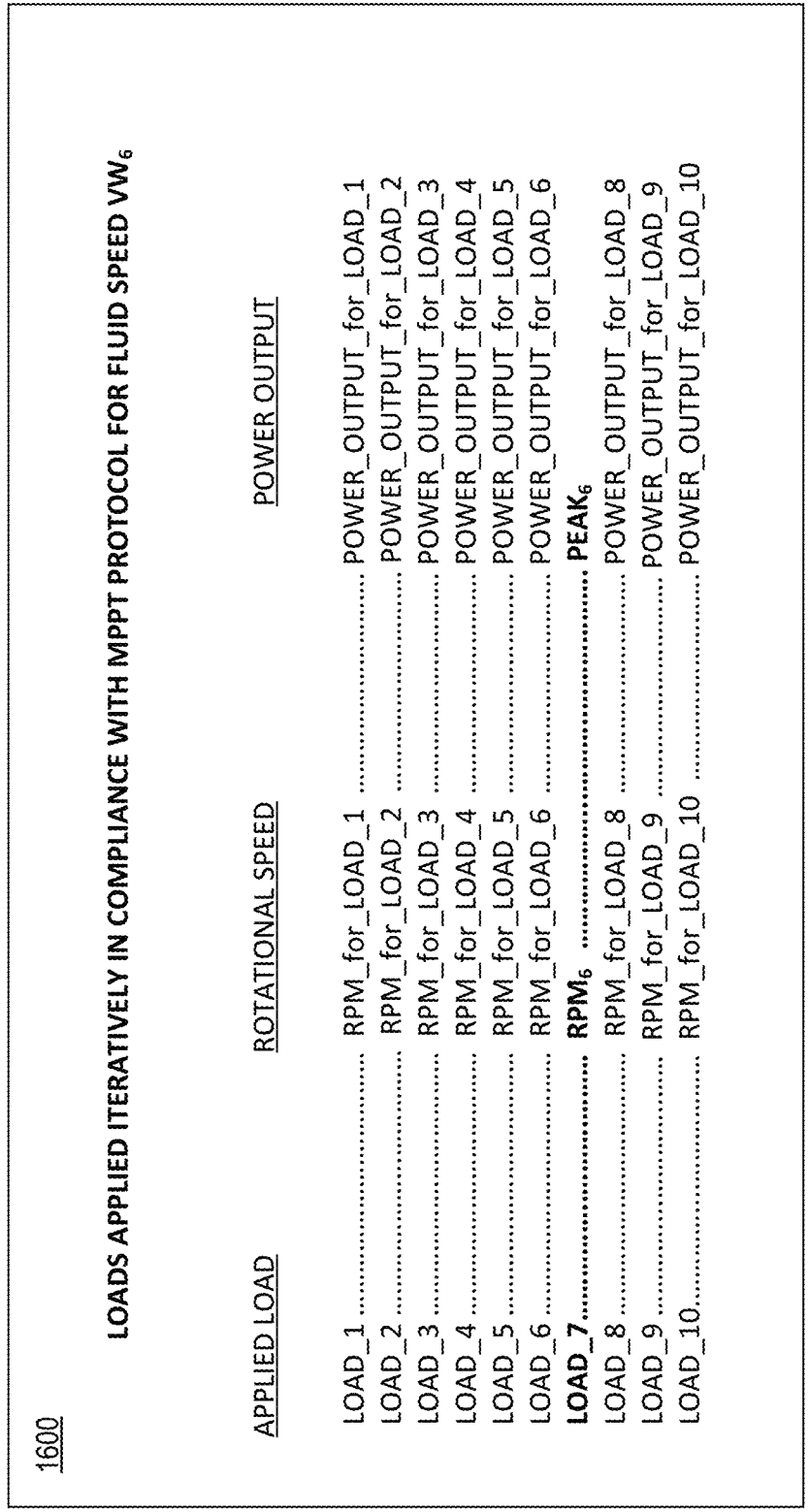
FIG. 16 is an exemplary data structure associating a plurality of loads applied in an iterative manner to a fluid turbine operating under a specific wind speed condition, with corresponding rotational velocities and power outputs, consistent with some embodiments of the present disclosure.

By way of another non-limiting example, reference is made to FIG. 16 showing an exemplary data structure 1600 associating a plurality of loads applied in an iterative manner to fluid turbine 100 operating under a specific wind speed condition $vw_6$, with corresponding rotational velocities and power outputs, consistent with some embodiments of the present disclosure. For each of the ten candidate loads applied under fluid speed condition $vw_6$, (e.g., LOAD_1 to LOAD_10), at least one processor 512 may record rotational velocities (e.g., RPM_for_LOAD_1 to RPM_for_LOAD_10) and power outputs (e.g., POWER_OUTPUT_for_LOAD_1 to POWER_OUTPUT_for_LOAD_10) in memory 514.

Some disclosed embodiments involve determining an MPPT-compliant load that, when applied to the fluid turbine operating under the fluid speed condition, generates greater power than would be generated in an absence of application of the MPPT protocol. An MPPT-compliant load refers to an output of an application of an MPPT protocol (e.g., as described and exemplified elsewhere herein). For example, an MPPT compliant load may be associated with a peak in a power curve for the fluid turbine operating under the fluid speed condition (e.g., as described earlier). Determining an MPPT-compliant load that, when applied to the fluid turbine operating under the fluid speed condition, generates greater power than would be generated in an absence of application of the MPPT protocol refers to finding a load outputted by an application of an MPPT protocol such that imposing the load on the fluid turbine operating under the fluid speed condition causes the power output to increase. In some embodiments, determining an MPPT-compliant load involves finding a load outputted by an MPPT protocol such that imposing the load on the fluid turbine causes a maximum power output for the fluid speed condition. For example, during a first time period associated with a first fluid condition, a first load may be imposed on a generator associated with a fluid turbine, causing a first power output. The first load may be an MPPT compliant load (e.g., the power outputted by the associated generator connected to the first load may be a peak or near-peak power output for the first fluid speed condition). During a second time period associated with a second fluid condition, the first load may still be imposed on the associated generator, causing the associated generator to produce a second power output. However, the first load may not be an MPPT compliant load for the second fluid condition. For instance, the second power output produced by the associated generator connected to the first load during the second time period may be different (e.g., less) than a peak power output for the second fluid speed condition. During a third time period, while the second fluid speed condition prevails, the at least one processor may apply a second load to the associated generator. The second load may be an MPPT compliant load (e.g., a generator connected to the second load may produce a peak or near-peak power output for the second fluid speed condition). The second load may be selected from the plurality candidate loads imposed by the at least one processor on the generator. The at least one processor may select the second load based on an associated power output being greater than at least some of the power outputs associated with the other candidate loads. In some embodiments, the at least one processor may select the second load based on the associated power output being greater than all the power outputs produced by the generator while connected to the other candidate loads (e.g., the second load may be associated with a peak or near-peak power output for the second fluid speed condition).

Figure 17:
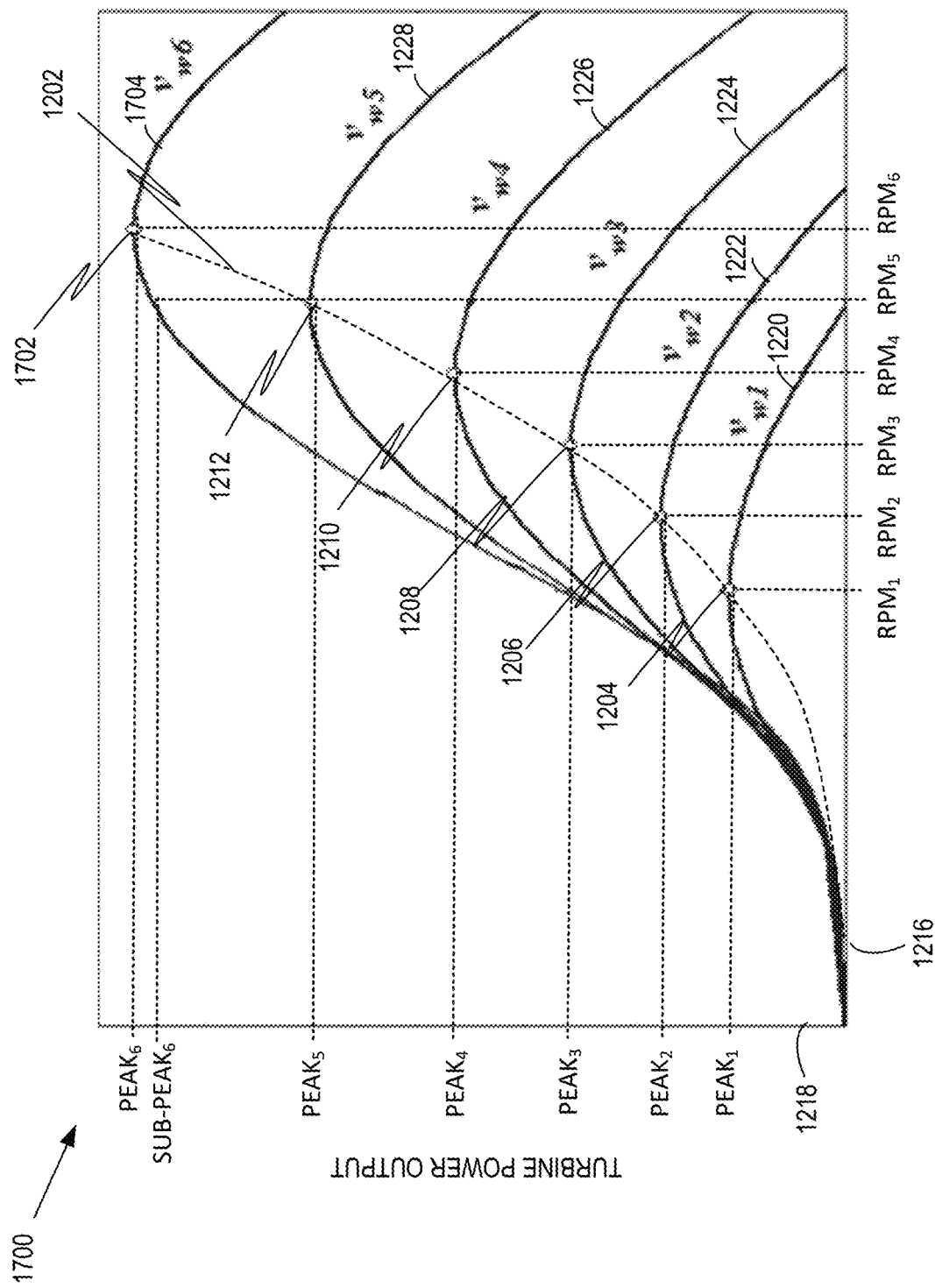
FIG. 17 is an exemplary chart showing variation of power output versus rotational speed for a fluid turbine operating at various fluid speeds, consistent with some embodiments of the present disclosure.

By way of a non-limiting example, reference is made to FIG. 17 showing another exemplary chart 1700 showing a variation of power output versus rotational speed for a fluid turbine operating at various fluid speeds, consistent with some embodiments of the present disclosure. Chart 1700 is substantially similar to chart 1200 of FIG. 12 with the notable addition of a curve 1704 corresponding to fluid speed condition $vw_6$. Curve 1704 includes a peak 1702, corresponding to rotational velocity $RPM_6$ for producing peak power output $PEAK_6$ while fluid turbine 100 operates under fluid speed condition $vw_6$. At least one processor 512 may build curve 1704 based on the data stored in data structure 1600 (see FIG. 16). At least one processor 512 may use curve 1704 and/or data structure 1600 to determine an MPPT-compliant load that, when applied to fluid turbine 100 operating under fluid speed condition $vw_6$, generates greater power than would be generated in an absence of application of the MPPT protocol. For example, at least one processor 512 may determine that applying LOAD_7 under fluid speed condition $vw_6$ causes fluid turbine 100 to spin at rotational velocity $RPM_6$ and produce peak power output $PEAK_6$, corresponding to peak 1702 of curve 1704, and that therefore LOAD-7 is an MPPT-compliant load. At least one processor 512 may identify the MPPT-compliant load by applying a numerical analysis to the data stored in data structure 1600, by determining a derivative of curve 1704 and finding a point where the derivative is zero, and/or using any other technique to identify peak 1702.

For example, in a previous time period, the fluid speed condition may have been $v_{w5}$ and at least one processor 512 may have applied MPPT_LOAD(vw5) to fluid turbine 100, causing fluid turbine 100 to spin at rotational velocity $RPM_5$ and produce peak power output $PEAK_5$. However, in a current time period, the fluid speed condition may have changed from $v_{w5}$ to $vw_6$. Applying MPPT_LOAD(vw5) under fluid speed condition $vw_6$ may cause fluid turbine 100 to spin at $RPM_5$ and generate power at a level of SUB-$PEAK_6$ (e.g., less than $PEAK_6$). At least one processor 512 may use curve 1704 and/or data structure 1600 to determine peak 1702 of curve 1704, corresponding to rotational velocity $RPM_6$. At least one processor 512 may query data structure 1600 using $RPM_6$ to determine which of loads LOAD_1 to LOAD_10 may cause fluid turbine 100 to spin at $RPM_6$ under fluid speed conditions $vw_6$, and may identify LOAD_7 as the MPPT-compliant load. Applying LOAD_7 to fluid turbine 100 operating under fluid speed condition $vw_6$ may thus cause fluid turbine 100 to generate greater power (e.g., $PEAK_6$) than would be generated in an absence of application of the MPPT protocol (e.g., SUB-$PEAK_6$).

Some disclosed embodiments involve applying the MPPT-compliant load to the fluid turbine, thereby adjusting a rotational velocity of the fluid turbine in accordance with the MPPT protocol and the fluid speed condition. Applying an MPPT-compliant load to a fluid turbine involves connecting and/or otherwise subjecting a generator associated with a fluid turbine to an MPPT-compliant load. For example, at least one processor associated with a charge controller may adjust a load connected to a generator associated with a fluid turbine such that the load matches an MPPT-compliant load determined earlier. Adjusting the load thus may cause the fluid turbine (e.g., and the associated generator) to produce a peak or near-peak power output for the fluid speed condition.

By way of a non-limiting example, in FIGS. 5 and 16-17 at least one processor 512 may apply the MPPT-compliant load (e.g., LOAD_7) to fluid turbine 100, thereby adjusting the rotational velocity of fluid turbine 100 to $RPM_6$ in accordance with the MPPT protocol and the fluid speed condition $vw_6$. While fluid turbine 100 is spinning at rotational velocity $RPM_6$, associated generator 204 may output peak power output $PEAK_6$ for fluid speed condition, corresponding to peak 1702 of curve 1704 (e.g., in compliance with the MPPT protocol). For example, at least one processor 512 may operate switch 1314 (see FIG. 13) to divert an amount of power equal to LOAD_7 to dump load 532.

Some disclosed embodiments involve storing the MPPT-compliant load in association with the fluid speed condition for subsequent application. A subsequent application of an MPPT-compliant load refers to a future, later, and/or forthcoming application of the MPPT-compliant load on the associated generator (e.g., in a future time period during which the fluid speed condition may be detected again). Storing the MPPT-compliant load in association with the fluid speed condition for subsequent application refers to writing and/or recording the MPPT-compliant load in association with the fluid speed condition in memory (e.g., accessible by at least one processor associated with controlling the fluid turbine). For instance, the at least one processor may store the MPPT-compliant load in a data structure. The data structure may be indexed according to fluid speed conditions, allowing the at least one processor to query the data structure for the MPPT-compliant load using the associated fluid speed condition as a query term. The data structure may be associated with a relational and/or non-relational database and may include one or more tables, arrays, matrices, linked lists, graphs (e.g., directed graphs), trees, hierarchies, and/or any other arrangement for data.

By way of a non-limiting example, reference is made to FIG. 18 illustrating another exemplary data structure 1500 associating a plurality of fluid speed conditions $v_{w1}$ to $vw_6$ with a plurality of MPPT compliant loads MPPT_LOAD$(vw_1)$ to MPPT_LOAD$(vw_6)$, consistent with some embodiments of the present disclosure. At least one processor 512 may access memory 514 to store MPPT-compliant load LOAD_7 in association with fluid speed condition $vw_6$ inside data structure 1500 for subsequent application. For instance, LOAD_7 may be stored as MPPT_LOAD$(vw_6)$ associated with $vw_6$ such that querying data structure 1500 using $vw_6$ may return MPPT_LOAD$(vw_6)$. In some embodiments, at least one processor 512 may additionally or alternatively store curve 1704 associated with $vw_6$ in chart 1700. Upon subsequently receiving another indication of fluid speed condition $vw_6$, at least one processor 512 may query data structure 1500 using fluid speed condition $vw_6$ to retrieve MPPT_LOAD($vw_6$), and apply MPPT_LOAD ($vw_6$) to fluid turbine 100 and/or generator 204. Applying MPPT_LOAD($vw_6$) may cause fluid turbine 100 and/or generator 204 to spin at rotational velocity $RPM_6$ and output power at $PEAK_5$, in accordance with the MPPT protocol.

In some disclosed embodiments, the fluid turbine is located in a cluster of fluid turbines. A cluster of fluid turbines may be understood as described and exemplified elsewhere in herein. For example, at least one processor may perform operations for determining at least one power curve for a cluster of fluid turbines. In some embodiments, the at least one processor may determine a different power curve for each turbine in a cluster. For instance, a cluster may include different types of fluid turbines, and/or fluid turbines having different characteristics. In some embodiments, the at least one processor may determine the same power curve for at least some fluid turbine in a clusters. For example, at least some of the fluid turbines in the cluster may be of a similar type and/or may have substantially similar characteristics.

In some embodiments, determining at least one power curve for a cluster of fluid turbines may enable coordinating positions of a plurality of blades for at least some fluid turbines. Coordinating the blade positions may enable achieving a greater aggregate power output than would be achieved without coordinating the blade positions. For example, at least one processor may temporarily adjust a load and/or a brake applied one or more fluid turbines and associated generators in the cluster causing the one or more fluid turbines to slow or increase in rotational speed, thereby affecting a relative phase in blade positions between different fluid turbines in the cluster. Affecting the relative phase in blade positions may enable at least one blade of at least one upstream fluid turbine in the cluster to produce a fluid flow that may be encountered by at least one blade of at least one downstream fluid turbine in the cluster. The fluid flow produced by the at least one upstream fluid turbine may cause the at least one downstream fluid turbine to generate greater power than would be generated if the blade positions between the at least one upstream and at least one downstream fluid turbines were not coordinated using the at least one power curve.

Additionally or alternatively, in some embodiments, a blade shape and/or orientation may affect how much power may be generated by one or more fluid turbines. For example, the differently shaped blades may interact differently with a fluid flow. Similarly, differently oriented blades may interact differently with a fluid flow, depending on the fluid flow direction. For instance, some fluid turbine designs may be associated with a blade phase (e.g., an orientation of the blades relative to a direction of a fluid flow). Under a specific fluid flow direction, a fluid turbine oriented according to a first blade phase may produce greater power than if the fluid turbine were oriented according to a second blade phase. Determining at least one power curve for a cluster of fluid turbines may enable adjusting one or more blade phases for at least some fluid turbines. Adjusting one or more blade phases may enable achieving a greater aggregate power output for a specific fluid flow direction than would be achieved without adjusting the one or more blade phases.

Thus, determining and/or using at least one power curve to coordinate relative blade positions between different fluid turbines in a cluster and/or adjust one or more blade phases relative to a fluid flow direction may cause the cluster to generate a greater aggregate power output than would be generated absent coordinating the relative blade positions and/or adjusting the blade phases.

By way of a non-limiting example, in FIG. 3, the fluid turbine may be located in cluster 300 of fluid turbines 100A, 100B, and 100C. Each of fluid turbines 100A, 1006, and 100C may be associated with a dedicated charge controller 410 (see FIG. 5) and/or sensors 418. Each of fluid turbines 100A, 1006, and 100C may be associated with the same or different power curve that may be used by the dedicated charge controller 410 to adjust a load imposed thereon to cause each of fluid turbines 100A, 1006, and 100C to spin at a rotational speed complying with an MPPT protocol and fluid flow 210.

In some disclosed embodiments, the fluid speed condition is associated with a pattern, and wherein obtaining the predetermined load is based on the pattern. A pattern refers to a recognizable and/or repeated arrangement (e.g., of one or more elements and/or characteristics). In some embodiments, a pattern may include a plurality of data points indicating a repeatable sequence, for instance, a pattern may be associated with one or more statistical correlations (e.g., where a first set of data points exhibits a relationship with a second set of data points), relationships, and/or trends. The repetitive characteristic of a pattern may be used to make one or more predictions. For example, a pattern may indicate that something that occurred previously may occur subsequently (e.g., a pattern may include a weather forecast). Patterns may be utilized in learning systems (e.g., artificial intelligence systems employing machine learning) trained to discern one or more patterns in a data set for making one or more predictions, decisions, and/or classifications. A fluid speed condition associated with a pattern refers to data associated with one or more fluid speed conditions exhibiting at least one pattern. The pattern may be indicative of a particular (e.g., repeatable) fluid speed condition. For example, at least one processor may collect data associated with one or more fluid speed conditions over a time period. The at least one processor may analyze the collected data to discern one or more patterns, each pattern may be indicative of one of more characteristics associated with a fluid speed condition. Some exemplary patterns that may be associated with a fluid speed condition may include a steady fluid speed over a time period, an increase in fluid speed over a time period, a decrease in fluid speed over a time period, and/or a level of turbulence over a time period. Each fluid speed condition may be associated with a different level of fluid flow energy that may be converted to electrical energy by a fluid turbine and an associated generator.

For instance, first, second, third, and fourth fluid speed conditions may be associated with a substantially similar average fluid speed. However, the first fluid speed condition may be associated with a first pattern indicative of an acceleration in fluid speed over a first time period (e.g., an increase in fluid flow energy), the second fluid speed condition may be associated with a second pattern indicative of a deceleration in fluid speed over a second time period (e.g., a decrease in fluid flow energy), the third fluid speed condition may be associated with a third pattern indicative of a substantially unchanged fluid speed over a third time period (e.g., a steady fluid flow energy), and the fourth fluid speed condition may be associated with a fourth pattern indicative of turbulence over a fourth time period. Thus, although on average, the first, second, third, and fourth fluid speed conditions are similar, the level of energy contained in each fluid speed condition over the time period may differ.

The at least one processor may analyze data associated with each fluid speed condition and determine that the second fluid speed condition contains greater fluid flow energy than the first fluid speed condition, and the first fluid speed condition contains greater fluid flow energy than the third fluid speed condition. The at least one processor may determine that the fluid flow energy contained in the fourth fluid speed condition y may not be fully useable by the fluid turbine due to drag imposed on the turbine blades. Accordingly, at least one processor may apply different loads, in compliance with an MPPT protocol, for diverting different levels of electrical energy for each of the first, second, third, and fourth fluid speed conditions (e.g., notwithstanding similar statistical average there between). Applying the different loads for each respective fluid speed condition in compliance with the MPPT protocol may cause the fluid turbine and associated generator to produce greater power output under each flow speed condition than would be generated in absence of application of the MPPT protocol.

For instance, because fluid flow is related to the fluid speed cubed, unstable fluid flow conditions may be associated with greater energy than stable fluid flow conditions. Thus, two fluid flows having similar average (or mean) speeds but different fluctuations about the average speed (e.g., different variances) may be associated with different MPPT-compliant loads. For a relatively stable fluid flow (e.g., small variance about the mean), the at least one processor may determine a first MPPT-compliant load. For an unstable fluid flow (e.g., large variance about the mean), at least one processor may choose a second MPPT-compliant load greater than the first MPPT-compliant load based on the greater variance about the mean. As an example, according to the power formula, energy carried in a steady fluid flow of 3 m/s for a fluid turbine of cross-section 1 meter may be calculated as:

$$P=0.5*area*air\ density(1.2)*speed\ cubed=16.2\ watts$$

However, under fluctuating flow speed conditions swinging between 0 m/s and gusts of 6 m/s, the average energy carried is:

$$½*energy\ in\ a\ 0\ m/s\ fluid\ flow+½*energy\ in\ a\ 6\ m/s\ fluid\ flow=64.8\ watts.$$

Therefore, determining one or more patterns associated with a fluid flow condition may allow the at least one processor to determine MPPT-compliant loads based on the patterns. In the example, given, an MPPT-compliant load for a steady fluid speed of 3 m/s may be calculated based 16.2 watts of energy included therein, and an MPPT-compliant load for a fluid speed averaging 3 m/s and fluctuating between 0 m/s and 6 m/s may be calculated based on 64.8 watts of energy included therein.

In some embodiments, the at least one processor may establish (e.g., fix) one or more loads for one or more fluid speed conditions by storing the loads in a data structure on a memory device, while one or more loads for other fluid speed conditions may remain unfixed (e.g., may not yet be established). For example, there may be ample data for establishing a predetermined load for a steady fluid speed condition (e.g., 3 m/s), but scant data for fluctuating fluid speed conditions, preventing establishment of a predetermined load for unstable fluid speed conditions (e.g., fluctuating between 0 m/s and 6 m/s). Thus, the at least one processor may only have partial data for applying a predetermined MPPT-compliant load to a fluid turbine, such that for some fluid speed conditions, the at least one processor may obtain a predetermined MPPT-compliant load, and for other fluid speed conditions, the at least one processor may need to determine an MPPT-compliant load using an iterative process with a plurality of test loads, as described elsewhere herein.

Obtaining a predetermined load based on a pattern involves using a pattern to access a predetermined load. For example, a pattern may be used to query a database storing a plurality of predetermined loads, each predetermined load associated with a different fluid speed condition and/or one or more patterns associated therewith. Returning to the example above, while a fluid turbine operates under the first fluid speed condition (e.g., accelerating fluid speed), at least one processor may query the database using the first pattern to obtain a first load for applying to the fluid turbine and associated generator. While the fluid turbine operates under the second fluid speed condition (e.g., decelerating fluid speed), at least one processor may query the database using the second pattern to obtain a second load for applying to the fluid turbine and associated generator. While the fluid turbine operates under the third fluid speed condition (e.g., steady fluid speed), at least one processor may query the database using the third pattern to obtain a third load for applying to the fluid turbine and associated generator.

Some disclosed embodiments involve applying a machine learning technique to determine the pattern. Machine learning refers to statistical and/or artificial intelligence techniques enabling at least one processor to perform and/or improve performance of one or more computational tasks. A machine learning technique (as described and exemplified elsewhere herein) may use one or more patterns, relationships, and/or trends gleaned and/or mined from a first data set to make one or more predictions, decision, and/or classifications on a second data set. In some embodiments, a machine learning engine may represent a pattern as a probability distribution and/or a probability density function (PDF).

For example, during a first time period (e.g., a training period), at least one processor may collect data associated with a plurality of (e.g., unknown) fluid speed conditions affecting one or more fluid turbines and store the data in memory. At least one processor may apply machine learning to the data to determine one or more patterns (e.g., including correlations, relationships, and/or trends). Such patterns may include, for example, steady fluid speeds, increasing, decreasing, and/or fluctuating fluid speeds for the same or different time periods. The at least one processor may use the patterns to identify and/or classify one or more fluid speed conditions, and store one or more of the identified fluid speed conditions and any associated patterns in a database. During a second time period, the at least one processor may receive data indicative of a current fluid speed condition. The at least one processor may analyze the received data to detect one or more patterns, and query the database with the one or more patterns to identify and/or classify the current fluid speed condition. For instance, the at least one processor may determine that the current fluid speed condition is substantially similar to a prior fluid speed condition for which an MPPT-compliant load is available.

By way of a non-limiting example, in FIG. 5, at least one processor 512 may store a history of data associated with fluid speed conditions over time in memory 514, and may analyze the history to identify one or more patterns. For example, in FIG. 15, during the summer months, at least one processor 512 may identify that after two hours of detecting fluid speed condition $vw_4$, the fluid speed condition increases to $vw_5$. Therefore, after detecting fluid speed condition $vw_4$ for two hours, at least one processor 512 may obtain MPPT_LOAD(vw5) for applying to fluid turbine 100, based on the pattern (e.g., prior to receiving an indication of fluid speed condition $vw_5$). In some embodiments, at least one processor 512 may apply machine learning to a history of fluid speed conditions to detect one or more patterns.

As another example, at least one processor 512 may determine that on a daily basis, at 4 PM the fluid speed increases from 4 m/s to 5 m/s over 10 minutes, and at 9 PM the fluid speed decreases from 5 m/s to 4 m/s over 20 minutes. Since energy carried in an increasing fluid flow is greater than energy carried in a decreasing fluid flow, at least one processor 512 may retrieve different MPPT-compliant loads to apply to fluid turbine 100 during these time periods, e.g., the MPPT-compliant load applied from 4:00 PM to 4:10 PM when the fluid speed increases from 4 m/s to 5 m/s may be larger than the MPPT-compliant load applied from 9:00 PM to 9:20 PM when the fluid speed decreases from 5 m/s to 4 m/s.

In some disclosed embodiments, the pattern is based on at least one of a plurality of power generation measurements associated with the fluid turbine, a plurality of rotational speed measurements associated with the fluid turbine, or a plurality of fluid speed measurements. Power generation measurements refer to one or more metrics and/or data collected to monitor, analyze, and/or assess the performance of power generation systems. Power generation measurements may include one or more of an (e.g., AC and/or DC) current level, voltage level, and/or power level produced by a generator associated with a fluid turbine. A specific fluid speed condition may cause a fluid turbine to generate an associated power level (e.g., subject to a particular load), and thus power generation measurements may be indicative of the fluid speed condition. At least one processor may receive one or more power generation measurements from one or more current meters, voltage meters (e.g., for measuring voltage in Volts), and/or watt meters (e.g., for measuring current in Amps) associated with the fluid turbine and the associated generator. Rotational speed measurements refers to a rate of rotation by a rotatable component associated with a fluid turbine. Some rotatable components associated with a fluid turbine may include, for example, a shaft, a plurality of blades, associated supporting bars, a rotor, a rotor housing, and/or any other rotatable component connected to a fluid turbine and/or an associated generator. A rotational speed may be measured as a number of revolutions per time frame (e.g., minutes as RPM, or seconds as Hz). A specific fluid speed condition may cause a plurality of turbine blades to spin at an associated rotational speed, and thus rotational speed may be indicative of the fluid speed condition. In some embodiments, a rotational speed of a fluid turbine shaft may differ from a rotational speed of a rotor connected thereto due to one or more gears configured to increase and/or decrease a rotational speed, and/or change a rotation direction. When determining a fluid speed condition based on a rotational speed measurement, the at least one processor may account for the one or more gears. The at least one processor may receive one or more rotational speed measurements from one or more rotational speed sensors, as described elsewhere herein. A fluid speed measurement refers to an indication of speed, velocity (e.g., including speed and direction), acceleration, deceleration, and/or turbulence of a fluid flow. In some embodiments, a fluid speed measurement may include one or more measurements associated with humidity, air pressure, topography, elevation, current weather conditions (e.g., precipitation), and/or a weather forecast. For example, a fluid speed measured by a sensor located at a base of a fluid turbine, and/or on a weather balloon located above the fluid turbine, may be different from a fluid speed affecting the fluid turbine blades due to an elevation differential. At least one processor may take such an elevation differential into account when determining a fluid speed condition affecting a plurality of turbine blades based on a measurement received from a sensor positioned at a location other than the plurality of turbine blades. A fluid speed may be measured in meters per second (mps or m/s), kilometers per hour (km/h), and/or knots (kt). At least one processor may receive a fluid speed measurement from a sensor configured for measuring a fluid speed, as described and exemplified elsewhere herein.

In some disclosed embodiments, the pattern is a time-based pattern. A time-based pattern refers to a pattern that is revealed over time. For example, a time-based pattern may only be observable in a data set collected over an above-threshold time duration. In some embodiments, a time-based pattern may be observable in a data set collected over a bounded time duration lasting above a lower time threshold and below an upper time threshold. For example, a time-based pattern may be observed in data collected over 30 seconds, 1 minute, 2 minutes, 10 minutes, an hour, 12 hours, a day, a week, a month, a year, and/or any other time duration.

In some disclosed embodiments, the time-based pattern indicates a steady fluid speed over a time period. A steady fluid speed over a time period refers to a substantially unchanged fluid speed during the time period. In some embodiments, the time-based pattern indicates a steady fluid velocity over a time period. instance the speed and direction of the fluid flow may remain unchanged of a time period. In some disclosed embodiments, the time-based pattern indicates an increase in fluid speed spanning a range of fluid speeds over a time period. An increase in fluid speed spanning a range of fluid speeds over a time period refers to a positive change in fluid speed over the time period. A range of fluid speeds refers to a variation in the velocities at which a fluid, such as a liquid or a gas, flows or moves. For instance, the fluid speed may change throughout a time period, starting with a first speed at the beginning of the time period, and ending with a second fluid speed at the termination of the time period, where the first fluid speed is less than the second fluid speed. In some embodiments, the time-based pattern indicates an increase in fluid velocity spanning a range of fluid velocities over a times period. In some disclosed embodiments, the time-based pattern indicates a decrease spanning a range of fluid velocities over a time period. A decrease in fluid speed spanning a range of fluid speeds over a time period refers to a deceleration in fluid speed over the time period. For instance, the fluid speed may change throughout the time period, starting with a first fluid speed at the beginning of the time period, and ending with a second fluid speed at the termination of the time period, where the first fluid speed is greater than the second fluid speed. In some embodiments, the time-based pattern indicates a decrease in fluid velocity spanning a range of fluid velocities over a times period. In some disclosed embodiments, the time-based pattern is associated with a time of day or time of year. A time of day refers to a specific point or period within a 24-hour day. A time of day may include morning (e.g., between 4 AM and 11 AM), noon (e.g., from 11 AM to 1 PM), afternoon (e.g., from 1 PM to 5 PM), evening (e.g., 5 PM to 8 PM), or night (e.g., 8 PM to 4 PM), any other time period of a daily cycle, and/or any other specific time during a day. For example, a fluid speed may change in a predictable manner during different times of the day, e.g., a wind speed may be substantially stable during the morning, may increase in the afternoon, and may revert to a substantially stable wind speed at night. A time of year refers to a specific point or period within a 365-day year. A time of year may be seasonal, e.g., spring (from March 21 to June 20), summer (from June 21 to September 22), fall (from September 23 to December 20), and winter (from December 21 to March 20), monthly, and/or any other time period of a yearly cycle. Different times of year may be associated with particular weather patterns and seasonal winds (e.g., monsoons, cyclones, trade winds, hurricanes, tornadoes, typhoons, chinook winds, Santa Ana winds, and/or foehn winds). At least one processor may establish one or more patterns associated with a time of day and/or a time of year, and use the one or more time-of-day and/or time-of-year patterns to determine a fluid speed condition.

By way of a non-limiting example, in FIG. 5, at least one processor 512 may receive data from sensors 418 over a time period (e.g., several days, several weeks, several months, and/or any other time period), and store the received data in memory (e.g., memory 514). For example, at least one processor 512 may receive power generation measurements associated with fluid turbine 100 and/or generator 204, (e.g., generated NC and/or D/C current, voltage, and/or power levels over time) from power output sensor 510, rotational speed measurements associated with fluid turbine 100 and/or generator 204 from rotation sensor 502 and/or image sensor 524, and/or fluid flow measurements indicative of one or more fluid speed conditions associated with fluid flow 210 from fluid speed sensor 504. Additionally or alternatively, at least one processor may receive vibration measurements associated with fluid turbine 100 and/or generator 204 from vibration sensor 506 (e.g., indicating a rotational velocity has exceeded a rotation threshold value), and/or temperature measurements associated with generator 204 from temperature sensor 508 (e.g., indicating a power output has exceeding a power generation threshold). At least one processor 512 may apply a machine learning engine to the collected data to identify one or more patterns. For instance, at least one processor 512 may identify one or more patterns based on at least one of the plurality of power generation measurements, the plurality of rotational speed measurements, or the plurality of fluid speed measurements.

In some embodiments, at least one processor 512 may identify a time-based pattern from the data. For instance, the time-based pattern may indicate a steady fluid speed over a time period, an increase and/or decrease spanning a range of fluid velocities over a time period, and/or an association with a time of day or time of year.

For example, at least one processor 512 may determine a first time-based pattern indicating a substantially steady fluid speed of 4 m/s between 10 PM and 4 AM (e.g., at night until pre-dawn), a second time-based pattern indicating that fluid speed decreases from 5 m/s to 4 m/s during sunset, and a third time-based pattern indicating that fluid speed increases from 4 m/s to 5 m/s between 11 AM and 5 PM (e.g., from late morning to early evening). At least one processor 512 may determine a different MPPT-compliant load for associating with each of the first, second, and third time-based patterns. As another example, at least one processor 512 may determine a fourth time-based pattern indicating an average fluid speed of 5 m/s during the winter months, and an average fluid speed of 4 m/s in the summer months, and may use these time-based patterns to determine one or more associated MPPT-compliant loads. As a further example, at least one processor 512 may determine a fifth time-based pattern indicating an emergence of turbulence when fluid speeds change by more than 1 mps within a 1-hour time frame and determine an associated MPPT-compliant load for applying to fluid turbine 100 to prevent cyclical loading which may damage blades 206 and 208.

In some disclosed embodiments, obtaining the predetermined load and applying the predetermined load to the fluid turbine is associated with a faster fluid turbine response time than applying the plurality of candidate loads to the fluid turbine in an iterative manner, determining the MPPT-compliant load, and applying the MPPT-compliant load to the fluid turbine. A fluid turbine response time refers to a time duration from when at least one processor receives an indication of a fluid speed condition until a rotational velocity of the fluid turbine is adjusted in accordance with the MPPT protocol for the fluid speed condition. For example, a fluid turbine response time may include the time from when the at least one processor receives the indication until the rotational velocity of the fluid turbine and the power outputted by the associated generator reach a steady state under the MPPT-compliant load). A faster fluid turbine response time refers to a shorter time duration for causing a fluid turbine to spin at a rotational velocity in accordance with the MPPT protocol and the fluid speed condition upon receiving an indication of the fluid speed condition. For example, a first time duration taken to adjust a rotational velocity of a fluid turbine by applying a predetermined load may be shorter than a second time duration taken to adjust the rotational velocity of the fluid turbine by applying a plurality of candidate loads in an iterative manner and determining an MPPT-compliant load. This may be due to one or more latencies incurred to determine an MPPT-compliant load from a plurality of candidate loads. Such latencies may include, for example, a plurality of response times for the fluid turbine and the associated generator to reach each steady-state rotational velocity and power output for each applied candidate load (e.g., fluid turbine and generator response time), a plurality of communication latencies for receiving a plurality of measurement sets from the one or more sensors for each candidate load, a computational latency incurred by the at least one processor to determine which of the plurality of candidate loads is MPPT-compliant, latencies incurred to apply the MPPT-compliant load to the fluid turbine, and/or any other incurred latencies. By contrast, latencies incurred by applying an (e.g., single) predetermined load to a fluid turbine may include only a single response time for the fluid turbine and associated generator to reach a steady-state rotational velocity and power output, a single communication latency for receiving a single set of measurements from the one or more sensors, and a negligible computational latency for retrieving the predetermined load from memory.

In some embodiments, a response time for obtaining and applying a predetermined MPPT-compliant load to a fluid turbine may be substantially similar to a response time for applying an MPPT-compliant load, after determining the MPPT-compliant load via the iterative process based on the MPPT protocol. In other words, the time to apply an MPPT-compliant load using an iterative process may be longer than the time to apply a predetermined MPPT-compliant load by the amount of time needed to test each of the plurality of candidate loads, receive measurements for each candidate load, and determine which of the candidate loads is MPPT-compliant based on the measurements. For instance, determining an MPPT-compliant load by testing 10 different candidate loads may take 10-times as long as applying a predetermined MPPT-compliant load stored in memory. Such a time difference may be significant when attempting to maintain compliance of a fluid turbine with an MPPT protocol (e.g., to ensure a peak or near-peak power output) under dynamically changing fluid speed conditions. Consequently, upon determining an MPPT-compliant load for a fluid turbine under a specific fluid speed condition, the at least one processor may store the MPPT-compliant load for subsequent use, e.g., as a predetermined load in compliance with an MPPT protocol for the fluid turbine operating under the fluid speed condition.

By way of a non-limiting example, in FIGS. 15-16, a response time associated with at least one processor 512 obtaining and applying predetermined load MPPT_LOAD (Vw5) to fluid turbine 100 under fluid speed condition $vw_5$ may be faster than a response time for applying plurality of candidate loads LOAD_1 to LOAD_10 to fluid turbine 100 in an iterative manner, determining that LOAD_7 is MPPT-compliant, and applying the MPPT-compliant LOAD_7 to fluid turbine 100 under fluid speed condition $vw_6$. For instance, the response time for obtaining MPPT_LOAD ($Vw_5$) from data structure 1500 and applying predetermined load MPPT_LOAD ($Vw_5$) to fluid turbine 100 under fluid speed condition $vw_5$ may be substantially similar to the time for obtaining LOAD_7 from data structure 1600 and applying MPPT-compliant LOAD_7 to fluid turbine 100 under fluid speed condition $vw_6$. Consequently, time saved by using a predetermined load stored in data structure 1500 may correspond to time incurred to apply each of candidate loads LOAD_1 to LOAD_10 to fluid turbine 100 and generator 204 until an associated rotational velocity reaches a steady state, time to receive one or more measurements from sensors 418 relating to rotational velocity and power output, and time for computing which of candidate loads LOAD_1 to LOAD_10 is associated with a peak power output, and is therefore MPPT-compliant. Reducing the response time in this manner may allow applying MPPT-compliant loads with greater accuracy, particularly under fluctuating and/or varying fluid conditions, thereby improving fluid turbine performance.

Figure 19:
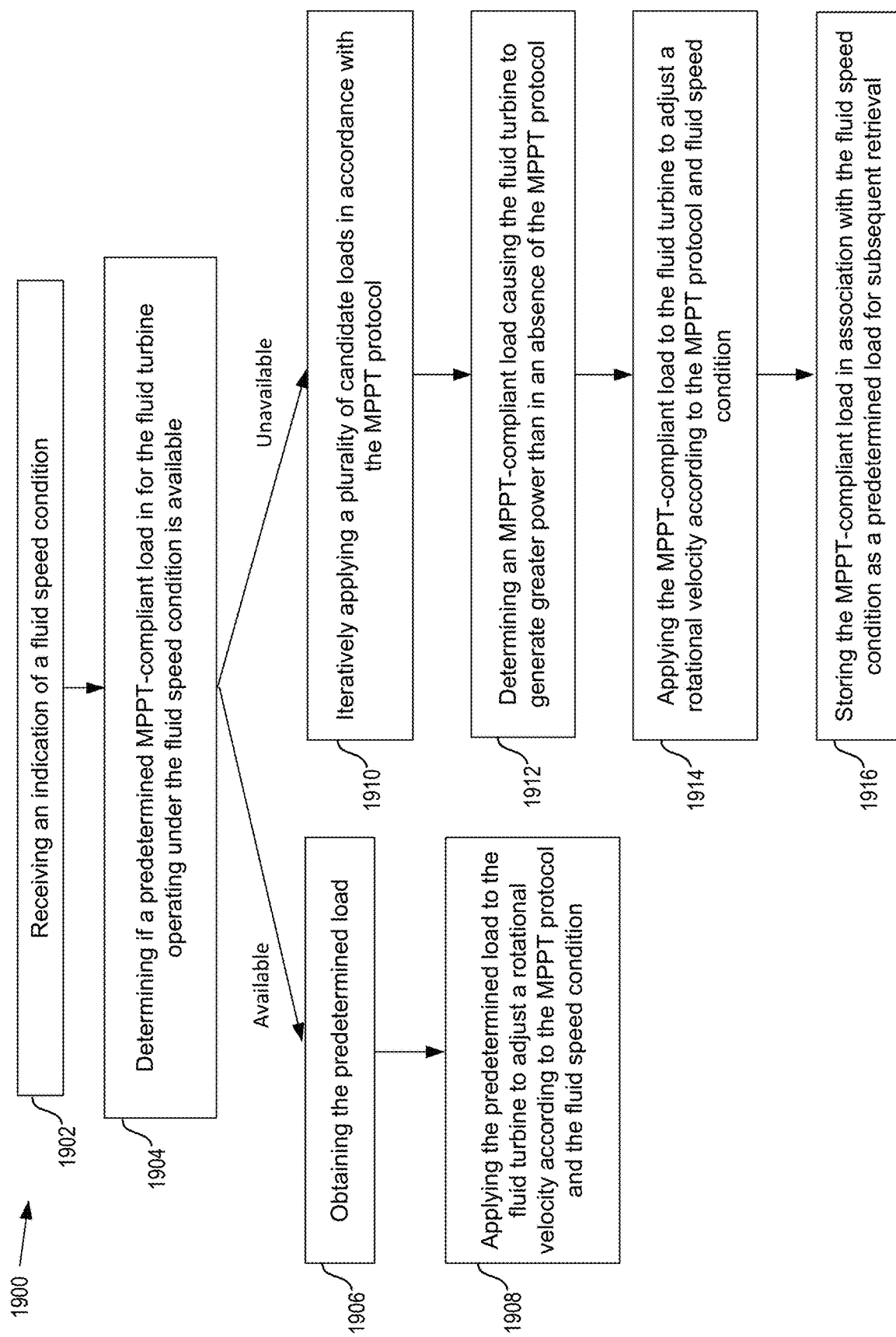
FIG. 19 is a flowchart of an example process for determining a power curve for a fluid turbine, consistent with some disclosed embodiments.

FIG. 19 is a flowchart of example process 1900 for determining a power curve for a fluid turbine, consistent with embodiments of the present disclosure. In some embodiments, process 1900 may be performed by at least one processor (e.g., processor 512 shown in FIG. 5 and/or processor 428 shown in FIG. 4) to perform operations or functions described herein. In some embodiments, some aspects of process 1900 may be implemented as software (e.g., program codes or instructions) that are stored in a memory (e.g., memory 514 and/or 430) or a non-transitory computer readable medium. In some embodiments, some aspects of process 1900 may be implemented as hardware (e.g., a specific-purpose circuit). In some embodiments, process 1900 may be implemented as a combination of software and hardware.

Referring to FIG. 19, process 1900 may include a step 1902 of receiving an indication of a fluid speed condition. By way of a non-limiting example, in FIG. 5, in a first time period, at least one processor 512 may receive an indication of fluid speed condition vw5 from sensors 418, and in a second time period, at least one processor 512 may receive an indication of fluid speed condition vw6 from sensors 418.

Process 1900 may include a step 1904 of determining when a predetermined load in compliance with an MPPT protocol for the fluid turbine operating under the fluid speed condition is available. By way of a non-limiting example, in FIG. 15, during the first time period associated with fluid speed condition vw5, the at least one processor may determine availability of predetermined MPPT_LOAD(vw5) in data structure 1500 stored in memory 514, e.g. by querying data structure 1500 using vw5 and retrieving MPPT_LOAD (vw5) as a non-NULL response. Predetermined MPPT_LOAD(vw5) may be in compliance with an MPPT protocol for fluid turbine 100 operating under fluid speed condition vw5. During the second time period associated with fluid speed condition vw6, the at least one processor may determine unavailability of a predetermined load in data structure 1500, e.g., by querying data structure 1500 using vw6 and receiving a NULL value in response.

Upon determining availability of the predetermine load in compliance with the MPPT protocol, process 1900 may include a step 1906 of obtaining the predetermined load. By way of a non-limiting example, during the first time period, in FIG. 15, the at least one processor may obtain predetermined MPPT_LOAD(vw5) from data structure 1500 stored in memory 514.

Process 1900 may include a step 1908 of applying the predetermined load to the fluid turbine, thereby adjusting a rotational velocity of the fluid turbine in accordance with the MPPT protocol and the fluid speed condition. By way of a non-limiting example, in FIG. 5, at least one processor 512 may apply predetermined MPPT_LOAD(vw5) to fluid turbine 100 by diverting a corresponding amount of electrical power generated by generator 204 to dump load 532 and/or to battery bank 720.

Upon determining unavailability of the predetermine load in compliance with the MPPT protocol, process 1900 may include a step 1910 of applying a plurality of candidate loads to the fluid turbine in an iterative manner in accordance with the MPPT protocol for the fluid turbine operating under the fluid speed condition. By way of a non-limiting example, during the second time period, in FIG. 16, at least one processor 512 may apply plurality of candidate loads LOAD_1 to LOAD_10 to fluid turbine 100 in an iterative manner (e.g., sequentially) in accordance with the MPPT protocol for fluid turbine 100 operating under fluid speed condition vw6.

Process 1900 may include a step 1912 of determining an MPPT-compliant load that, when applied to the fluid turbine operating under the fluid speed condition, generates greater power than would be generated in an absence of application of the MPPT protocol. By way of a non-limiting example, in FIGS. 16-17, at least one processor 512 may determine MPPT-compliant load LOAD_7 that, when applied to fluid turbine 100 operating under the fluid speed condition vw6, generates greater power (e.g., PEAK6) than would be generated in an absence of application of the MPPT protocol (e.g., SUB-PEAK6).

Process 1900 may include a step 1914 of applying the MPPT-compliant load to the fluid turbine, thereby adjusting a rotational velocity of the fluid turbine in accordance with the MPPT protocol for the fluid turbine operating under the fluid speed condition. By way of a non-limiting example, in FIG. 5, at least one processor 512 may apply predetermined LOAD_7 to fluid turbine 100 by diverting an amount of electrical power generated by generator 204 to dump load 532 and/or to battery bank 720.

Process 1900 may include a step 1916 of storing the an MPPT-compliant load in association with the fluid speed condition as a predetermined load for subsequent retrieval. By way of a non-limiting example, in FIG. 18, at least one processor 512 may access memory 514 and store MPPT-compliant load LOAD_7 in association with fluid speed condition vw6 inside data structure 1500 for subsequent application (e.g., as MPPT_LOAD(vw6)). In some embodiments, in FIG. 17, at least one processor 512 may additionally or alternatively store curve 1704 associated with $vw_6$ in chart 1700.

Some embodiments involve a system for the steps discussed above. By way of a non-limiting example, in FIGS. 2A, 5, and 15-18, in a first time period, at least one processor 512 may receive an indication of fluid speed condition $vw_5$ from sensors 418, and in a second time period, at least one processor 512 may receive an indication of fluid speed condition $vw_6$ from sensors 418. During the first time period associated with fluid speed condition $vw_5$, the at least one processor may determine availability of predetermined MPPT_LOAD($vw_5$) in data structure 1500 stored in memory 514, e.g., by querying data structure 1500 using fluid speed condition $vw_5$. Predetermined MPPT_LOAD ($vw_5$) may be in compliance with an MPPT protocol for fluid turbine 100 operating under fluid speed condition $vw_5$. At least one processor 512 may obtain predetermined MPPT_LOAD($vw_5$) from data structure 1500 and apply predetermined MPPT_LOAD($vw_5$) to fluid turbine 100 thereby causing fluid turbine and/or associated generator 402 to spin at rotational speed $RPM_5$ and output power at $PEAK_5$ in compliance with the MPPT protocol for fluid turbine 100 operating under fluid speed condition $vw_5$. For example, at least one processor 512 may divert to dump load 532 and/or to battery bank 720 an amount of electrical power generated by generator 204 equivalent to MPPT_LOAD ($vw_5$).

During the second time period associated with fluid speed condition $vw6$, at least one processor 512 may determine unavailability of a predetermined load in data structure 1500. For instance, at least one processor 512 may query data structure 1500 and receive a NULL value in response. At least one processor 512 may apply plurality of candidate loads LOAD_1 to LOAD_10 to fluid turbine 100 in an iterative manner (e.g., sequentially) in accordance with the MPPT protocol for fluid turbine 100 operating under fluid speed condition $vw_6$. At least one processor 512 may determine MPPT-compliant load LOAD_7 that, when applied to fluid turbine 100 operating under the fluid speed condition $vw_6$, generates greater power (e.g., $PEAK_6$) than would be generated in an absence of application of the MPPT protocol (e.g., $SUB\text{-}PEAK_6$). At least one processor 512 may apply predetermined LOAD_7 to fluid turbine 100 by diverting an amount of electrical power generated by generator 204 to dump load 532 and/or to battery bank 720. At least one processor 512 may access memory 514 to store MPPT-compliant load LOAD_7 in association with fluid speed condition $vw_6$ inside data structure 1500 for subsequent application.

Variable fluid speeds may cause fluid turbines to produce different levels of voltages. However, some circuit components may be optimized for specific ranges of voltages, and may operate sub-optimally for other ranges. For example, channeling a high voltage generated under high fluid speeds to a circuit rated for low voltages may result in sparks or even fire. Conversely, channeling a low voltage generated under low fluid speed to a diode or a transistor rated for high voltages may fail to switch on the diode or transistor. Disclosed embodiments are provided for channeling a voltage output of one or more fluid turbines to different circuits, depending on the voltage level. Each circuit may be designed to operate optimally or near-optimally within a particular range of voltages. When the one or more fluid turbines generate a voltage in a low voltage range, a processor may operate a switch to channel the low voltage to a circuit rated for low voltages. When the one or more fluid turbines generate a voltage output within a high voltage range, a processor may operate the switch to channel the high voltage to a circuit rated for high voltages. Optionally, when the one or more fluid turbines generate a voltage in an intermediate voltage range, a processor may operate a switch to channel the intermediate voltage to a circuit rated for intermediate voltages.

Some disclosed embodiments involve a fluid turbine control system. A fluid turbine control system refers to a system for supervising, overseeing, and/or monitoring the operation of one or more fluid turbines. Such a system may include, for example, at least one processor, at least one controller, one or more sensors, switches, rectifiers, inverters, voltage regulators, boost converters, buck converters, loads, energy storage devices, brake systems, transformers, and/or any other mechanical and/or electronic component that may be used to control the operation of one or more fluid turbines. A fluid turbine control system may control one or more operational aspects of a fluid turbine, such as a rotational velocity, a braking system, an imposed load, a level of power generated by an associated generator, selection of an energy sink for consuming generated power, and/or any other operational aspect of a fluid turbine.

Some disclosed embodiments involve at least one rectifier configured to convert a least one AC voltage output of at least one fluid turbine to at least one DC voltage. An AC voltage output of a fluid turbine refers to an AC voltage produced by a generator associated with a fluid turbine, as described and exemplified elsewhere herein. A fluid turbine may transform kinetic energy of a fluid flow to rotary motion. A generator associated with the fluid turbine may convert the rotatory motion to an AC power signal (e.g., measured as Watts=Volts×Amps). An AC voltage output may correspond to a voltage of an AC power signal produced by the associated generator. A rectifier (as described and exemplified elsewhere herein) configured to convert an AC voltage output of a fluid turbine to a DC voltage refers to a rectifier connected to an AC output of a generator associated with a fluid turbine and configured to transform the AC output to a DC signal, The DC signal, for example, may be subsequently manipulated, adjusted, and/or channeled by at least one processor.

Some disclosed embodiments involve at least one sensor configured to measure at least one indication associated with the at least one DC voltage. An indication associated with a DC voltage refers to information associated with a DC voltage. Such information may include a parameter characterizing a DC voltage, for example, an AC and/or DC voltage level, a current level, and/or power level, a rotational velocity of a rotating component associated with a fluid turbine (e.g., measured in RPM), and/or a fluid speed (e.g., measured in m/s, km/h, or kt/h). In some embodiments, an indication associated with a DC voltage may include a temperature of an associated generator and/or a vibration of a component associated with a fluid turbine (e.g., when the power generated and/or an associated rotational velocity exceed one or more threshold values). A sensor (e.g., a detector, as described and exemplified elsewhere herein) configured to measure an indication associated with a DC voltage may include a volt meter, a current meter, a power meter, a rotational velocity sensor, a fluid speed sensor, a temperature sensor, a vibration sensor, and/or any other type of sensor for measuring an indication associated with a DC voltage.

Figure 20:
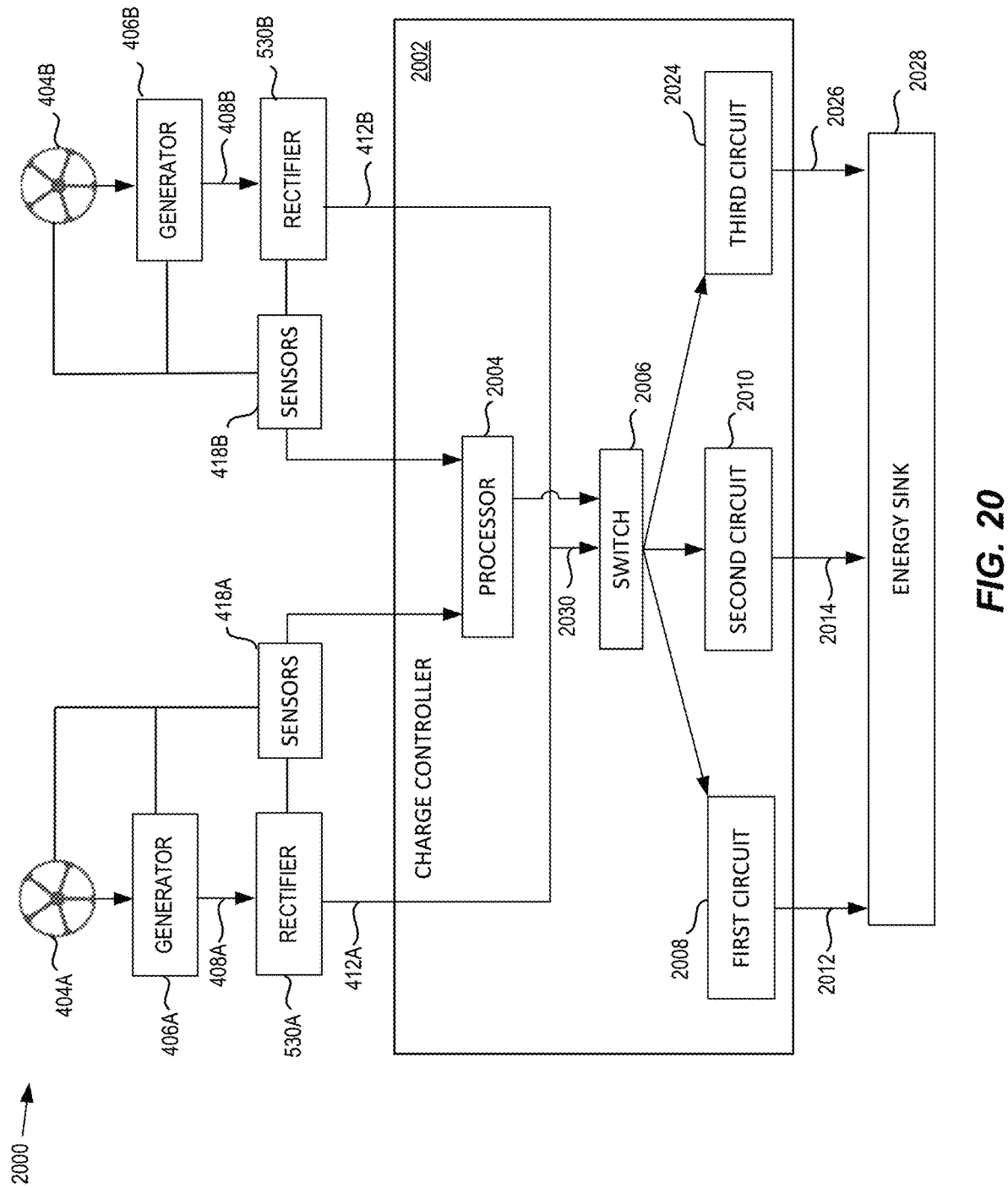
FIG. 20 is a schematic diagram of an exemplary fluid turbine control system, consistent with some embodiments of the present disclosure.

By way of a non-limiting example, in FIG. 20 illustrating a schematic diagram of an exemplary fluid turbine control system 2000, consistent with some embodiments of the present disclosure. System 2000 includes a charge controller 2002 including at least one processor 2004, at least one controllable switch 2006, a first circuit 2008 and at least a second circuit 2010. For example, at least one processor 2004 may correspond to at least one processor 428 and/or at least one processor 512. At least one rectifier 530A may convert an AC output (e.g., AC power output 408A) of generator 406A and associated fluid turbine 404A to a DC voltage (e.g., DC signal 412A). Sensors 418A may measure at least one indication associated with DC voltage 412A. For instance, in FIG. 5, fluid speed sensor 504 may measure fluid speed of a fluid flow incident on one or more blades of fluid turbine 404A, rotation sensor 502 may measure a rotational velocity associated with fluid turbine 404A and/or generator 406A, power output sensor 510 may measure AC power output 408A and/or DC signal 412A, and/or image sensor 524 may capture images enabling to determine a rotational velocity associated with fluid turbine 404A. While charge controller 2002 is shown connected to two different fluid turbines 404A and 404B and associated generators 406A and 406B (e.g., a cluster of fluid turbines) this does not limit this disclosure. In some embodiments, charge controller 2002 may be connected to only a single fluid turbine. In some embodiments, charge controller 2002 may be connected to more than two fluid turbines, e.g., as shown in FIG. 8.

Some disclosed embodiments involve a charge controller configured to receive the at least one DC voltage from the at least one rectifier and to produce a DC output. A DC (direct current) output refers to an electrical signal, voltage signal, or current produced by a device or power source that provides a flow of electric current in a single direction (in contrast to an alternating current where the direction changes). For instance, the charge controller may produce a different type of DC output depending on the DC voltage received from the at least one rectifier. A charge controller (as described and exemplified elsewhere herein) configured to receive a DC voltage from a rectifier and produce a DC output refers to a charge controller connected to an output of a rectifier, where the input of the rectifier may be connected to an output of a generator associated with a fluid turbine. The charge controller may receive a DC voltage outputted by the rectifier. In some embodiments, the charge controller may manipulate and/or adjust the DC voltage received from the rectifier and produce a different (e.g., higher or lower) DC voltage as a DC output. In some embodiments, the charge controller may output the DC voltage received from the rectifier, e.g., without manipulating and/or adjusting the DC voltage received from the rectifier. In some embodiments, each fluid turbine may be associated with a distinct, dedicated charge controller (e.g., a one-to-one relation between each charge controller and each fluid turbine). In some embodiments, a single (e.g., centralized) charge controller may be associated with each of a plurality of turbines in a cluster (e.g., a one-to-n relation between a single charge controller and multiple fluid turbines).

By way of a non-limiting example, in FIG. 20, charge controller 2002 may receive at least one DC voltage 412A from at least one rectifier 530A and produce a DC output (e.g., at least DC output 2012 or DC output 2014). In some embodiments, charge controller 2002 may be dedicated to a single fluid turbine (e.g., fluid turbine 404A and associated generator 406A). In such a case, a DC voltage 2030 flowing through charge controller 2002 may correspond to DC voltage 412A received from rectifier 530A. In some embodiments, charge controller 2002 may be a common charge controller shared by a plurality of fluid turbines in a cluster (e.g., cluster 401 including fluid turbines 404A and 404B of FIG. 4, and additionally, shown in FIG. 8). In such a case, DC voltage 2030 flowing through charge controller 2002 may correspond to an aggregate of a plurality of DC voltages outputted by a plurality of rectifiers associated with a plurality of fluid turbines and associated generators in a cluster. For instance, DC voltage 2030 may be a combination of DC voltage 412A and 412B.

Some disclosed embodiments involve a circuit configured to meet a performance criterion during operation in a DC operating range. A circuit refers to electric circuitry, as described and exemplified elsewhere herein. A circuit may be used to establish a connection between a signal source and a signal sink, thereby enabling a signal to flow from the signal source to the signal sink. A DC operating range refers to a bounded set of DC voltage, current, and/or power levels. A DC operating range may be associated with a lower and/or upper DC threshold (e.g., lower and/or upper DC voltage, current, and/or power levels). A circuit designed and/or rated for a specific DC operating range may comply with one or more associated regulations and/or recommendations. Such regulations and/or recommendations may be associated with safety, efficiency, accuracy (e.g., signal fidelity), loss, reliability, wear, cost, and/or durability. Causing a circuit to operate outside a DC operating range (e.g., above an upper DC threshold and/or below a lower DC threshold) may result in poorer performance than operation within the DC operating range, and/or may lead to failure and/or destruction of one or more system components. Performance criterion may include one or more measures associated with gauging the operation of a system. Performance criterion for a circuit may be associated with, for example, efficiency, safety, reliability, accuracy, energy consumption, energy loss, wear, response time, signal fidelity, signal loss, noise level, signal distortion, interference, temperature, monetary cost, weight, bulk, and/or any other measure associated with performance of a system. A circuit configured to meet a performance criterion during operation in a DC operating range may include electronic components designed and/or rated for a specific DC operating range such that feeding a signal within the specific DC operating range to the circuit causes a collective performance of the electronic components included therein to achieve the performance criterion. For instance, a DC circuit may include a plurality of electronic components, such as wires, resistors, capacitors, transformers, diodes, and/or transistors. Each component of a DC circuit may be designed and/or rated to operate within a specific DC operating range. Feeding a DC circuit a signal within the specific DC operating range may allow the DC circuit to meet one or more performance criteria, e.g., perform at greater efficiency, safety, and/or reliability than would be achieved if fed a signal outside the specific DC operating range. A DC circuit operating at greater efficiency may incur less loss due to heat, noise, interference, distortion, signal leakage, and/or any other factor introducing loss. A DC circuit operating in compliance with one or more safety standards may reduce risk of overheating, fire, and/or explosion. A circuit operating in compliance with one or more reliability standards may require less maintenance and/or replacement of components, and/or produce a signal with greater fidelity incurring less signal loss and/or distortion.

For example, a wire rated for a low-voltage range may be thinner and use less copper than a wire rated for a high-voltage range. A wire rated for a low-voltage range may have inadequate insulation for transmitting signals outside the low-voltage range. Applying an above-threshold DC voltage to a wire rated for a low-voltage range may cause the wire to heat and/or ignite. Conversely, a wire rated for a high-voltage may have thicker insulation which may introduce capacitance and change the impedance of the wire. Feeding a below-threshold DC voltage signal to such a wire, below the high-voltage range for the wire, may affect signal integrity of the low-voltage DC signal and may lead to signal degradation and loss of signal quality. Moreover, using a wire rated for a high-voltage range for a low-voltage signal may incur greater monetary cost, bulk, and/or weight, and may be less flexible than required for processing low-voltage signals.

A resistor rated for a low-voltage range may be smaller, cheaper, and/or less bulky than a resistor rated for high voltages. Using a resistor rated for a high voltages for a low voltage signal may incur unnecessary monetary expense, bulk, and/or weight. Feeding an above-threshold DC voltage to a resistor rated for a low voltages may damage the resistor, which may change the electrical characteristics of the resistor leading to unexpected or inaccurate functionality, and/or cause the resistor to break down, potentially resulting in a short circuit, sparks, smoke, and/or fire.

A capacitor designed to store a low DC voltage (e.g., charge) may have thinner plates separated by a smaller distance than a capacitor designed to store a high DC voltage. Using a capacitor rated for a high voltage to store energy associated with a low voltage may unnecessarily incur monetary expenses, bulk and/or weight. Using a capacitor rated for a low voltages to store energy associated with a high voltage may cause the dielectric material in the capacitor to overheat and/or break down, leading to a short circuit, circuit failure, sparks, fire, and/or explosion. Even if the dielectric material does not completely break down, using a capacitor rated for a low voltages to store energy associated with a high voltage may alter the capacitance value of the capacitor, change an associated impedance, and/or additional electrical characteristics of a circuit, causing the circuit to behave unexpectedly and degrading performance, e.g., by increasing current leakage. Exposing a low-voltage rated capacitor to a high voltage may cause dielectric absorption over time, causing the capacitor to retain some charge even after removal of the high voltage, degrading performance and/or stability.

A diode may be associated with a forward voltage level, which is the voltage required to allow a current to flow through the diode. A diode may fail to conduct a signal having a voltage below the forward voltage level (e.g., below the DC operating range) of the diode, causing unintentionally blockage of the signal. A diode may additionally be associated with a maximum voltage and/or current rating indicating the maximum current and/or voltage that may be passed through the diode. Feeding a high voltage to a diode rated for low voltages may cause the diode to degrade and/or break down. Diode degradation may allow current to flow in the reverse direction (e.g., reverse leakage current), disrupting circuit functionality, and leading to circuit failure, sparks, or fire. Additionally or alternatively, feeding a signal to a diode outside its operating range may incur a slower response time for the diode, and/or signal distortion.

A transistor may be associated with a threshold voltage or "turn-on" voltage, below which a transistor may fail to conduct a signal. Feeding a below-threshold voltage to a transistor may result in unintentional blockage of the signal. A transistor may additionally be associated with a maximum collector-emitter voltage rating, indicating the maximum voltage that may be applied between the collector and emitter without causing the transistor to break down. Applying a voltage above the maximum collector-emitter voltage rating of a transistor may cause excessive heat dissipation, which may degrade the transistor. Dissipation of heat may be associated with sparks or fire. A degraded transistor may be associated with signal distortion, introduction of noise, slower response times, and/or unpredictable circuit behavior.

In addition, a circuit associated with a high DC operating range may include different combinations and/or types of components than a circuit designed for a low DC operating range. For instance, a circuit designed for a high DC operating range may include one or more transformers, which may be absent from a circuit designed for a low DC operating range. A circuit designed for a high DC operating range may include larger, heavier and/or bulkier components than a circuit designed for a low DC operating range. Thus a circuit for a high DC operating range may be associated with a different layout and/or housing due to different sized components and/or inclusion of different combinations of components (e.g., a transformer) that may be absent in a circuit associated with a low DC operating range.

Some disclosed embodiments involve a first circuit configured to meet a first performance criterion during operation in a first DC operating range, and a second circuit configured to meet a second performance criterion during operation in a second DC operating range. First and second DC operating ranges refers to first and second bounded sets of DC voltages, current, and/or power levels. In some embodiments, the first and second DC operating ranges are distinct (e.g., lacking any shared voltage levels). In some embodiments, the first and second DC operating ranges include at least one common voltage level. A first circuit configured to meet a first performance criterion during operation in a first DC operating range may include electronic components rated for and/or applicable to the first DC operating range, such that feeding a signal in the first DC operating range to the first circuit enables meeting the first performance criterion. For example, the first circuit may include one or more wires, resistors, capacitors, inductors, diodes, transistors, and/or any other electronic component rated for the first DC operating range, such that feeding a DC signal in the first DC operating range causes the one or more wires, resistors, capacitors, inductors, diodes, transistors, and/or any other electronic component to operate in a manner that meets the first performance criterion. Similarly, a second circuit configured to meet a second performance criterion during operation in a second DC operating range may include electronic components rated for and/or applicable to the second DC operating range, such that feeding a signal in the second DC operating range to the second circuit enables meeting the second performance criterion. For example, the second circuit may include one or more wires, resistors, capacitors, inductors, diodes, transistors, and/or any other electronic component rated for the second DC operating range, such that feeding a DC signal in the second DC operating range causes the one or more wires, resistors, capacitors, inductors, diodes, transistors, and/or any other electronic component to operate in a manner that meets the second performance criterion.

Since fluid speed may affect a level of AC power generated by a generator associated with a fluid turbine, and a corresponding DC signal outputted by an associated rectifier, in some embodiments, the first and second DC operating ranges may correspond to first and second fluid speed ranges. The first circuit may include electronic components ranked for a range of DC voltages (and/or currents) spanning the possible and/or expected voltage and/or current signals that a fluid turbine and an associated generator may generate when driven by a fluid flow within the first fluid speed range. Similarly, the second circuit may include electronic components ranked for a range of DC voltages (and/or currents) spanning the possible and/or expected voltage and/or current signals that a fluid turbine and an associated generator may generate when driven by a fluid flow within the second fluid speed range.

For example, the first circuit may include components ranked to receive a DC signal from a rectifier when an associated fluid turbine and generator are driven by a below-threshold fluid speed, and the second circuit may include components ranked to receive a DC signal when the associated fluid turbine is driven by an above-threshold fluid speed. In some embodiments, the threshold fluid speed may be, for example, 4 m/s although other threshold fluid speeds are also contemplated. In some embodiments, the second circuit may include larger, heavier, bulkier, and/or more expensive components than the first circuit. For instance, the components of the second circuit may have heavier insulation than the components of the first circuit. Additional or alternatively, the first and second circuits may include different types of components. For instance, the second circuit may include one or more transformers and the first circuit may lack a transformer. Consequently, the first and second circuits may have a different layouts and/or a different housings due to the different sizes and/or combination of the associated electronic components.

By way of a non-limiting example, in FIG. 20, charge controller 2002 of fluid turbine control system 2000 includes first circuit 2008 configured to meet a first performance criterion during operation in a first DC operating range, and at least second circuit 2010 configured to meet a second performance criterion during operation in a second DC operating range. For example, first circuit 2008 may include one or more resistors, capacitors, inductors, diodes, and/or transistors rated for a first DC operating range between 3V and 15 V, and second circuit may include one or more resistors, capacitors, inductors, diodes, and/or transistors rated for a second DC operated range between 36 V and 72 V. In some embodiments, second circuit 2010 may include one or more transformers absent from first circuit 2008. In some embodiments, second circuit 2010 may include larger, heavier, and/or bulkier components than first circuit 2008, and/or may have a different layout and housed separately from first circuit 2008.

Feeding a DC voltage between 3V and 15 V to first circuit 2008 may cause charge controller 2002 to meet a first performance criterion (e.g., due to first circuit 2008 including components rated for DC voltages between 3V and 15 V). Feeding a DC voltage between 36 V and 72 V to second circuit 2010 may cause charge controller 2002 to meet a second performance criterion (e.g., due to second circuit 2010 including components rated for DC voltages between 36 V and 72 V). For instance, the first performance criterion may be associated with an optimal or near-optimal power output and/or response time achievable for DC voltages in the first DC operating range. Similarly, the second performance criterion may be associated with an optimal or near-optimal power output and/or response time achievable for DC voltages in the second DC operating range. Thus, feeding a DC voltage in the first DC operating range to second circuit 2010 including components rated for the second DC operating range, or feeding a DC voltage in the second DC operating range to first circuit 2008 including components rated for the first DC operating range may result in sub-optimal performance and/or violation of the first and/or second performance criterion. In some embodiments, the DC voltage fed to first circuit 2008 or second circuit 2010 is a DC voltage outputted by a single rectifier associated with a single fluid turbine. In some embodiments, the DC voltage fed to first circuit 2008 or second circuit 2010 is an aggregate DC voltage outputted by a plurality of rectifiers associated with a plurality of fluid turbines in a cluster (e.g., see FIG. 8).

Some disclosed embodiments involve a controllable switch configured to channel the DC voltage between at least the first circuit and the second circuit. A switch refers to an electronic component or device that controls the flow of electric current in a circuit. For example, a switch may be capable of toggling an electrical circuit to interrupt a signal and/or allow a signal to flow uninterrupted (e.g., capable of turning a signal on or off) and/or capable of diverting a signal from one path to at least one other path. An electronic switch may include one or more diodes and/or transistors. A controllable switch is a switch that can be operated or controlled remotely, electronically, or automatically, rather than being manually operated by a physical actuator like a traditional switch. For example, a controllable switch may be configured to respond to a trigger signal (e.g., for turning the switch on or off). A controllable switch may be associated with at least one processor. A controllable switch configured to channel a DC voltage between at least a first circuit and a second circuit refers to a switch controllable by at least one processor to divert the DC voltage to either the first circuit or the second circuit. For instance, the controllable switch may be used to establish a connection between a source of a DC voltage and one or more associated sinks for the DC voltage either via the first circuit or the second circuit. In other words, the controllable switch may be used to establish a connection between the source of the DC voltage and either the first circuit or the second circuit, and/or establish a connection between either the first circuit or the second circuit and one or more associated sinks for the DC voltage. The at least one processor may use one or more first switches between the rectifier and the first and/or second circuits to isolate the first and/or second circuits while not in use from the DC voltage source. This may prevent one or more unused components therein from drawing current from the DC voltage source, thereby preventing energy loss. Additionally or alternatively, The at least one processor may use one or more second switches between the first and/or second circuits and one or more energy sinks to isolate the first and/or second circuits while not in use from the one or more energy sinks. This may prevent power from the energy sinks from feeding back into the first and/or second circuits while not in use, thereby preventing energy loss.

In some embodiments, each of the first and second circuits may be associated with one or more (e.g., dedicated) controllable switches configured to complete or disrupt a path from a source of the DC voltage to a sink of the DC voltage, thereby allowing for control of the flow of the DC voltage either through the first circuit or the second circuit. For example, at least a first controllable switch may be located between the first circuit and an energy sink for the first circuit (e.g., a battery). Similarly, at least a second controllable switch may be located between the second circuit and an energy sink for the second circuit (e.g., an inverter connected to an electrical grid). By completing a path from source to sink, the at least first and/or second switches may cause the DC voltage to flow through the first and/or second circuit along each path, respectively.

By way of a non-limiting example, in FIG. 20, charge controller 2002 includes at least one controllable switch

2006 configured to channel a DC voltage 2030 between at least first circuit 2008 and second circuit 2010. In some embodiments, DC voltage 2030 may be a DC output associated with a single fluid turbine (e.g., DC voltage 412A produced by rectifier 530A). In some embodiments, DC voltage 2030 may be an aggregate DC voltage outputted by a plurality of rectifiers associated with a plurality of fluid turbines and associated generators in a cluster (e.g., DC voltages 412A and 412B produced by rectifiers 530A and 530B, and as shown in FIG. 8). DC voltage 2030 may be fed to at least one controllable switch 2006, such that operating controllable switch to connect at least one rectifier 530A to first circuit 2008 causes DC voltage 2030 to flow to first circuit 2008, and operating controllable switch to connect at least one rectifier 530A to second circuit 2010 causes DC voltage 2030 to flow to second circuit 2010. Although at least one controllable switch 2006 is shown located between at least one rectifier 530A (e.g., a source of DC voltage 412A) and first and second circuits 2008 and 2010, this is for illustrative purposes only, and is not intended to be limiting. It is to be noted that at least one controllable switch 2006 may be located anywhere between at least one rectifier 530A and one or more energy sinks 2028 for the DC output of charge controller 2002. For instance, one or more controllable switches may be located between an output of first circuit 2008 and second circuit 2010 and energy sink 2028. Using a switch to establish a path between rectifier 530A and energy sink 2028 may allow for alternately channeling DC voltage 2030 either through first circuit 2008 or through second circuit 2010.

Some disclosed embodiments involve at least one processor configured to receive the at least one indication associated with the at least one DC voltage from the at least one sensor, and based on the at least one indication, use the controllable switch to alternately channel the at least one DC voltage between at least the first circuit and the second circuit. At least one processor (e.g., as defined and exemplified elsewhere herein) configured to receive an indication associated with a DC voltage from a sensor refers to at least one processor in communication with one or more sensors. The one or more sensors may measure an indication associated with the DC voltage, encode and/or transmit the measured indication as an electronic signal to the at least one processor via a wired and/or wireless communications channel. At least one processor configured to use a controllable switch to alternately channel a DC voltage between a first and second circuit based on the indication refers to at least one processor configured to use the indication to operate a controllable switch to establish a conducting path from a DC voltage source to the first circuit or from the DC voltage source to the second circuit. For example, when the indication corresponds to a DC voltage within the first operating range, the at least one processor may operate the switch to establish a conducting path between the rectifier, through the first circuit, to a voltage sink, thereby allowing the DC voltage to flow through the first circuit. When the indication corresponds to a DC voltage within the second operating range, the at least one processor may operate the switch to establish a conducting path between the rectifier, through the second circuit, to a voltage sink, thereby allowing the DC voltage to flow through the second circuit.

For example, the at least one processor may receive an indication of temperature associated with a generator connected to a fluid turbine indicating whether the generator is overheating due to production of an above-threshold AC voltage (corresponding to an above-threshold DC voltage). If the temperature indicates overheating, the at least one processor may use the switch to connect to a second circuit associated with a braking system. If the temperature does not indicate overheating (e.g., corresponding to a below-threshold AC voltage and associated DC voltage), the at least one processor may operate the switch to connect to a first circuit (e.g., without the braking system).

As another example, fluid speed may be indicative of a level of AC voltage produced by a fluid turbine and an associated generator and an associated DC voltage. When the fluid speed is below a fluid-speed threshold (e.g., 4 m/s), the fluid turbine and associated generator may generate DC voltages in the first operating range. When the fluid speed is above the fluid-speed threshold, the fluid turbine and associated generator to generate a DC voltages in the second operating range. The at least one processor may receive an indication of fluid speed from a fluid speed sensor. Based on the indication, the at least one processor may operate the controllable switch to channel DC voltage via the first circuit when the fluid speed is below the fluid-speed threshold, and channel DC voltage via the second circuit when the fluid speed is above the fluid-speed threshold.

Some disclosed embodiments involve causing the charge controller to meet the first performance criterion when the at least one DC voltage is within the first DC operating range, and causing the charge controller to meet the second performance criterion when the at least one DC voltage is within the second DC operating range. Causing a charge controller to meet a first performance criterion when the DC voltage is within a first DC operating range refers to using the first circuit of the charge controller (e.g., configured to achieve the first performance criterion during operation in the first DC operating range), when the DC voltage is within the first DC operating range. For example, the first circuit may include components rated for the first DC operating range. Channeling a DC voltage in the first DC operating range to a circuit containing components rated for the first DC operating range (e.g., thereby preventing the DC voltage from being fed to components rated for a DC operating range different than the first operating range), may cause the charge controller to meet the first performance criterion. Causing a charge controller to meet a second performance criterion when the DC voltage is within a second DC operating range refers to using the second circuit of the charge controller (e.g., configured to achieve the second performance criterion during operation in the second DC operating range), when the DC voltage is within the second DC operating range. For example, the second circuit may include components rated for the second DC operating range. Channeling a DC voltage in the second DC operating range to a circuit containing components rated for the second DC operating range (e.g., thereby preventing the DC voltage from being fed components rated for a DC operating range different than the second DC operating range), may cause the charge controller to meet the second performance criterion.

For example, by operating the controllable switch to channel a DC voltage in the first DC operating range to the first circuit, the at least one processor may cause the charge controller to meet a targeted response time, signal-to-noise ratio, and/or safe-temperature threshold associated with the first performance criterion. Similarly, by operating the controllable switch to channel a DC voltage in the second DC operating range to the second circuit, the at least one processor may cause the charge controller to meet a targeted response time, signal-to-noise ratio, and/or safe-temperature threshold associated with the second performance criterion.

Conversely, channeling a DC voltage in the first DC operating range to the second circuit, or channeling a DC voltage in the second DC operating range to the first circuit may lead to slower response times, signal blockage, increased noise, signal distortion, heat dissipation leading to wear and/or circuit failure in violation of the first and/or second performance criteria.

By way of a non-limiting example, in FIG. 20, at least one processor 2004 may receive an indication associated with DC voltage 2030 from at least one sensor 418A, and based on the indication, use at least one controllable switch 2006 to channel DC voltage 2030 to one of first circuit 2008 and second circuit 2010. For instance, if DC voltage 2030 is between 3V and 15 V, at least one processor 2004 may operate at least one controllable switch 2006 to channel DC voltage 2030 to first circuit 2008. If DC voltage 2030 is between 36 V and 72 V, at least one processor 2004 may operate at least one controllable switch 2006 to channel DC voltage 2030 to second circuit 2010. Operating at least one controllable switch 2006 thus may allow at least one processor 2004 to cause charge controller 2002 to meet the first performance criterion when DC voltage 2030 is between 3V and 15 V, and meet the second performance criterion when DC voltage 2030 is between 36 V and 72 V. For example, the first performance criterion may be associated with meeting a first power conversion efficiency criterion above a first threshold when the DC voltage ranges between 3 V and 15 V. The second performance criterion may include meeting a second power conversion efficiency criterion above a second threshold when the DC voltage ranges between 36 V and 72 V.

In some disclosed embodiments, the first DC operating range is associated with a low voltage range, and the first circuit includes a voltage booster configured to raise the at least one DC output to a level complying with a first threshold. A low voltage range refers to a plurality of voltage levels each of which is less than or equal to an upper voltage threshold. A voltage booster refers to a DC-DC converter (as described and exemplified elsewhere herein) configured to receive a DC signal at a first voltage and output a DC signal at a second voltage, higher than the first voltage. Due to conservation of energy (e.g., Power=Voltage*Current, remains substantially constant), the input DC current for a voltage booster is smaller than the output DC current. A voltage booster may include one or more inductors, capacitors, resistors and/or diodes or transistors which may be rated for the low voltage range. Raising a DC output to a level complying with a threshold involves increasing a voltage of a DC signal to at least meet a threshold voltage. A DC output below the first threshold may not be a useable form of electrical energy. For example, the threshold may be associated with a minimal voltage required by one or more electronic devices, such as to charge a battery, power a processor and/or memory device, and/or power a braking system for a fluid turbine and an associated generator. Thus, failing to raise a DC output to a level complying with a threshold may lead to energy loss, which may negatively affect the efficiency of a fluid turbine and an associated generator. Increasing the voltage may cause a corresponding decrease in current, due to conservation of energy. At least one processor may cause a DC output to be raised to a level complying with a threshold of one or more electronic components. For example, the at least one processor may cause a DC output to exceed a forward voltage level of a diode, and/or a threshold voltage of a transistor. A voltage booster configured to raise a DC output to a level complying with a first threshold may include circuitry configured to establish a connection between a DC input of a voltage booster to a DC output of the rectifier when the DC output of the rectifier is less than the first threshold, thereby producing a DC signal at least meeting (e.g., that is greater than or equal to) the first threshold.

In some disclosed embodiments, the low voltage range is associated with a low fluid speed range. A low fluid speed range includes a plurality of fluid speeds each of which is less than or equal to an associated upper fluid speed threshold. A rotational speed of a fluid turbine spinning in response to a fluid flow within a low fluid speed range may be slower than a rotational speed of the fluid turbine spinning in response to a fluid flow exceeding the low fluid speed range, causing a corresponding slower rotational speed of a rotor of an associated generator. Consequently, less mechanical energy may be available for converting to electrical energy at fluid speeds in the low fluid speed range, leading to lower voltages than would be generated from a fluid flow exceeding the low fluid speed range.

In some disclosed embodiments, the first threshold is associated with an energy storage component configured to receive the DC output from the first circuit for storage as DC energy. An energy storage component may refer to a device or group of devices configured to accumulate and/or collect (e.g., electrical) energy for subsequent use. An energy storage component may store electrical energy as potential energy for subsequent use (e.g., as kinetic energy for performing work). In some embodiments, AC electrical energy may be converted to DC electrical energy (e.g., as a DC voltage potential) for accumulation in an energy storage component. Some examples of at least one energy storage component may include one or more batteries and/or capacitors. A threshold associated with an energy storage component refers to an upper and/or lower bound associated with a rating for an energy storage component. Applying a signal to an energy storage component above an upper threshold for an energy storage component may cause overheating, sparks, and/or fire. Applying a signal to an energy storage component (e.g., a battery) below a lower threshold may result in failure to store at least some of the energy contained in the signal. An energy storage component configured to receive a DC output from a circuit for storage as DC energy refers to an energy storage component connected to a DC output of a circuit in a manner complying with voltage and/or current requirements of the energy storage component, allowing the DC output to flow from the circuit to the energy storage component. For example, the energy storage component may be connected using one or more wires, switches (e.g., diodes and/or transistors), resistors, capacitors, inductors, and/or any other electronic component to feed and/or regulate a DC output of a circuit to a DC input of an energy storage component. In some disclosed embodiments, the energy storage component includes a capacitor and/or battery, as described and exemplified elsewhere in this disclosure.

Figure 21:
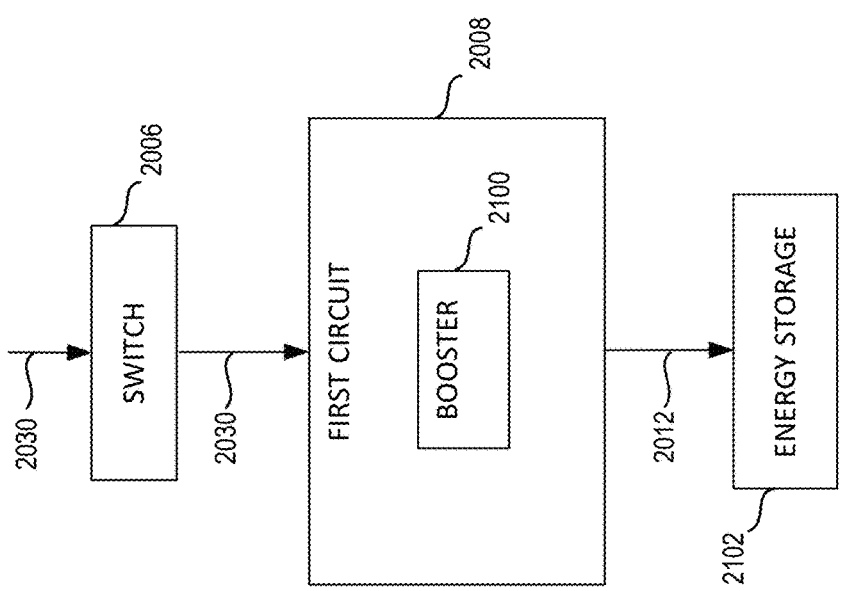
FIG. 21 is a schematic diagram of an exemplary first circuit of the turbine control system of FIG. 20.

By way of a non-limiting example, reference is made to FIG. 21, illustrating a schematic diagram of exemplary first circuit 2008 of turbine control system 2000, consistent with some embodiments of the present disclosure. The DC operating voltage range of first circuit 2008 (e.g., 3 V to 15 V) may be lower than a voltage range for second circuit 2010 (e.g., 36 V to 72 V). First circuit 2008 may include a voltage booster 2100 configured to raise DC output 2012 to a level complying with a first threshold (e.g., greater than or equal to the first threshold). In some embodiments, the low voltage range of first circuit 2008 may be associated with a low fluid speed range (e.g., below 4 m/s). At least one processor 2004

(see FIG. 20) may operate at least one controllable switch 2006 to channel DC voltage 2030 outputted by one or more rectifiers (e.g., rectifier 530A and/or rectifier 530B) to first circuit 2008 when a fluid flow driving fluid turbine 404A has a speed in the low fluid speed range. In some embodiments, the first threshold is associated with an energy storage component 2102 (e.g., included in energy sink 2028 of FIG. 20). Energy storage component 2102 may receive DC output 2012 from first circuit 2008 for storage as DC energy. For example, energy storage component 2102 may include one or more batteries associated with an input threshold of 12V. Voltage booster 2100 may increase DC voltage 2030 (e.g., 9 V) to reach the 12 V threshold required for storage in energy storage component 2102.

In some disclosed embodiments, the second DC operating range is associated with a high voltage range, and wherein the second circuit includes a voltage regulator configured to produce the DC output at a level complying with a second threshold A high voltage range refers to a plurality of voltage levels each of which is greater than or equal to a lower voltage threshold. A voltage regulator refers to an electronic device configured to maintain a substantially constant output voltage, regardless of changes in input voltage, load conditions, and/or temperature variations. A voltage regulator may be used to provide stable and/or reliable power supply voltages. A voltage regulator configured to produce the DC output at a level complying with a second threshold refers to a voltage regulator configured to receive an (e.g. variable) DC input, and produce an output DC voltage that complies with the second threshold. In some embodiments, complying with the second threshold involves not exceeding and/or not falling below the second threshold within a tolerance level. A tolerance may refer to a permissible limit of variation and/or accuracy around a threshold.

In some disclosed embodiments, the high voltage range is associated with a high fluid speed range. A high fluid speed range includes a plurality of fluid speeds each of which is greater than or equal to an associated lower fluid speed threshold. A rotational speed of a fluid turbine spinning in response to a fluid flow within a high fluid speed range may be faster than a rotational speed of the fluid turbine spinning in response to a fluid flow below the high fluid speed range, causing a corresponding faster rotational speed of a rotor of an associated generator. Consequently, more mechanical energy may be available for converting to electrical energy at high fluid speeds, leading to higher voltages than would be generated from low fluid speeds.

In some disclosed embodiments, the second threshold is associated with an inverter configured to receive the DC output from the second circuit and convert the DC output to an AC output compatible with an electrical grid. An inverter (as described and exemplified elsewhere herein) configured to receive the DC output from a circuit refers to an inverter connected to a DC output of the circuit in a manner complying with voltage and/or current requirements of the inverter, allowing the DC output to flow from the circuit to the inverter. An inverter may be connected to a DC output using one or more one or more wires, switches, resistors, capacitors, and/or any other electronic component than may be used to feed and/or regulate a DC output of a circuit. The inverter may include electronic components for converting the DC signal to an AC signal associated with a grid-compatible voltage, current, frequency, phase, and/or timing. In some embodiments, the inverter may be a grid-compatible inverter configured to generate AC voltages at levels similar to those required by an electrical grid (e.g., a grid-compatible voltage). A grid-compatible voltage refers to a voltage signal having a matching voltage, current, power level, phase, and/or frequency of a voltage signal associated with an electrical grid such that feeding a grid-compatible voltage to the electrical grid produces a level of impedance (e.g., associated with power loss) below a threshold value. In some embodiments, a grid-compatible voltage is additionally associated with timing the feeding of a grid-compatible voltage to an electrical grid to produce a level of impedance below a threshold level. In some disclosed embodiments, the voltage regulator includes a voltage buck circuit configured to reduce the DC output to a level meeting the second threshold. The voltage that a buck converter may regulate to may depend on the specifications of an associated grid-compatible inverter. For example, if a maximum DC input voltage to a grid-compatible inverter is 60 V, an associated buck converter may regulate the DC voltage to remain below 60 V. A voltage buck circuit (e.g., a buck converter or a step-down converter) refers to an electronic device configured to reduce a voltage level from an input voltage to an output voltage lower than the input voltage. A voltage buck circuit may be used with one or more electronic devices associated with an upper voltage threshold, and may include one or more transistors, inductors, and/or capacitors, that together convert an above-threshold input voltage to a below-threshold output voltage. Reducing a DC output to a level meeting a threshold involves reducing a voltage of a DC signal such that the DC signal does not exceed the threshold. Reducing the voltage thus may cause a corresponding increase in current, due to conservation of energy. At least one processor may cause a DC output to be reduced to a level complying with a threshold of one or more electronic components. For example, the at least one processor may cause a DC output to be below an upper safety threshold for one or more electronic components. A voltage buck circuit configured to reduce the DC output to a level meeting the second threshold may include circuitry configured to establish a connection between a DC input of a voltage buck circuit to a DC output of the rectifier when the DC output of the rectifier exceeds the second threshold, thereby producing a DC signal that does not exceed (e.g., that is less than or equal to) the second threshold.

In some disclosed embodiments, the voltage regulator is associated with a dump load. A voltage regulator associated with a dump load (as described and exemplified elsewhere herein) refers to a voltage regulator configured to be connected to a dump load, enabling transfer of at least some electrical energy to the dump load. A dump load refers to a device or mechanism used to dissipate excess electrical energy that cannot be used by the main system. Dump loads may to prevent system overload or damage when generated energy exceeds an immediate demand. The connection between the voltage regulator and the dump load may be variable and/or adjustable, allowing at least one processor to disconnect the voltage regulator from the dump load, and/or controlling a level of voltage transferrable to the dump load via the voltage regulator. A load may include one or more electrical devices and/or components that consume electricity generated by a fluid turbine. Since a fluid turbine generates electricity based on available fluid speed, turbine design, and/or additional factors, in some situations, the electricity generated may exceed demand from the load (e.g., during periods of high fluid speeds when the load cannot consume all the generated). A dump load consumes excess electricity to prevent damage to one or more component associated with a fluid turbine and/or control system thereof. A level complying with the second threshold refers to a level that does not violate the second threshold. For example, if the second threshold is an upper threshold, a level complying with the second threshold refers to a level equal to or less than the second threshold. If the second threshold is a lower threshold, a level complying with the second threshold refers to a level equal to or above than the second threshold. In some embodiments, a level complying with the second threshold includes a level complying within a tolerance of the second threshold.

Some disclosed embodiments involve at least one processor configured to communicate at least some of the DC voltage received from the rectifier to the dump load, thereby producing the DC output at a level complying with the second threshold. This refers one or more processors being configured to establish a connection between a DC output of the rectifier and a DC input of the dump load to enable controlling the transfer of at least some of the DC voltage outputted by the rectifier to the dump load such that the remaining DC voltage (e.g., not transferred to the dump load) is not in violation of the second threshold. For instance, the connection may include one or more electronic components (e.g., switches such as diodes and/or transistors, resistors, variable resistors or varistors, capacitors, and/or inductors). The at least one processor may transmit one or more signals to operate the one or more electronic components to control the flow of electricity therethrough, thereby controlling a level of DC voltage directed to the dump load, and controlling a level of DC voltage communicated to an energy sink as useable DC energy (e.g., away from the dump load). As an example, the DC voltage outputted by the rectifier may vary over time (e.g., due to varying fluid speeds). At any given point in time, the at least one processor may use a current indication of DC voltage to determine the level of DC voltage for communicating to the dump load at that point in time, such that over multiple sequential points in time, the level of DC voltage communicated as a useable DC voltage (e.g., and withheld from the dump load) remains substantially constant. In some embodiments, the at least one processor may transfer at least some voltage to the dump load to implement an MPPT protocol, as described and exemplified elsewhere in this disclosure.

In some disclosed embodiments, the voltage regulator is associated with an energy storage component, and the at least one processor is configured to communicate at least some of the DC voltage received from the rectifier to the energy storage component for storage as DC energy, thereby producing the DC output at a level complying with the second threshold. A voltage regulator associated with an energy storage component refers to a voltage regulated configured to be connected to an energy storage component, enabling transferring of at least some electrical energy to the energy storage component. The variable connection between the voltage regulator and the energy storage component may allow for disconnecting the voltage regulator from the energy storage component, and/or controlling a level of voltage transferrable from the voltage regulator to the energy storage component. At least one processor configured to communicate at least some of the DC voltage received from the rectifier to the energy storage component for storage as DC energy, thereby producing the DC output at a level complying with the second threshold refers to at least one processor configured to establish a connection between an DC output of the rectifier to a DC input of the energy storage component to enable controllable transfer of at least some of the DC voltage outputted by the rectifier to the energy storage component such that the remaining DC voltage (e.g., not transferred to the energy storage component) is not in violation of the second threshold. The connection may include one or more electronic components (e.g., switches, resistors, capacitors, and/or inductors). The at least one processor may transmit one or more signals to operate the one or more electronic components to control the flow of electricity therethrough, thereby controlling a level of DC voltage directed to the energy storage component. For instance, the rectifier may output a DC voltage that varies over time. The at least one processor may use a current indication of DC voltage to determine the level of DC voltage for communicating to the energy storage component, such that over multiple sequential points in time, the level of DC voltage communicated to an energy sink other than the energy storage component (e.g., such as an inverter) is substantially constant. In some embodiments, the at least one processor may transfer at least some voltage to the energy storage component to implement an MPPT protocol, as described and exemplified elsewhere in this disclosure.

Figure 22:
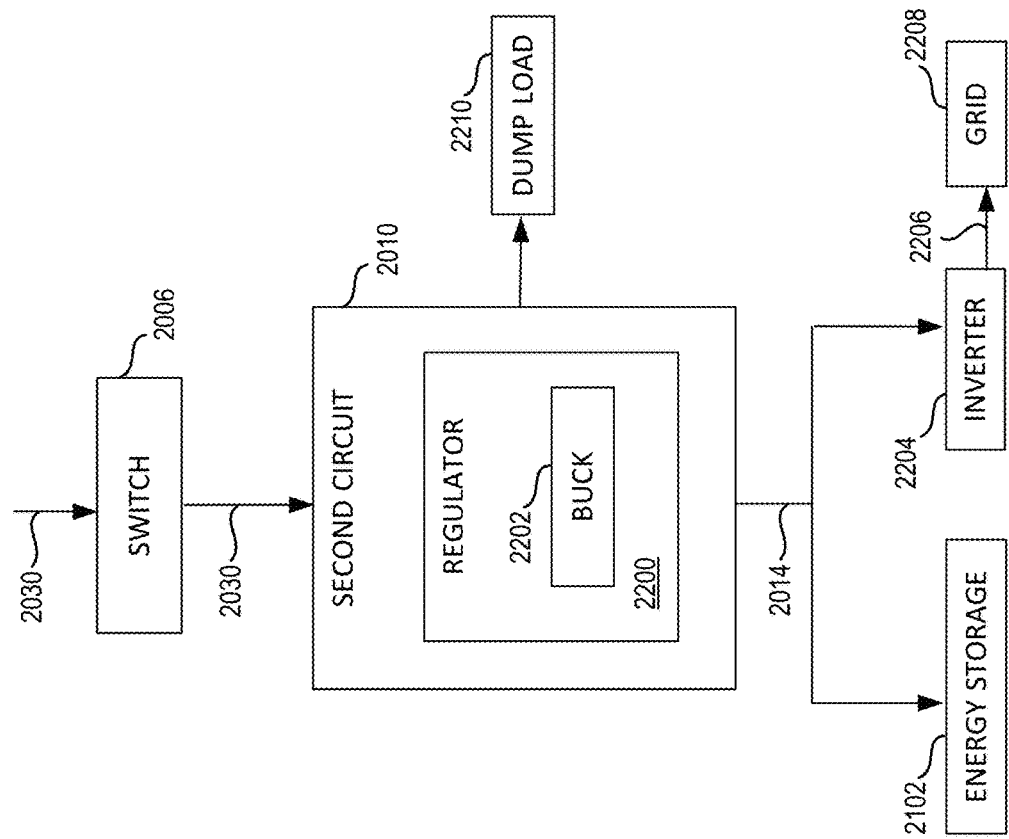
FIG. 22 is a schematic diagram of an exemplary second circuit of the turbine control system of FIG. 20.

By way of a non-limiting example, reference is made to FIG. 22 illustrating a schematic diagram of exemplary second circuit 2010 of the turbine control system 2000, consistent with some embodiments of the present disclosure. The DC operating range of second circuit 2010 (e.g., 36 V to 72 V) may be associated with a higher voltage range than the DC operating range of first circuit 2008 (e.g., 3 V to 15 V). Second circuit 2010 may include a voltage regulator 2200 configured to produce DC output 2014 at a level complying with a second threshold. In some embodiments, the higher DC operating range of second circuit 2010 may be associated with a higher fluid speed range (e.g., above 5 m/s) than for the fluid speed range associated with first circuit 2008. Thus, at least one processor 2004 (see FIG. 20) may operate at least one controllable switch 2006 to channel DC voltage 2030 outputted by one or more rectifiers (e.g., rectifier 530A and/or rectifier 530B) to second circuit 2010 when a fluid flow driving fluid turbine 404A is in the higher fluid speed range. In some embodiments, the second threshold may be associated with a grid-compatible inverter 2204. Grid-compatible inverter 2204 may receive DC output 2014 from second circuit 2010 and convert DC output 2014 to an AC output 2206 compatible with an electrical grid 2208. In some embodiments, voltage regulator 2200 includes a voltage buck circuit 2202 for reducing DC voltage 2030 to a level meeting the second threshold. For instance, voltage buck circuit 2202 may reduce DC voltage 2030 from 72 V to 60 V, in compliance with grid-compatible inverter 2204. In some embodiments, voltage regulator 2200 may be associated with a dump load 2210. At least one processor 2004 (see FIG. 20) may communicate at least some of DC voltage 2030 received from at least one rectifier 530A to dump load 2210, thereby producing DC output 2014 at a level complying with the second threshold. In some embodiments, voltage regulator 2200 may be associated with energy storage component 2102. At least one processor 2004 may communicate at least some of DC voltage 412A received from at least one rectifier 530A to energy storage component 2102 for storage as DC energy, thereby producing the DC output at a level complying with the second threshold. For example, second circuit 2010 may be associated with a second switch (not shown) between second circuit 2010 and energy storage component 2102 and inverter 2204, allowing at least one processor 2004 to control a flow of DC output 2014 between energy storage component 2102 and/or to inverter 2204.

Some disclosed embodiments involve at least a third circuit configured to meet a third performance criterion during operation in a third DC operating range, wherein the controllable switch is configured to channel the at least one DC voltage between at least the first circuit, the second circuit, and the third circuit. A third DC operating range includes at least some different voltages than the first and second DC operating ranges. In some embodiments, the first, second, and third DC operating ranges are distinct (e.g., lacking any shared voltage levels). In some embodiments, at least one of the first, second, and third DC operating ranges includes at least one voltage level common to at least one other one of the first, second, and third DC operating ranges. A third circuit configured to meet a third performance criterion during operation in a third DC operating range may be understood as described earlier with respect to the first and second circuits. For instance, the third circuit may include electronic components rated for and/or applicable to the third DC operating range, such that feeding a signal in the third DC operating range to the third circuit enables meeting the third performance criterion. A controllable switch configured to channel the at least one DC voltage between at least the first circuit, the second circuit, and the third circuit refers to a switch controllable by at least one processor to divert the DC voltage to either the first, second or third circuit. For instance, the controllable switch may be used to establish a connection between a source of a DC voltage and one or more associated sinks for the DC voltage either via the first circuit, the second circuit, or the third circuit. One or more controllable switches may be used to establish a conducting path between the source of the DC voltage and either the first circuit the second circuit, or the third circuit. Such controllable switches may be located anywhere along any of the conducting paths.

In some disclosed embodiments, the at least one processor is configured to use the controllable switch based on the at least one indication to alternately channel the DC voltage between at least the first circuit, the second circuit and the third circuit. At least one processor configured to use the controllable switch based on the at least one indication to alternately channel the DC voltage between at least the first circuit, the second circuit and the third circuit refers to at least one processor configured to use one or more of the indications to operate the controllable switch to establish a connection between a DC voltage source and one or more associated DC energy sinks, via one of the first circuit, the second circuit, or the third circuit. For example, similar to operating the switch to establish connections between the rectifier and the one or more associated energy sinks via the first circuit or the second circuit, as described earlier, when the indication indicates that the DC voltage is within the third operating range, the at least one processor may operate the switch to establish the connection between the rectifier and the one or more associated energy sinks via the third circuit, thereby allowing the DC voltage to flow through the third circuit.

Some disclosed embodiments involve causing the charge controller to at least meet the first performance criterion when the at least one DC voltage is within the first DC operating range, meet the second performance criterion when the at least one DC voltage is within the second operating range, and meet the third performance criterion when the at least one DC voltage is within the third operating range. Causing a charge controller to meet first and second performance criteria when the DC voltage is within the first and second DC operating ranges may be understood as described and exemplified earlier. Meeting the third performance criterion may be understood as being similar to meeting the first or second performance criteria as described and exemplified elsewhere herein. Causing a charge controller to meet a third performance criterion when the DC voltage is within a third DC operating range refers to using the third circuit of the charge controller, when the DC voltage is within the third DC operating range. For example, the third circuit may include components rated for the third DC operating range. Channeling a DC voltage in the third DC operating range to a circuit containing components rated for the third DC operating range (e.g., thereby preventing the DC voltage from being fed to one or more components rated for a DC operating range other than the third DC operating range), may cause the charge controller to meet the third performance criterion. Thus, by using the controllable switch to channel a DC voltage in the first DC operating range to the first circuit, channel a DC voltage in the second DC operating range to the second circuit, and channel a DC voltage in the third DC operating range to the third circuit may, the at least one processor may cause the charge controller to meet the first, second, and third performance criterion, respectively, allowing the charge controller to operate more efficiently, reliably, effectively, and/or safely.

In some disclosed embodiments, the third DC operating range is between the first DC operating range and the second DC operating range. Between refers to being intermediate to and/or being bounded by. A third DC operating range between the first DC operating range and the second DC operating range refers to the third DC operating range being bounded by the first DC operating range and the second DC operating range. For instance, an upper bound of the first DC operating range may be adjacent to a lower bound of the third DC operating range, and an upper bound of the third DC operating range may be adjacent to a lower bound of the second DC operating range, such that the third DC operating range is sandwiched between the first and second DC operating ranges.

For example, the fluid turbine may be a wind turbine, and each of the first, second, and third DC operating ranges may be associated with first, second, and third wind speed ranges, respectively. A first wind speed range (e.g., below 4 m/s) may be associated with the first DC operating range. A second wind speed range (e.g., above 5 m/s) may be associated with the second DC operating range. A third wind speed range (e.g., between 4 m/s and 5 m/s) may be associated with the third DC operating range. The at least one processor may receive an indication of wind speed from an anemometer. The at least one processor may operate the switch to channel a DC voltage produced by a fluid turbine and an associated generator to the first circuit when the wind speed is below 4 m/s, channel the DC voltage to the second circuit when the wind speed is above 5 m/s, and channel the DC voltage to the third circuit when the wind speed is between 4 m/s and 5 m/s.

By way of a non-limiting example, in FIG. 20, charge controller 2002 may include a third circuit 2024 configured to meet a third performance criterion during operation in a third DC operating range. For example, third circuit 2024 may include one or more resistors, capacitors, inductors, diodes, and/or transistors rated for a third DC operating range between 15 V and 36 V. Feeding a DC voltage between 15 V and 36 V to third circuit 2024 may cause charge controller 2002 to meet a third performance criterion (e.g., due to third circuit 2024 including components ranked for DC voltages between 15 V and 36 V). For instance, the third performance criterion may be associated with an optimal or near-optimal power output and/or response time achievable for DC voltages in the third DC operating range. At least one controllable switch 2006 may channel DC voltage 2030 between at least first circuit 2008, second circuit 2010, and third circuit 2024. At least one processor 2004 may use at least one controllable switch 2006 based on the indication received from at least one sensors 418A to channel DC voltage 2030 between one or first circuit 2008, second circuit 2010, and third circuit 2024. This may cause charge controller 2002 to at least meet the first performance criterion when DC voltage 2030 is within the first DC operating range, meet the second performance criterion when DC voltage 2030 is within the second operating range, and meet the third performance criterion when DC voltage 2030 is within the third operating range. In some embodiments, the third DC operating range (e.g., 15 V and 36 V) is between the first DC operating range (e.g., 3 V to 15 V) and the second DC operating range (e.g., 36 V to 72 V). For instance, the third DC operating range may be associated with a fluid speed range between the fluid speed ranges associated with the first and second DC operating range. For example, at least one processor 2004 may operate at least one controllable switch 2006 to channel DC voltage 2030 to first circuit 2008 when an associated fluid speed is below 4 m/s, channel DC voltage 2030 to second circuit 2010 when an associated fluid speed is above 5 m/s, and channel DC voltage 2030 to third circuit 2024 when an associated fluid speed is between 4 m/s and 5 m/s.

In some disclosed embodiments, the third circuit is configured to communicate the at least one DC voltage received from the at least one rectifier as the DC output. A third circuit configured to communicate a DC voltage received from a rectifier as a DC output refers to a third circuit including at least one electrical connection for outputting the DC voltage received from the rectifier. The electrical connection may include one or more wires, cables, buses, and/or any other type of electrical connection. In some embodiments, the third circuit may lack a voltage boost and/or a voltage buck circuit, such that the DC output of the third circuit substantially matches the DC signal received from the rectifier. In some embodiments, the third circuit may be associated with a plurality of fluid turbines, and the DC voltage received by the third circuit may be an aggregate DC voltage produced by combining a plurality of DC voltages generated by the plurality of fluid turbines (e.g., using a plurality of rectifiers).

In some disclosed embodiments, the third DC operating range complies with an operating range for an inverter configured to receive the DC output from the third circuit and convert the DC output to an AC output compatible with an electrical grid, and the at least one processor is configured to cause the third circuit to communicate the at least one DC voltage received from the at least one rectifier to the inverter for outputting to the electrical grid. A third DC operating range complying with an operating range for an inverter (as described and exemplified elsewhere herein) refers to a DC operating range substantially matching a range of DC voltages that may be fed to an inverter. For instance, the third DC operating range may include a range of DC voltages that may be converted by the inverter to a grid-compatible AC voltage. An inverter configured to receive a DC output from the third circuit and convert the DC output to an AC output compatible with an electrical grid (as described and exemplified elsewhere herein) refers to a grid-compatible inverter connected to a DC output of third circuit, similar to that described earlier with respect to the second circuit. At least one processor configured to cause the third circuit to communicate the DC voltage received from the rectifier to the inverter for outputting to the electrical grid refers to at least one processor configured to establish a connection between the rectifier and the inverter via the third circuit, to thereby controllably channel the DC voltage through the third circuit to the inverter. For example, based on the indication indicating that the DC voltage is in an operating range for a grid-compatible inverter, the at least one processor may operate the controllable switch to establish a connection between the rectifier and the third circuit, and/or between the third circuit and the inverter, thereby connecting the rectifier to the inverter via the third circuit.

In some disclosed embodiments, the third DC operating range complies with an operating range of an energy storage component, and the at least one processor is configured to cause the third circuit to communicate the DC voltage received from the rectifier to the energy storage component for storage as DC energy. A DC operating range complying with an operating range of an energy storage component (as described and exemplified elsewhere herein) refers to a DC operating range substantially matching a range of DC voltages that may be fed to an energy storage component. For instance, an energy storage component may operate only within a certain range of voltages. Voltages above the range may cause damage to the energy storage device. Voltages below the range may not be storable by the energy storage components. Complying with an operating range of an energy storage device may thus include supplying a voltage within the operating range, and the third DC operating range may be included in the operating range of the energy storage device. At least one processor is configured to cause the third circuit to communicate the DC voltage received from the rectifier to the energy storage component for storage as DC energy refers to at least one processor configured to establish a connection between the rectifier and the energy storage component via the third circuit, to thereby controllable channel the DC voltage through the third circuit to the energy storage component. For example, based on the indication indicating that the DC voltage is in an operating range for the energy storage component, the at least one processor may operate the controllable switch to establish a connection between the rectifier and the third circuit, and/or between the third circuit and the energy storage component, thereby connecting the rectifier to the energy storage component via the third circuit. For instance, energy stored in the energy storage component may be used to smooth power delivered to the grid, to power a charge controller and/or a braking system associated with the fluid turbine, and/or any other use of DC power associated with operating a fluid turbine.

Figure 23:
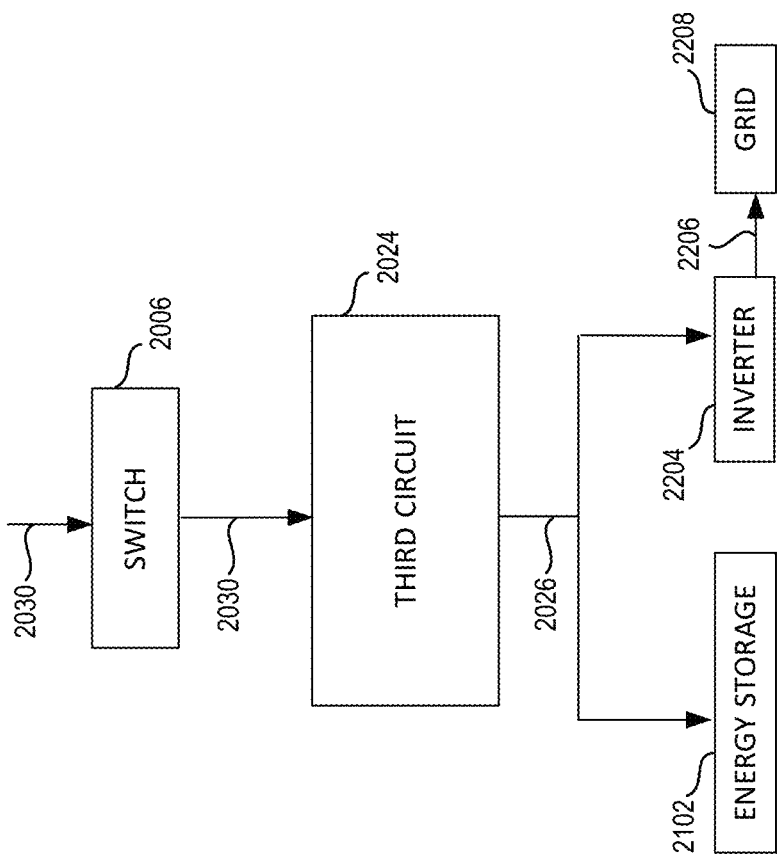
FIG. 23 is a schematic diagram of an exemplary third circuit of the turbine control system of FIG. 20.

By way of a non-limiting example, reference is made to FIG. 23 illustrating a schematic diagram of exemplary third circuit 2024 of turbine control system 2000, consistent with some embodiments of the present disclosure. In some embodiments, third circuit 2024 may communicate DC voltage 2030 received from at least one rectifier 530A as a DC output 2026 (e.g., to at least one energy sink 2028 of FIG. 20). In some embodiments, third circuit 2024 may adjust and/or modify DC voltage 2030 received from at least one rectifier 530A to produce DC output 2026 different from DC voltage 2030. In some embodiments, the third DC operating range complies with an operating range for inverter 2204. Inverter 2204 may receive DC output 2026 from third circuit 2024 and convert DC output 2026 to AC output 2206 compatible with electrical grid 2208. At least one processor 2004 may cause third circuit 2024 to communicate DC voltage 2030 received from at least one rectifier 530A to inverter 2204 for outputting to electrical grid 2208. In some embodiments, the third DC operating range complies with an operating range of energy storage component 2102. At least one processor 2004 may cause third circuit 2024 to communicate DC voltage 2030 received from rectifier 530A to energy storage component 2102 for storage as DC energy. For instance, energy storage component 2102 may include one or more capacitors capable of storing DC voltage 2030 directly (e.g., without increasing or decreasing DC voltage 2030). In some embodiments, one or more switches (e.g., at least one switch 2006 or a different switch) may be provided to allow at least one processor 2004 to control the flow of DC voltage 2030 from at least one rectifier 530A through third circuit 2024 to storage component 2102 and/or to inverter 2204. For example, one or more switches may be located inside third circuit 2024, and/or between an output of third circuit 2024 and energy storage component 2102 and/or inverter 2204.

In some disclosed embodiments, causing the charge controller to meet the first performance criterion over a first time period when the DC voltage is within the first DC operating range generates a greater first net DC power than would be generated in an absence of the first circuit, and wherein causing the charge controller to meet the second performance criterion over a second time period when the DC voltage is within the second DC operating range generates a greater second net DC power than would be generated in an absence of the second circuit. A time period refers to a time duration. A time period may be bounded between a first instant in time and a second instant in time. A time period may last 1 minute, 5 minutes, an hour, a day, a month, and/or any other time duration. Net power generated over a time period includes a total and/or aggregated power outputted by a fluid generator operating during the time period. Causing the charge controller to meet the first performance criterion over a first time period when the DC voltage is within the first DC operating range may involve the at least one processor determining that the DC voltage is within the first DC operating range for the duration of a first time period based on the received indication, and operating the controllable switch to channel the DC voltage to the first circuit throughout the first time period. Channeling a DC voltage in the first DC operating range to components rated for the first DC operating range throughout the first time period may prevent the DC voltage from being fed to components rated for a different DC operating range, allowing the charge controller to meet the first performance criterion during the first time period. In some embodiments, the first performance criterion corresponds to an optimal or near-optimal performance for the fluid turbine and the associated charge controller when the DC voltage is in the first DC operating range, such that using a circuit other than the first circuit for voltages in the first DC operating range may result in sub-optimal performance. Generating a greater first net DC power than would be generated in an absence of the first circuit involves producing more DC power throughout the first time period by using the first circuit than would be possible with a different circuit. For example, the first circuit may be designed to produce an optimal or near-optimal level of DC power for DC voltages in the first DC operating range, whereas using another circuit (e.g., second or third circuit) may produce less power than that produced by the first circuit for DC voltages in the first DC operating range.

In a similar manner, causing the charge controller to meet the second performance criterion over a second time period when the DC voltage is within the second DC operating range may involve the at least one processor determining that the DC voltage is within the second DC operating range throughout the second time period, and operating the controllable switch to channel the DC voltage to the second circuit throughout the second time period. This may cause a DC voltage in the second DC operating range to be channeled to components rated for the second DC operating range, preventing the DC voltage from being fed to components rated for a different DC operating range, allowing the charge controller to meet the second performance criterion during the second time period. In some embodiments, the second performance criterion corresponds to an optimal or near-optimal performance for the fluid turbine and the associated charge controller when the DC voltage is in the second DC operating range, such that using a circuit other than the second circuit for voltages in the second DC operating range may result in sub-optimal performance. Generating a greater first net DC power than would be generated in an absence of the first circuit involves producing more DC power throughout the second time period by using the second circuit than would be possible using a different circuit. For example, the second circuit may be designed to produce an optimal or near-optimal level of DC power for DC voltages in the second DC operating range, whereas using another circuit (e.g., first or third circuit) may produce less power than that produced by the second circuit for DC voltages in the second DC operating range.

In some disclosed embodiments, causing the charge controller to meet the first performance criterion over a first time period when the DC voltage is within the first DC operating range generates a greater first net DC power than would be generated in an absence of the first circuit, causing the charge controller to meet the second performance criterion over a second time period when the DC voltage is within the second DC operating range generates a greater second net DC power than would be generated in an absence of the second circuit, and causing the charge controller to meet the third performance criterion over a third time period when the DC voltage is within the third DC operating range generates a greater third net DC power than would be generated in an absence of the third circuit. Causing the charge controller to meet the first and second performance criteria over first and second time periods when the DC voltage is within the first or second DC operating ranges, respectively, and generating greater first and second net DC power than would be generated in an absence of the first and second circuits, respectively may be understood as described earlier. Similarly, causing the charge controller to meet the third performance criterion over a third time period when the DC voltage is within the third DC operating range generates a greater third net DC power than would be generated in an absence of the third circuit may be understood as described above for the first and second circuits. For instance, the third circuit may include components rated for the third DC operating range and may be designed to produce an optimal or near-optimal level of DC power for DC voltages in the third DC operating range, such that channeling a DC voltage in the third DC operating to a different circuit may result in sub-optimal performance.

By way of a non-limiting example, in FIG. 20, causing charge controller 2002 to meet the first performance criterion over a first time period when DC voltage 2030 is within the first DC operating range may generate a greater first net DC power than would be generated in an absence of first circuit 2008. Causing charge controller 2002 to meet the second performance criterion over a second time period when DC voltage 2030 is within the second DC operating range generates a greater second net DC power than would be generated in an absence of second circuit 2010. Causing charge controller 2002 to meet the third performance criterion over a third time period when DC voltage 2030 is within the third DC operating range generates a greater third net DC power than would be generated in an absence of third circuit 2024.

In some disclosed embodiments, the at least one fluid turbine includes a cluster of geographically-associate fluid turbines, the at least one AC voltage includes a plurality of AC voltages, the at least one DC voltage includes a plurality of DC voltages, the at least one rectifier includes a plurality of rectifiers, the at least one sensor includes a plurality of sensors, and the at least one indication includes a plurality of indications. A cluster of fluid turbines may be understood as described and exemplified elsewhere herein. A plurality of AC voltages refers to an AC voltage produced by each fluid turbine in the cluster. A plurality of DC voltages refers to a DC voltage associated with each AC voltage produced by each fluid turbine in the cluster. A plurality of rectifiers refers to different rectifier dedicated to each fluid turbine in the cluster. A plurality of sensors, and a plurality of indications refers to a sensor associated with each of the plurality of DC voltages, where each sensor is configured to sense an indication of the associated DC voltage. In some disclosed embodiments, each rectifier is associated with a distinct fluid turbine in the cluster of fluid turbines and is configured to convert an associated AC voltage of the plurality of AC voltages to an associated DC voltage of the plurality of DC voltages. Each rectifier associated with a distinct fluid turbine in the cluster and configured to convert the associated AC voltage to an associated DC voltage refers to a different rectifier dedicated to each fluid turbine in the cluster for converting an AC voltage produced by the associated fluid turbine and an associated generator to an associated DC voltage. In some disclosed embodiments, each sensor is configured to measure a differing indication of the plurality of indications in association with a differing DC voltage of the plurality of DC voltages A differing indication of the plurality of indications refers to a distinct indication. Similarly, a differing DC voltage refers to a distinct DC voltage. For example, one or more fluid turbine in the cluster may perform slightly differently, e.g., due to different exposure to a fluid flow, exposure to drag by adjacent fluid turbine, and/or due to different turbine design and/or levels of wear. Consequently, there may be some variations in the AC voltages and associated DC voltages produced by each fluid turbine in the cluster. Thus, each fluid turbine in the cluster may have a dedicated sensor to sense an indication for the associated DC voltage.

In some disclosed embodiments, the charge controller is configured to aggregate each DC voltage received from each rectifier to produce an aggregate DC voltage. Aggregating refers to combining, accumulating, and/or bundling. An aggregate DC voltage refers to a combination of individual DC voltages in a system. A combination of DC voltages may include a sum of DC voltages, a quadratic mean or root mean square (RMS) of a plurality of voltages, and/or any other technique for combining multiple DC voltages. Combining the DC voltages produced by a plurality of fluid turbines in a cluster may result in an aggregate DC voltage. A charge controller configured to aggregate each DC voltage received from each rectifier to produce an aggregate DC voltage refers to a charge controller connected to each of the plurality of rectifiers in a manner to combine the plurality of outputted DC voltage to produce a net or aggregate DC voltage produced by the plurality of fluid turbines in the cluster. For example, a single charge controller might be connected to each of the plurality of rectifiers. In some disclosed embodiments, the at least one processor is configured to receive the plurality of indications associated with the plurality of DC voltages from the plurality of sensors, and based on the plurality of indications, use the controllable switch to channel the aggregate DC voltage between at least the first circuit and the second circuit, thereby causing the charge controller to meet the first performance criterion when the aggregate DC voltage is within the first DC operating range, and causing the charge controller to meet the second performance criterion when the aggregate DC voltage is within the second DC operating range. The at least one processor may operate substantially similar as described earlier with the noted difference of using a plurality of indications of DC voltages to operate the controllable switch and select between the first and second circuits. For instance, the at least one processor may use the plurality of indications of DC voltages to determine an aggregate DC voltage for the cluster, and use the aggregate DC voltage to operate the controllable switch and select between the first and second circuits. Thus, aggregate DC power generated by a cluster of fluid turbines may be channeled to the first circuit or the second circuit, depending on the level of the aggregate DC power. When the aggregate DC voltage is in the first DC operating range, the at least one processor may operate the controllable switch to channel the DC voltage to the first circuit to thereby achieve the first performance criterion. Similarly, when the aggregate DC voltage is in the second DC operating range, the at least one processor may operate the controllable switch to channel the DC voltage to the second circuit to thereby achieve the second performance criterion. In some embodiments, a single sensor may be provided to sense the aggregate voltage produced by the cluster of fluid turbines, e.g., instead of a different sensor dedicated to each fluid turbine in the cluster.

In some embodiments, the charge controller may include a third circuit configured to meet a third performance criterion during operation in a third DC operating range, as described earlier. Thus, aggregate DC power generated by a cluster of fluid turbines may be channeled to the first circuit, the second circuit, or the third circuit, depending on the level of the aggregate DC power. Upon receiving the plurality of indications associated with the plurality of DC voltages generated by the cluster of fluid turbines, the at least one processor may use the controllable switch to alternately channel the aggregate DC voltage between at least the first circuit, the second circuit, and the third circuit. In this manner, the at least one processor may cause the charge controller to meet the first performance criterion when the aggregate DC voltage is within the first DC operating range, meet the second performance criterion when the aggregate DC voltage is within the second DC operating range, and meet the third performance criterion when the aggregate DC voltage is within the third DC operating range.

By way of a non-limiting example, in FIG. 20, charge controller 2002 as associated with a cluster of fluid turbines including at least fluid turbines 404A and 404B. Fluid turbines 404A and 404B and associated generators 406A and 406B may output AC voltages 408A and 408B, respectively. Rectifier 530A may be associated with fluid turbine 404A, and rectifier 530B may be associated with fluid turbine 530B in the cluster of fluid turbines. Rectifiers 530A and 530B may convert AC voltages 408A and 408B to DC voltages 412A and 412B, respectively. Sensors 418A and 418B may measure one or more indications associated with DC voltages 412A and 412B outputted by fluid turbines 404A and 404B and associated generators 406A and 406B, respectively, and provide the indications to at least one processor 2004. Charge controller 2002 may aggregate each of DC voltages 412A and 412B received from each of rectifiers 530A and 530B to produce an aggregate DC voltage 2030 (e.g., fed to at least one switch 2006).

At least one processor 2004 may receive a plurality of indications associated with DC voltages 412A and 412B from plurality of sensors 418A and 418B. Based on the plurality of indications, at least one processor 2004 may use at least one controllable switch 2006 to alternately channel aggregate DC voltage 2030 between at least first circuit 2008 and second circuit 2010, thereby causing charge controller 2002 to meet the first performance criterion when aggregate DC voltage 2030 is within the first DC operating range, meet the second performance criterion when the aggregate DC voltage is within the second DC operating range. In some embodiments, at least one processor 2004 may use at least one controllable switch 2006 to alternately channel the aggregate DC voltage 2030 between at least first circuit 2008, second circuit 2010, and third circuit 2024 thereby also causing charge controller 2002 to meet the third performance criterion when aggregate DC voltage 2030 is within the third DC operating range.

Figure 24:
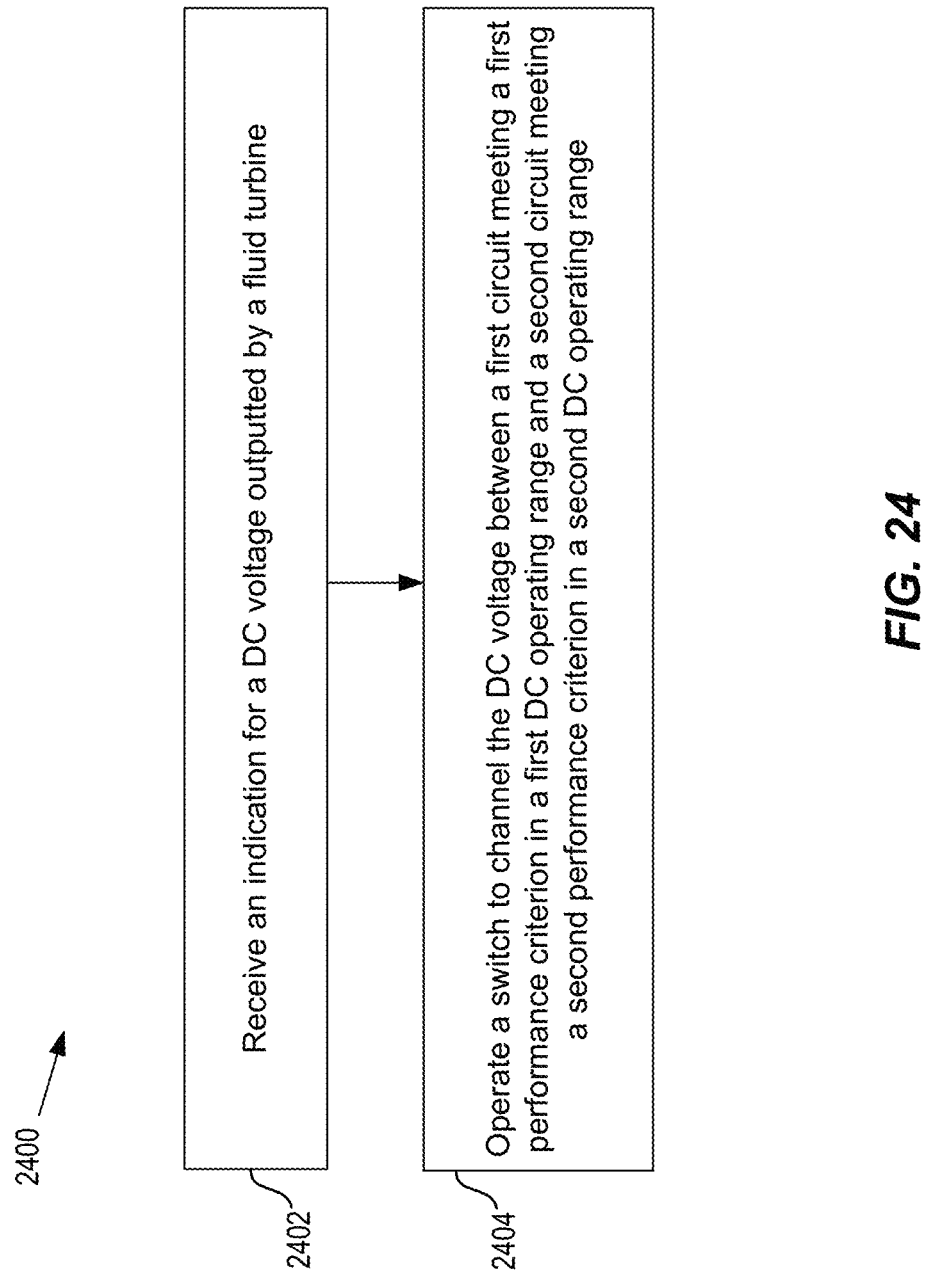
FIG. 24 is a flowchart of an example process for controlling a voltage output of at least one fluid turbine, consistent with some disclosed embodiments.

FIG. 24 is a flowchart of example process 2400 for controlling a voltage output of at least one fluid turbine, consistent with embodiments of the present disclosure. In some embodiments, process 2400 may be performed by at least one processor (e.g., processor 2004 shown in FIG. 20) to perform operations or functions described herein. In some embodiments, some aspects of process 2400 may be implemented as software (e.g., program codes or instructions) that are stored in a memory (e.g., memory 514 and/or 430 of FIGS. 4 and 5) or a non-transitory computer readable medium. In some embodiments, some aspects of process 2400 may be implemented as hardware (e.g., a specific-purpose circuit). In some embodiments, process 2400 may be implemented as a combination of software and hardware.

Referring to FIG. 24, process 2400 may include a step 2402 of receiving at least one indication associated with at least one DC voltage outputted by the at least one fluid turbine. By way of a non-limiting example, in FIG. 20, at least one processor 2004 may receive an indication from at least one sensors 418A associated with DC voltage 412A outputted by at least one fluid turbine 404A and associated generator 406A via at least one rectifier 530A. In some embodiments, at least one processor 2004 may additionally receive an indication from sensors 418B associated with DC voltage 412B outputted by fluid turbine 404B and associated generator 406B via rectifier 530B.

Process 2400 may include a step 2404 of, based on the at least one indication, operating a controllable switch to channel the at least one DC voltage output between at least a first circuit configured to meet a first performance criterion during operation in a first DC operating range and a second circuit configured to meet a second performance criterion during operation in a second DC operating range, thereby causing the first performance criterion to be met when the at least one DC voltage output is within the first DC operating range, and causing the second performance criterion to be met when the at least one DC voltage is within the second DC operating range.

By way of a non-limiting example, based on the indication, at least one processor 2004 may operate at least one controllable switch 2006 to channel DC voltage 2030 (e.g., DC voltage 412A, optionally aggregated with DC voltage 412B) between at least first circuit 2008 and second circuit 2010. First circuit 2008 may be configured to meet a first performance criterion during operation in a first DC operating range and second circuit 2010 may be configured to meet a second performance criterion during operation in a second DC operating range. In this manner, at least one processor 2004 may cause the first performance criterion to be met when DC voltage 2030 is within the first DC operating range, and causing the second performance criterion to be met when DC voltage 2030 is within the second DC operating range.

Examples of inventive concepts are contained in the following clauses which are an integral part of this disclosure.

Clause 1. A non-transitory computer readable medium containing instructions that when executed by at least one processor cause the at least one processor to perform operations for determining a power curve for a fluid turbine, the operations comprising:
receiving an indication of a fluid speed condition;
when a predetermined load in compliance with an MPPT protocol for the fluid turbine operating under the fluid speed condition is available,
obtaining the predetermined load; and
applying the predetermined load to the fluid turbine, thereby adjusting a rotational velocity of the fluid turbine in accordance with the MPPT protocol and the fluid speed condition;
when a predetermined load in compliance with the MPPT protocol for the fluid turbine operating under the fluid speed condition is unavailable,
applying a plurality of candidate loads to the fluid turbine in an iterative manner in accordance with the MPPT protocol and the fluid speed condition;
determining an MPPT-compliant load that, when applied to the fluid turbine operating under the fluid speed condition, generates greater power than would be generated in an absence of application of the MPPT protocol;
applying the MPPT-compliant load to the fluid turbine, thereby adjusting a rotational velocity of the fluid turbine in accordance with the MPPT protocol and the fluid speed condition; and
storing the MPPT-compliant load in association with the fluid speed condition for subsequent application.

Clause 2. The non-transitory computer readable medium of clause 1, wherein the indication of the fluid speed condition includes an RPM of the fluid turbine.

Clause 3. The non-transitory computer readable medium of any of clauses 1 and 2, wherein the indication of the fluid speed condition includes a fluid speed measurement.

Clause 4. The non-transitory computer readable medium of any of clauses 1 to 3, wherein the indication of the fluid speed condition includes an indication of power generated.

Clause 5. The non-transitory computer readable medium of any of clauses 1 to 4, wherein applying the predetermined load or the MPPT-compliant load to the fluid turbine includes applying the load via a charge controller associated with the fluid turbine.

Clause 6. The non-transitory computer readable medium of any of clauses 1 to 5, wherein applying the predetermined load or the MPPT-compliant load to the fluid turbine includes applying the load to an inverter associated with the fluid turbine.

Clause 7. The non-transitory computer readable medium of any of clauses 1 to 6, wherein the fluid turbine is located in a cluster of fluid turbines.

Clause 8. The non-transitory computer readable medium of any of clauses 1 to 7, wherein the fluid is air.

Clause 9. The non-transitory computer readable medium of any of clauses 1 to 8, wherein the fluid is water.

Clause 10. The non-transitory computer readable medium of any of clauses 1 to 9, wherein the fluid speed condition is associated with a pattern, and wherein obtaining the predetermined load is based on the pattern.

Clause 11. The non-transitory computer readable medium of any of clauses 1 to 10, wherein the operations further comprise applying a machine learning technique to determine the pattern.

Clause 12. The non-transitory computer readable medium of any of clauses 1 to 11, wherein the pattern is based on at least one of a plurality of power generation measurements associated with the fluid turbine, a plurality of rotational speed measurements associated with the fluid turbine, or a plurality of fluid speed measurements.

Clause 13. The non-transitory computer readable medium of any of clauses 1 to 12, wherein the pattern is a time-based pattern.

Clause 14. The non-transitory computer readable medium of any of clauses 1 to 13, wherein the time-based pattern indicates a steady fluid speed over a time period.

Clause 15. The non-transitory computer readable medium of any of clauses 1 to 14, wherein the time-based pattern indicates an increase in a fluid speed spanning a range of fluid speeds over a time period.

Clause 16. The non-transitory computer readable medium of any of clauses 1 to 15, wherein the time-based pattern indicates a decrease in a fluid speed spanning a range of fluid speeds over a time period.

Clause 17. The non-transitory computer readable medium of any of clauses 1 to 16, wherein the time-based pattern is associated with a time of day or a time of year.

Clause 18. The non-transitory computer readable medium of any of clauses 1 to 17, wherein obtaining the predetermined load and applying the predetermined load to the fluid turbine is associated with a faster fluid turbine response time than applying the plurality of candidate loads to the fluid turbine in an iterative manner, determining the MPPT-compliant load, and applying the MPPT-compliant load to the fluid turbine.

Clause 19. A system for determining a power curve for a fluid turbine of this clause and any of the preceding clauses, the system comprising at least one processor configured to:
receive an indication of a fluid speed condition;
when a predetermined load in compliance with an MPPT protocol for the fluid turbine operating under the fluid speed condition is available,
obtain the predetermined load; and
apply the predetermined load to the fluid turbine, thereby adjusting a rotational velocity of the fluid turbine in accordance with the MPPT protocol and the fluid speed condition;
when a predetermined load in compliance with an MPPT protocol for the fluid turbine operating under the fluid speed condition is unavailable,
apply a plurality of candidate loads to the fluid turbine in an iterative manner in accordance with the MPPT protocol for the fluid turbine operating under the fluid speed condition;
determine an MPPT-compliant load that, when applied to the fluid turbine operating under the fluid speed condition, generates greater power than would be generated in an absence of application of the MPPT protocol;
apply the MPPT-compliant load to the fluid turbine, thereby adjusting a rotational velocity of the fluid turbine in accordance with the MPPT protocol and the fluid speed condition; and
store the MPPT-compliant load in association with the fluid speed condition as a predetermined load for subsequent retrieval.

Clause 20. A method for determining a power curve for a fluid turbine of this clause and any of the preceding clauses, the method comprising:
receiving an indication of a fluid speed condition;
when a predetermined load in compliance with an MPPT protocol for the fluid turbine operating under the fluid speed condition is available,
obtaining the predetermined load; and
applying the predetermined load to the fluid turbine, thereby adjusting a rotational velocity of the fluid turbine in accordance with the MPPT protocol and the fluid speed condition;
when a predetermined load in compliance with an MPPT protocol for the fluid turbine operating under the fluid speed condition is unavailable,
applying a plurality of candidate loads to the fluid turbine in an iterative manner in accordance with the MPPT protocol for the fluid turbine operating under the fluid speed condition;
determining an MPPT-compliant load that, when applied to the fluid turbine operating under the fluid speed condition, generates greater power than would be generated in an absence of application of the MPPT protocol;
applying the MPPT-compliant load to the fluid turbine, thereby adjusting a rotational velocity of the fluid turbine in accordance with the MPPT protocol for the fluid turbine operating under the fluid speed condition; and
storing the an MPPT-compliant load in association with the fluid speed condition as a predetermined load for subsequent retrieval.

Clause 21. A fluid turbine control system of this clause and any of the preceding clauses, comprising:
at least one rectifier configured to convert a least one AC voltage output of at least one fluid turbine to at least one DC voltage;
at least one sensor configured to measure at least one indication associated with the at least one DC voltage;
a charge controller configured to receive the at least one DC voltage from the at least one rectifier and to produce a DC output, the charge controller including at least:
a first circuit configured to meet a first performance criterion during operation in a first DC operating range,
a second circuit configured to meet a second performance criterion during operation in a second DC operating range,
a controllable switch configured to channel the DC voltage between at least the first circuit and the second circuit; and
at least one processor configured to receive the at least one indication associated with the at least one DC voltage from the at least one sensor, and based on the at least one indication, use the controllable switch to alternately channel the at least one DC voltage between at least the first circuit and the second circuit, thereby causing the charge controller to meet the first performance criterion when the at least one DC voltage is within the first DC operating range, and causing the charge controller to meet the second performance criterion when the at least one DC voltage is within the second DC operating range.

Clause 22. The control system of any of clauses 1 to 21, wherein the first DC operating range is associated with a low voltage range, and the first circuit includes a voltage booster configured to raise the at least one DC output to a level complying with a first threshold.

Clause 23. The control system of any of clauses 1 to 22, wherein the low voltage range is associated with a low fluid speed range.

Clause 24. The control system of any of clauses 1 to 23, wherein the first threshold is associated with an energy storage component configured to receive the DC output from the first circuit for storage as DC energy.

Clause 25. The control system of any of clauses 1 to 24, wherein the energy storage component includes a battery or a capacitor.

Clause 26. The control system of any of clauses 1 to 25, wherein the second DC operating range is associated with a high voltage range, and wherein the second circuit includes a voltage regulator configured to produce the DC output at a level complying with a second threshold.

Clause 27. The control system of any of clauses 1 to 26, wherein the high voltage range is associated with a high fluid speed range.

Clause 28. The control system of any of clauses 1 to 27, wherein the second threshold is associated with an inverter configured to receive the DC output from the second circuit and convert the DC output to an AC output compatible with an electrical grid.

Clause 29. The control system of any of clauses 1 to 28, wherein the voltage regulator includes a voltage buck circuit configured to reduce the DC output to a level meeting the second threshold.

Clause 30. The control system of any of clauses 1 to 29, wherein the voltage regulator is associated with a dump load, and wherein the at least one processor is configured to communicate at least some of the DC voltage received from the rectifier to the dump load, thereby producing the DC output at a level complying with the second threshold.

Clause 31. The control system of claim any of clauses 1 to 30, wherein the voltage regulator is associated with an energy storage component, and the at least one processor is configured to communicate at least some of the DC voltage received from the rectifier to the energy storage component for storage as DC energy, thereby producing the DC output at a level complying with the second threshold.

Clause 32. The control system of any of clauses 1 to 31, further comprising at least a third circuit configured to meet a third performance criterion during operation in a third DC operating range, wherein the controllable switch is configured to channel the at least one DC voltage between at least the first circuit, the second circuit, and the third circuit, and wherein the at least one processor is configured to use the controllable switch based on the at least one indication to alternately channel the DC voltage between at least the first circuit, the second circuit and the third circuit, thereby causing the charge controller to at least meet the first performance criterion when the at least one DC voltage is within the first DC operating range, meet the second performance criterion when the at least one DC voltage is within the second operating range, and meet the third performance criterion when the at least one DC voltage is within the third operating range.

Clause 33. The control system of any of clauses 1 to 32, wherein the third DC operating range is between the first DC operating range and the second DC operating range.

Clause 34. The control system of any of clauses 1 to 33, wherein the third circuit is configured to communicate the at least one DC voltage received from the at least one rectifier as the DC output.

Clause 35. The control system of any of clauses 1 to 34, wherein the third DC operating range complies with an operating range for an inverter configured to receive the DC output from the third circuit and convert the DC output to an AC output compatible with an electrical grid, and the at least one processor is configured to cause the third circuit to communicate the at least one DC voltage received from the at least one rectifier to the inverter for outputting to the electrical grid.

Clause 36. The control system of any of clauses 1 to 35, wherein the third DC operating range complies with an operating range of an energy storage component, and the at least one processor is configured to cause the third circuit to communicate the DC voltage received from the rectifier to the energy storage component for storage as DC energy.

Clause 37. The control system of any of clauses 1 to 36, wherein causing the charge controller to meet the first performance criterion over a first time period when the DC voltage is within the first DC operating range generates a greater first net DC power than would be generated in an absence of the first circuit, and wherein causing the charge controller to meet the second performance criterion over a second time period when the DC voltage is within the second DC operating range generates a greater second net DC power than would be generated in an absence of the second circuit.

Clause 38. The control system of any of clauses 1 to 37, wherein causing the charge controller to meet the first performance criterion over a first time period when the DC voltage is within the first DC operating range generates a greater first net DC power than would be generated in an absence of the first circuit, causing the charge controller to meet the second performance criterion over a second time period when the DC voltage is within the second DC operating range generates a greater second net DC power than would be generated in an absence of the second circuit, and causing the charge controller to meet the third performance criterion over a third time period when the DC voltage is within the third DC operating range generates a greater third net DC power than would be generated in an absence of the third circuit.

Clause 39. The control system of any of clauses 1 to 38, wherein the at least one fluid turbine includes a cluster of geographically-associate fluid turbines, the at least one AC voltage includes a plurality of AC voltages, the at least one DC voltage includes a plurality of DC voltages, the at least one rectifier includes a plurality of rectifiers, the at least one sensor includes a plurality of sensors, and the at least one indication includes a plurality of indications,
  wherein each rectifier is associated with a distinct fluid turbine in the cluster of fluid turbines and is configured to convert an associated AC voltage of the plurality of AC voltages to an associated DC voltage of the plurality of DC voltages,
  wherein each sensor is configured to measure a differing indication of the plurality of indications in association with a differing DC voltage of the plurality of DC voltages,
  wherein the charge controller is configured to aggregate each DC voltage received from each rectifier to produce an aggregate DC voltage, and
  wherein the at least one processor is configured to receive the plurality of indications associated with the plurality of DC voltages from the plurality of sensors, and based on the plurality of indications, use the controllable switch to alternately channel the aggregate DC voltage between at least the first circuit and the second circuit, thereby causing the charge controller to meet the first performance criterion when the aggregate DC voltage is within the first DC operating range, and causing the charge controller to meet the second performance criterion when the aggregate DC voltage is within the second DC operating range.

Clause 40. A method for controlling a voltage output of at least one fluid turbine of this clause and any of the preceding clauses, the method comprising:
  receiving at least one indication associated with at least one DC voltage outputted by the at least one fluid turbine;
  based on the at least one indication, operating a controllable switch to alternately channel the at least one DC voltage output between at least a first circuit configured to meet a first performance criterion during operation in a first DC operating range and a second circuit configured to meet a second performance criterion during operation in a second DC operating range,
  thereby causing the first performance criterion to be met when the at least one DC voltage output is within the first DC operating range, and causing the second performance criterion to be met when the at least one DC voltage is within the second DC operating range.

Clause 41. A non-transitory computer readable medium of this clause and any of the preceding clauses, containing instructions that when executed by at least one processor cause the at least one processor to perform operations for a controlling a voltage output of at least one fluid turbine, the operations comprising:
  receiving at least one indication associated with at least one DC voltage outputted by the at least one fluid turbine;
  based on the at least one indication, operating a controllable switch to alternately channel the at least one DC voltage output between at least a first circuit configured to meet a first performance criterion during operation in a first DC operating range and a second circuit configured to meet a second performance criterion during operation in a second DC operating range,
  thereby causing the first performance criterion to be met when the at least one DC voltage output is within the first DC operating range, and causing the second performance criterion to be met when the at least one DC voltage is within the second DC operating range.

Disclosed embodiments may include any one of the following bullet-pointed features alone or in combination with one or more other bullet-pointed features, whether implemented as a system and/or method, by at least one processor or circuitry, and/or stored as executable instructions on non-transitory computer readable media or computer readable media.
  receiving an indication of a fluid speed condition;
  when a predetermined load in compliance with an MPPT protocol for a fluid turbine operating under the fluid speed condition is available;
  obtaining a predetermined load;
  applying a predetermined load to a fluid turbine;
  adjusting a rotational velocity of a fluid turbine in accordance with an MPPT protocol and a fluid speed condition;
  when a predetermined load in compliance with an MPPT protocol for a fluid turbine operating under a fluid speed condition is unavailable, applying a plurality of candidate loads to a fluid turbine in an iterative manner in accordance with an MPPT protocol and a fluid speed condition;
  determining an MPPT-compliant load that, when applied to a fluid turbine operating under a fluid speed condition, generates greater power than would be generated in an absence of application of the MPPT protocol;
  applying an MPPT-compliant load to a fluid turbine;
  adjusting a rotational velocity of a fluid turbine in accordance with an MPPT protocol and a fluid speed condition;
  storing an MPPT-compliant load in association with a fluid speed condition for subsequent application;
  an indication of a fluid speed condition includes an RPM of a fluid turbine; an indication of a fluid speed condition includes a fluid speed measurement; an indication of a fluid speed condition includes an indication of power generated;
  applying a predetermined load or an MPPT-compliant load to a fluid turbine;
  applying a load via a charge controller associated with a fluid turbine;
  applying a predetermined load or an MPPT-compliant load to a fluid turbine;
  applying a load to an inverter associated with the fluid turbine;
  a fluid turbine located in a cluster of fluid turbines;
  the fluid is air;
  the fluid is water;
  a fluid speed condition is associated with a pattern;
  obtaining a predetermined load based on a pattern;
  applying a machine learning technique to determine a pattern;
  a pattern based on at least one of a plurality of power generation measurements associated with a fluid turbine, a plurality of rotational speed measurements associated with a fluid turbine, or a plurality of fluid speed measurements;
  a pattern that is a time-based pattern;
  a time-based pattern indicating a steady fluid speed over a time period; a time-based pattern indicating an increase in a fluid speed spanning a range of fluid speeds over a time period;
  a time-based pattern indicating a decrease in a fluid speed spanning a range of fluid speeds over a time period;

a time-based pattern associated with a time of day or a time of year;
obtaining a predetermined load and applying a predetermined load to a fluid turbine being associated with a faster fluid turbine response time than applying a plurality of candidate loads to a fluid turbine in an iterative manner, determining an MPPT-compliant load, and applying the MPPT-compliant load to the fluid turbine;
determining a power curve for a fluid turbine;
receiving an indication of a fluid speed condition when a predetermined load in compliance with an MPPT protocol for the fluid turbine operating under the fluid speed condition is available,
obtaining the predetermined load;
applying the predetermined load to the fluid turbine;
adjusting a rotational velocity of a fluid turbine in accordance with an MPPT protocol and a fluid speed condition;
adjusting a rotational velocity of a fluid turbine when a predetermined load in compliance with an MPPT protocol for a fluid turbine operating under a fluid speed condition is unavailable;
applying a plurality of candidate loads to a fluid turbine in an iterative manner in accordance with an MPPT protocol for the fluid turbine operating under a fluid speed condition;
determining an MPPT-compliant load that, when applied to the fluid turbine operating under a fluid speed condition, generates greater power than would be generated in an absence of application of the MPPT protocol;
applying an MPPT-compliant load to a fluid turbine;
adjusting a rotational velocity of a fluid turbine in accordance with an MPPT protocol and a fluid speed condition;
storing an MPPT-compliant load in association with a fluid speed condition as a predetermined load for subsequent retrieval;
receiving an indication of a fluid speed condition;
when a predetermined load in compliance with an MPPT protocol for the fluid turbine operating under the fluid speed condition is available, obtaining a predetermined load;
applying a predetermined load to a fluid turbine;
adjusting a rotational velocity of a fluid turbine in accordance with an MPPT protocol and a fluid speed condition;
when a predetermined load in compliance with an MPPT protocol for a fluid turbine operating under the fluid speed condition is unavailable applying a plurality of candidate loads to a fluid turbine in an iterative manner in accordance with an MPPT protocol for a fluid turbine operating under a fluid speed condition;
determining an MPPT-compliant load that, when applied to a fluid turbine operating under a fluid speed condition, generates greater power than would be generated in an absence of application of the MPPT protocol;
applying an MPPT-compliant load to a fluid turbine;
adjusting a rotational velocity of a fluid turbine in accordance with an MPPT protocol for a fluid turbine operating under a fluid speed condition;
storing an MPPT-compliant load in association with a fluid speed condition as a predetermined load for subsequent retrieval;

at least one rectifier configured to convert a least one AC voltage output of at least one fluid turbine to at least one DC voltage;
at least one sensor configured to measure at least one indication associated with at least one DC voltage;
a charge controller configured to receive at least one DC voltage from at least one rectifier and produce a DC output;
at least a first circuit configured to meet a first performance criterion during operation in a first DC operating range,
at least a second circuit configured to meet a second performance criterion during operation in a second DC operating range,
a controllable switch configured to channel a DC voltage between at least a first circuit and a second circuit;
receiving at least one indication associated with at least one DC voltage from at least one sensor;
based on at least one indication, using a controllable switch to alternately channel at least one DC voltage between at least a first circuit and a second circuit;
causing a charge controller to meet a first performance criterion when at least one DC voltage is within a first DC operating range;
causing a charge controller to meet a second performance criterion when at least one DC voltage is within a second DC operating range;
a first DC operating range associated with a low voltage range;
a first circuit including a voltage booster configured to raise at least one DC output to a level complying with a first threshold;
a low voltage range associated with a low fluid speed range;
a first threshold associated with an energy storage component configured to receive a DC output from a first circuit for storage as DC energy;
an energy storage component including a battery or a capacitor;
a second DC operating range associated with a high voltage range;
a second circuit including a voltage regulator configured to produce a DC output at a level complying with a second threshold;
a high voltage range is associated with a high fluid speed range;
a second threshold associated with an inverter configured to receive a DC output from a second circuit and convert a DC output to an AC output compatible with an electrical grid;
a voltage regulator including a voltage buck circuit configured to reduce a DC output to a level meeting a second threshold;
a voltage regulator associated with a dump load;
communicating at least some DC voltage received from a rectifier to a dump load;
producing a DC output at a level complying with a second threshold;
a voltage regulator associated with an energy storage component;
communicating at least some DC voltage received from a rectifier to an energy storage component for storage as DC energy;
producing a DC output at a level complying with a second threshold;

at least a third circuit configured to meet a third performance criterion during operation in a third DC operating range;
a controllable switch configured to channel at least one DC voltage between at least a first circuit, a second circuit, and a third circuit;
using a controllable switch based on at least one indication to alternately channel a DC voltage between at least a first circuit, a second circuit and a third circuit;
causing a charge controller to at least meet a first performance criterion when the at least one DC voltage is within a first DC operating range;
causing a charge controller to at least meet a second performance criterion when at least one DC voltage is within a second operating range;
causing a charge controller to at least meet the third performance criterion when at least one DC voltage is within a third operating range;
a third DC operating range between a first DC operating range and a second DC operating range;
a third circuit configured to communicate at least one DC voltage received from at least one rectifier as a DC output;
a third DC operating range complying with an operating range for an inverter configured to receive the DC output from a third circuit and convert the DC output to an AC output compatible with an electrical grid;
causing a third circuit to communicate at least one DC voltage received from at least one rectifier to an inverter for outputting to an electrical grid;
a third DC operating range complying with an operating range of an energy storage component;
causing a third circuit to communicate a DC voltage received from a rectifier to an energy storage component for storage as DC energy;
causing the charge controller to meet a first performance criterion over a first time period when a DC voltage is within a first DC operating range to generate a greater first net DC power than would be generated in an absence of a first circuit;
wherein causing a charge controller to meet a second performance criterion over a second time period when a DC voltage is within a second DC operating range to generate a greater second net DC power than would be generated in an absence of a second circuit;
causing a charge controller to meet a third performance criterion over a third time period when a DC voltage is within a third DC operating range to generate a greater third net DC power than would be generated in an absence of a third circuit;
at least one fluid turbine including a cluster of geographically-associate fluid turbines;
at least one AC voltage including a plurality of AC voltages;
at least one DC voltage including a plurality of DC voltages;
at least one rectifier including a plurality of rectifiers;
at least one sensor including a plurality of sensors;
at least one indication including a plurality of indications;
each rectifier associated with a distinct fluid turbine in a cluster of fluid turbines are configured to convert an associated AC voltage of a plurality of AC voltages to an associated DC voltage of a plurality of DC voltages;
each sensor is configured to measure a differing indication of a plurality of indications in association with a differing DC voltage of a plurality of DC voltages;
a charge controller configured to aggregate each DC voltage received from each rectifier to produce an aggregate DC voltage;
receiving a plurality of indications associated with a plurality of DC voltages from a plurality of sensors;
based on a plurality of indications, use a controllable switch to alternately channel an aggregate DC voltage between at least a first circuit and a second circuit;
causing a charge controller to meet a first performance criterion when an aggregate DC voltage is within a first DC operating range;
causing a charge controller to meet a second performance criterion when an aggregate DC voltage is within a second DC operating range;
controlling a voltage output of at least one fluid turbine;
receive at least one indication associated with at least one DC voltage outputted by at least one fluid turbine;
based on at least one indication, operating a controllable switch to alternately channel at least one DC voltage output between at least a first circuit configured to meet a first performance criterion during operation in a first DC operating range and a second circuit configured to meet a second performance criterion during operation in a second DC operating range;
causing a first performance criterion to be met when at least one DC voltage output is within a first DC operating range;
causing a second performance criterion to be met when at least one DC voltage is within a second DC operating range;
at least one processor configured to perform operations for a controlling a voltage output of at least one fluid turbine;
receiving at least one indication associated with at least one DC voltage outputted by at least one fluid turbine;
based on at least one indication, operating a controllable switch to alternately channel at least one DC voltage output between at least a first circuit configured to meet a first performance criterion during operation in a first DC operating range and a second circuit configured to meet a second performance criterion during operation in a second DC operating range;
causing a first performance criterion to be met when at least one DC voltage output is within a first DC operating range;
causing a second performance criterion to be met when at least one DC voltage is within a second DC operating range.

What is claimed is:
1. A fluid turbine control system, comprising:
at least one rectifier configured to convert a least one AC voltage output produced by a generator associated with at least one fluid turbine to at least one DC voltage;
at least one sensor configured to measure at least one indication associated with the at least one DC voltage; and
a charge controller configured to receive the at least one DC voltage from the at least one rectifier and to produce a DC output, the charge controller including at least:
a first circuit configured to meet a first performance criterion during operation in a first DC operating range;
a second circuit configured to meet a second performance criterion during operation in a second DC operating range;

a controllable switch configured to channel the DC voltage between at least the first circuit and the second circuit; and at least one processor configured to receive the at least one indication associated with the at least one DC voltage from the at least one sensor, and based on the at least one indication, use the controllable switch to alternately channel the at least one DC voltage between at least the first circuit and the second circuit, thereby causing the charge controller to meet the first performance criterion when the at least one DC voltage is within the first DC operating range, and causing the charge controller to meet the second performance criterion when the at least one DC voltage is within the second DC operating range.

2. The control system of claim 1, wherein the first DC operating range is associated with a low voltage range, and the first circuit includes a voltage booster configured to raise the at least one DC output to a level complying with a first threshold.

3. The control system of claim 2, wherein the low voltage range is associated with a low fluid speed range.

4. The control system of claim 2, wherein the first threshold is associated with an energy storage component configured to receive the DC output from the first circuit for storage as DC energy.

5. The control system of claim 4, wherein the energy storage component includes a battery or a capacitor.

6. The control system of claim 1, wherein the second DC operating range is associated with a high voltage range, and wherein the second circuit includes a voltage regulator configured to produce the DC output at a level complying with a second threshold.

7. The control system of claim 6, wherein the high voltage range is associated with a high fluid speed range.

8. The control system of claim 6, wherein the second threshold is associated with an inverter configured to receive the DC output from the second circuit and convert the DC output to an AC output compatible with an electrical grid.

9. The control system of claim 6, wherein the voltage regulator includes a voltage buck circuit configured to reduce the DC output to a level meeting the second threshold.

10. The control system of claim 6, wherein the voltage regulator is associated with a dump load, and wherein the at least one processor is configured to communicate at least some of the DC voltage received from the rectifier to the dump load, thereby producing the DC output at a level complying with the second threshold.

11. The control system of claim 6, wherein the voltage regulator is associated with an energy storage component, and the at least one processor is configured to communicate at least some of the DC voltage received from the rectifier to the energy storage component for storage as DC energy, thereby producing the DC output at a level complying with the second threshold.

12. The control system of claim 1, further comprising at least a third circuit configured to meet a third performance criterion during operation in a third DC operating range, wherein the controllable switch is configured to channel the at least one DC voltage between at least the first circuit, the second circuit, and the third circuit, and wherein the at least one processor is configured to use the controllable switch based on the at least one indication to alternately channel the DC voltage between at least the first circuit, the second circuit and the third circuit, thereby causing the charge controller to at least meet the first performance criterion when the at least one DC voltage is within the first DC operating range, meet the second performance criterion when the at least one DC voltage is within the second operating range, and meet the third performance criterion when the at least one DC voltage is within the third operating range.

13. The control system of claim 12, wherein the third DC operating range is between the first DC operating range and the second DC operating range.

14. The control system of claim 12, wherein the third circuit is configured to communicate the at least one DC voltage received from the at least one rectifier as the DC output.

15. The control system of claim 12, wherein the third DC operating range complies with an operating range for an inverter configured to receive the DC output from the third circuit and convert the DC output to an AC output compatible with an electrical grid, and the at least one processor is configured to cause the third circuit to communicate the at least one DC voltage received from the at least one rectifier to the inverter for outputting to the electrical grid.

16. The control system of claim 12, wherein the third DC operating range complies with an operating range of an energy storage component, and the at least one processor is configured to cause the third circuit to communicate the DC voltage received from the rectifier to the energy storage component for storage as DC energy.

17. The control system of claim 1, wherein the first circuit includes electronic components rated for the first DC operating range such that channeling the at least one DC voltage to the first circuit to cause the charge controller to meet the first performance criterion over a first time period when the DC voltage is within the first DC operating range generates a greater first net DC power than would be generated in an absence of the first circuit, and wherein the second circuit includes electronic components rated for the second DC operating range such that channeling the at least one DC voltage to the second circuit to cause the charge controller to meet the second performance criterion over a second time period when the DC voltage is within the second DC operating range generates a greater second net DC power than would be generated in an absence of the second circuit, thereby reducing energy loss.

18. The control system of claim 12, wherein the first circuit includes electronic components rated for the first DC operating range such that channeling the at least one DC voltage to the first circuit to cause the charge controller to meet the first performance criterion over a first time period when the DC voltage is within the first DC operating range generates a greater first net DC power than would be generated in an absence of the first circuit, wherein the second circuit includes electronic components rated for the second DC operating range such that channeling the at least one DC voltage to the second circuit to cause the charge controller to meet the second performance criterion over a second time period when the DC voltage is within the second DC operating range generates a greater second net DC power than would be generated in an absence of the second circuit, and wherein the third circuit includes electronic components rated for the third DC operating range such that channeling the at least one DC voltage to the third circuit to cause the charge controller to meet the third performance criterion over a third time period when the DC voltage is within the third DC operating range generates a greater third net DC power than would be generated in an absence of the third circuit, thereby reducing energy loss.

19. The control system of claim 1, wherein the at least one fluid turbine includes a cluster of geographically-associated fluid turbines, the at least one AC voltage includes a plurality of AC voltages, the at least one DC voltage includes a plurality of DC voltages, the at least one rectifier includes a plurality of rectifiers, the at least one sensor includes a plurality of sensors, and the at least one indication includes a plurality of indications, wherein each rectifier is associated with a distinct fluid turbine in the cluster of fluid turbines and is configured to convert an associated AC voltage of the plurality of AC voltages to an associated DC voltage of the plurality of DC voltages, wherein each sensor is configured to measure a differing indication of the plurality of indications in association with a differing DC voltage of the plurality of DC voltages, wherein the charge controller is configured to aggregate each DC voltage received from each rectifier to produce an aggregate DC voltage, and wherein the at least one processor is configured to receive the plurality of indications associated with the plurality of DC voltages from the plurality of sensors, and based on the plurality of indications, use the controllable switch to alternately channel the aggregate DC voltage between at least the first circuit and the second circuit, thereby causing the charge controller to meet the first performance criterion when the aggregate DC voltage is within the first DC operating range, and causing the charge controller to meet the second performance criterion when the aggregate DC voltage is within the second DC operating range.

20. A method for controlling a voltage output of at least one fluid turbine, the method comprising:

receiving at least one indication associated with at least one DC voltage produced by a rectifier connected to a generator associated with the at least one fluid turbine; and based on the at least one indication, operating a controllable switch to alternately channel the at least one DC voltage output between at least a first circuit configured to meet a first performance criterion during operation in a first DC operating range and a second circuit configured to meet a second performance criterion during operation in a second DC operating range, thereby causing the first performance criterion to be met when the at least one DC voltage output is within the first DC operating range, and causing the second performance criterion to be met when the at least one DC voltage is within the second DC operating range.

21. A non-transitory computer readable medium containing instructions that when executed by at least one processor cause the at least one processor to perform operations for a controlling a voltage output of at least one fluid turbine, the operations comprising:

receiving at least one indication associated with at least one DC voltage produced by a rectifier connected to a generator associated with the at least one fluid turbine; and based on the at least one indication, operating a controllable switch to alternately channel the at least one DC voltage output between at least a first circuit configured to meet a first performance criterion during operation in a first DC operating range and a second circuit configured to meet a second performance criterion during operation in a second DC operating range, thereby causing the first performance criterion to be met when the at least one DC voltage output is within the first DC operating range, and causing the second performance criterion to be met when the at least one DC voltage is within the second DC operating range.

\* \* \* \* \*